United States Patent
Wu et al.

(10) Patent No.: US 11,785,602 B2
(45) Date of Patent: Oct. 10, 2023

(54) CHANNEL STATE INFORMATION FEEDBACK FOR FLEXIBLE UPLINK CONTROL SIGNALING

(71) Applicant: Qualcomm Incorporated, San Diego, CA (US)

(72) Inventors: Liangming Wu, Beijing (CN); Yu Zhang, Beijing (CN); Chao Wei, Beijing (CN); Chenxi Hao, Beijing (CN); Wanshi Chen, San Digo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/623,362

(22) PCT Filed: Jun. 13, 2018

(86) PCT No.: PCT/CN2018/091037
§ 371 (c)(1),
(2) Date: Dec. 16, 2019

(87) PCT Pub. No.: WO2018/228425
PCT Pub. Date: Dec. 20, 2018

(65) Prior Publication Data
US 2020/0178241 A1    Jun. 4, 2020

(30) Foreign Application Priority Data
Jun. 16, 2017  (WO) ................ PCT/CN2017/088775

(51) Int. Cl.
*H04W 72/21*    (2023.01)
*H04L 1/00*    (2006.01)
*H04L 5/00*    (2006.01)

(52) U.S. Cl.
CPC ........... *H04W 72/21* (2023.01); *H04L 1/0026* (2013.01); *H04L 5/0055* (2013.01)

(58) Field of Classification Search
CPC .......... H04W 72/0413; H04W 72/0466; H04L 1/0026; H04L 1/0028; H04L 1/0031; H04L 5/0055; H04B 7/0632
See application file for complete search history.

(56) References Cited

U.S. PATENT DOCUMENTS 9,209,882 B2    12/2015  Zhang et al.
10,187,876 B2   1/2019   Chen et al.
(Continued)

FOREIGN PATENT DOCUMENTS

CN    101924606 A    12/2010
CN    102255694 A    11/2011
(Continued)

OTHER PUBLICATIONS

Improving 3GPP-LTE Uplink Control Signaling Performance Using Complex-Field Coding, Chaitanya et al., IEEE Transactions on Vehicular Technology (Year: 2013).*
(Continued)

*Primary Examiner* — Romani Ohri
(74) *Attorney, Agent, or Firm* — Holland & Hart LLP

(57) ABSTRACT

Methods, systems, and devices are described for wireless communications that support transmitting channel state information (CSI) feedback utilizing flexible uplink control resources. A method may include determining a size of a frequency subband corresponding to components of a CSI feedback report based on configuration signaling or a size of allocated uplink control resources. A method may include encoding a CSI report into a single packet and transmitting the single packet over uplink control resources. A method may include encoding a first plurality of components of a
(Continued)

CSI report in a first packet, encoding a second plurality of components of the CSI report in a second packet, and mapping the packets to uplink control resources. A method may include transmitting a first plurality of components of a CSI report on a first slot and a second plurality of components of the CSI report on one or more subsequent slots.

37 Claims, 27 Drawing Sheets

(56) References Cited

U.S. PATENT DOCUMENTS

| | | | |
|---|---|---|---|
| 2010/0098012 A1* | 4/2010 | Bala | H04W 72/0446 370/329 |
| 2011/0269490 A1 | 11/2011 | Earnshaw et al. | |
| 2012/0082042 A1 | 4/2012 | Lunttila et al. | |
| 2012/0082190 A1* | 4/2012 | Zhu | H04B 7/063 375/267 |
| 2012/0314613 A1* | 12/2012 | Zhang | H04B 7/0639 370/252 |
| 2013/0007758 A1* | 1/2013 | Yamashita | G06F 9/4881 718/103 |
| 2013/0094479 A1* | 4/2013 | Park | H04L 5/0057 370/336 |
| 2013/0148613 A1* | 6/2013 | Han | H04L 1/1671 370/329 |
| 2013/0242764 A1 | 9/2013 | Määttänen et al. | |
| 2014/0003452 A1* | 1/2014 | Han | H04W 72/0446 370/474 |
| 2014/0219267 A1* | 8/2014 | Eyuboglu | H04W 56/001 370/350 |
| 2015/0043368 A1* | 2/2015 | Kim | H04B 7/024 370/252 |
| 2016/0295573 A1* | 10/2016 | Lee | H04W 72/0413 |
| 2017/0019163 A1 | 1/2017 | Yoshimoto et al. | |
| 2017/0170889 A1 | 6/2017 | Kim et al. | |
| 2018/0227156 A1* | 8/2018 | Papasakellariou | H04W 72/0453 |
| 2018/0331743 A1* | 11/2018 | Shen | H04B 7/0626 |
| 2019/0141677 A1* | 5/2019 | Harrison | H04L 5/0082 |
| 2019/0312622 A1* | 10/2019 | Fu | H04L 5/0057 |
| 2020/0037260 A1* | 1/2020 | Fu | H04W 72/042 |
| 2021/0282169 A1* | 9/2021 | Zhang | H04W 72/10 |

FOREIGN PATENT DOCUMENTS

| | | |
|---|---|---|
| CN | 102265548 A | 11/2011 |
| CN | 102378385 A | 3/2012 |
| CN | 103069902 A | 4/2013 |
| CN | 103095398 A | 5/2013 |
| CN | 103391181 A | 11/2013 |
| CN | 106165318 A | 11/2016 |
| CN | 110741578 B | 6/2022 |
| JP | 2016507984 A | 3/2016 |
| WO | WO2011137177 A1 | 11/2011 |
| WO | WO 2011157098 A1 | 12/2011 |
| WO | WO-2016114917 A1 | 7/2016 |
| WO | WO-2017028007 A1 | 2/2017 |
| WO | WO-2018111007 A1 | 6/2018 |

OTHER PUBLICATIONS

Taiwan Search Report—TW107120486—TIPO—dated Aug. 15, 2021 (174842TW).
Nokia, et al., "Remaining Details of Hybrid CSI Reporting", 3GPP TSG-RAN WG1#86bis, 3GPP Draft; R1-1608932 Remaining Detialsof Hybrid CSI Reporting Final 3rd Generation Partnership Project (3GPP), Mobile Competence Centre; 650, Route Deslucioles; F-06921 Sophia-Antipolis Cedex, vol. RANWG1, No. Lisbon, Portugal; Oct. 10, 2016-Oct. 14, 2016, Oct. 9, 2016 (Oct. 9, 2016), 6 Pages, XP051148986, Retrieved from the Internet: URL: http://www.3gpp.org/ftp/Meetings_3GPP_SYNC/RAN1/Docs/ [retrieved on Oct. 9, 2016], Section 2.
NTT Docomo: "CSI Feedback Type II for NR MIMO", 3GPP TSG RAN WG1 Meeting #89, 3GPP Draft; R1-1708457 NR Feedback Type II Final. 3rdGeneration-Partnership-Project-(3GPP).Mobile Competence Centre; 650, Route Deslucioles; F-06921 Sophia-Antipolis Cedex; France, vol. RAN WG1. No. Hangzhou; May 15, 2017-May 19, 2017, May 14, 2017 (May 14, 2017), pp. 1-9, XP051273649, Retrieved from the Internet: URL: http://www.3gpp.org/ftp/Meetings_3GPP_SYNC/RAN1/Docs/ [retrieved on May 14, 2017], Section 3.
Supplementary Partial European Search Report—EP18817792—Search Authority—Munich—dated Jun. 8, 2021 (174842EP).
International Search Report and Written Opinion—PCT/CN2018/091037—ISA/EPO—dated Sep. 5, 2018. (174842WO2).
International Search Report and Written Opinion—PCT/CN2017/088775—ISA/EPO—dated Feb. 24, 2018 (174842WO1).
Huawei., et al., "Periodic CQI/PMI/RI Reporting for CA", 3GPP Draft, 3GPP TSG RAN WG1 Meeting #63, R1-105833, 3rd Generation Partnership Project (3GPP), Mobile Competence Centre, 650, Route Des Lucioles, F-06921 Sophia-Antipolis Cedex, France, vol. RAN WG1, No. Jacksonville, Florida, USA, Nov. 15-19, 2010, Nov. 9, 2010, 5 pages [retrieved on Nov. 9, 2010].

* cited by examiner

CHANNEL STATE INFORMATION FEEDBACK FOR FLEXIBLE UPLINK CONTROL SIGNALING

CROSS REFERENCE

This application is a 371 national phase filing of International Application No. PCT/CN2018/091037 by WU et. al., entitled "CHANNEL STATE INFORMATION FEEDBACK FOR FLEXIBLE UPLINK CONTROL SIGNALING", filed Jun. 13, 2018, which claims priority to International Patent Application No. PCT/CN2017/088775 by WU et. al., entitled "CHANNEL STATE INFORMATION FEEDBACK FOR FLEXIBLE UPLINK CONTROL SIGNALING", filed Jun. 16, 2017, each of which is assigned to the assignee hereof.

BACKGROUND

The following relates generally to wireless communication, and more specifically to channel state information (CSI) feedback for flexible uplink control signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or New Radio (NR) system). A wireless multiple-access communications system may include a number of base stations, each simultaneously supporting communication for multiple communication devices, which may be otherwise known as user equipment (UE).

A wireless communications system may support flexible uplink control resource allocation. For example, the system may support time slots with physical uplink control channel (PUCCH) resources of varying durations and frequency bandwidths. Such flexibility may introduce timing and sizing restrictions associated with the scheduling and transmission of uplink information, such as channel state information (CSI) feedback, for example.

SUMMARY

A wireless communications system may employ channel state information (CSI) reporting techniques that efficiently utilize flexible uplink control resources. Examples include transmitting CST feedback on a single slot or on multiple slots, and using a single uplink control resource or multiple uplink control resources. In one example, the wireless system may modify CSI feedback to enable CSI reporting in a single slot (e.g., single-slot CSI reporting). For instance, a user equipment (UE) may report, in a single slot, a set of CSI feedback components (e.g., narrowband CSI feedback) for a limited number of subbands. In another example, a UE may encode all of the CSI feedback components into a single encoded packet having a predetermined size and may transmit, in a single slot, the single encoded packet over assigned uplink control resources. In another example, a UE may encode a first set of CSI feedback components (e.g., wideband CSI feedback) into a first encoded packet and a second set of CSI feedback components (e.g., narrowband CSI feedback) into a second encoded packet and may transmit, in a single slot, the first encoded packet over assigned uplink control resources before transmitting the second encoded packet over remaining uplink control resources assigned to the UE in the single slot.

In another example, the wireless system may support CSI feedback reporting across multiple slots (e.g., multi-slot CSI reporting). For instance, the wireless system may designate a first slot for transmission of a first set of CSI feedback components (e.g., wideband CSI feedback) and may designate one or more subsequent slots for transmission of a second set of CSI feedback components (e.g., narrowband CSI feedback). In some aspects, the wireless system may limit a number of sub bands for which to report the second set of CSI feedback components in one or more of the subsequent slots. In some aspects, the wireless system may utilize a triggering mechanism for multi-slot CSI reporting.

A method of wireless communication is described. The method may include identifying, in a slot, uplink control resources allocated to the UE for transmitting a channel state information (CSI) report, computing values for a first plurality of CSI feedback components of the CSI report corresponding to a frequency band, determining a size of a frequency sub-band within the frequency band based at least in part on the uplink control resources allocated to the UE, or the values of the first plurality of CSI feedback components, or both, computing values for a second plurality of CSI feedback components of the CSI report corresponding to the frequency sub-band, and transmitting, during the slot, the CSI report over the uplink control resources.

An apparatus for wireless communication is described. The apparatus may include means for identifying, in a slot, uplink control resources allocated to the UE for transmitting a CSI report, means for computing values for a first plurality of CSI feedback components of the CSI report corresponding to a frequency band, means for determining a size of a frequency sub-band within the frequency band based at least in part on the uplink control resources allocated to the UE, or the values of the first plurality of CSI feedback components, or both, means for computing values for a second plurality of CSI feedback components of the CSI report corresponding to the frequency sub-band, and means for transmitting, during the slot, the CSI report over the uplink control resources.

Another apparatus for wireless communication is described. The apparatus may include a processor, memory in electronic communication with the processor, and instructions stored in the memory. The instructions may be operable to cause the processor to identify, in a slot, uplink control resources allocated to the UE for transmitting a CSI report, compute values for a first plurality of CSI feedback components of the CSI report corresponding to a frequency band, determine a size of a frequency sub-band within the frequency band based at least in part on the uplink control resources allocated to the UE, or the values of the first plurality of CSI feedback components, or both, compute values for a second plurality of CSI feedback components of the CSI report corresponding to the frequency sub-band, and transmit, during the slot, the CSI report over the uplink control resources.

A non-transitory computer readable medium for wireless communication is described. The non-transitory computer-readable medium may include instructions operable to cause a processor to identify, in a slot, uplink control resources allocated to the UE for transmitting a CSI report, compute values for a first plurality of CSI feedback components of the CSI report corresponding to a frequency band, determine a size of a frequency sub-band within the frequency band based at least in part on the uplink control resources allocated to the UE, or the values of the first plurality of CSI feedback components, or both, compute values for a second plurality of CSI feedback components of the CSI report corresponding to the frequency sub-band, and transmit, during the slot, the CSI report over the uplink control resources.

Some examples of the method, apparatus, and non-transitory computer-readable medium described above may further include processes, features, means, or instructions for receiving configuration signaling that indicates the size of the frequency sub-band, wherein determining the size of the frequency sub-band may be based at least in part on the received configuration signaling.

Some examples of the method, apparatus, and non-transitory computer-readable medium described above may further include processes, features, means, or instructions for determining a maximum supported payload size associated with the allocated uplink resources, wherein determining the size of the frequency sub-band may be based at least in part on the maximum supported payload size.

In some examples of the method, apparatus, and non-transitory computer-readable medium described above, the size of the frequency sub-band may be determined based at least in part on a number of bits used to convey the values of the first plurality of CSI feedback components and the second plurality of CSI feedback components.

Some examples of the method, apparatus, and non-transitory computer-readable medium described above may further include processes, features, means, or instructions for sub-sampling a codebook associated with one or more of the first plurality or the second plurality of CSI feedback components.

In some examples of the method, apparatus, and non-transitory computer-readable medium described above, the first plurality of CSI feedback components includes a rank indicator (RI), a CSI-reference signal (CSI-RS) resource indicator (CRI), a wideband precoding matrix indicator (PMI), which may be referred to as PMI-1, or any combination thereof.

In some examples of the method, apparatus, and non-transitory computer-readable medium described above, the first plurality of CSI feedback components includes a RI, a CRT, a CQI, or any combination thereof.

In some examples of the method, apparatus, and non-transitory computer-readable medium described above, the second plurality of CSI feedback components includes a narrowband PMI, which may be referred to as PMI-2, a channel quality indicator (CQI), or both.

In some examples of the method, apparatus, and non-transitory computer-readable medium described above, the second plurality of CSI feedback components includes a wideband PMI, narrowband PMI, or a channel quality indicator (CQI), or any combination thereof.

In some examples of the method, apparatus, and non-transitory computer-readable medium described above, the uplink control resources include physical uplink control channel (PUCCH) resources or physical uplink shared channel (PUSCH) resources, or both.

In some examples of the method, apparatus, and non-transitory computer-readable medium described above, the CSI report may be configured for periodic, aperiodic, or semi-persistent transmission.

A method of wireless communication is described. The method may include receiving an allocation of uplink control resources for transmitting a CSI report, wherein the CSI report includes a plurality of CSI feedback components, encoding the plurality of CSI feedback components into a single encoded packet, wherein the single encoded packet includes a predetermined number of bits, and transmitting the single encoded packet over the uplink control resources during a single slot.

An apparatus for wireless communication is described. The apparatus may include means for receiving an allocation of uplink control resources for transmitting a CSI report, wherein the CSI report includes a plurality of CSI feedback components, means for encoding the plurality of CSI feedback components into a single encoded packet, wherein the single encoded packet includes a predetermined number of bits, and means for transmitting the single encoded packet over the uplink control resources during a single slot.

Another apparatus for wireless communication is described. The apparatus may include a processor, memory in electronic communication with the processor, and instructions stored in the memory. The instructions may be operable to cause the processor to receive an allocation of uplink control resources for transmitting a CSI report, wherein the CSI report includes a plurality of CSI feedback components, encode the plurality of CSI feedback components into a single encoded packet, wherein the single encoded packet includes a predetermined number of bits, and transmit the single encoded packet over the uplink control resources during a single slot.

A non-transitory computer readable medium for wireless communication is described. The non-transitory computer-readable medium may include instructions operable to cause a processor to receive an allocation of uplink control resources for transmitting a CSI report, wherein the CSI report includes a plurality of CSI feedback components, encode the plurality of CSI feedback components into a single encoded packet, wherein the single encoded packet includes a predetermined number of bits, and transmit the single encoded packet over the uplink control resources during a single slot.

Some examples of the method, apparatus, and non-transitory computer-readable medium described above may further include processes, features, means, or instructions for sub-sampling a codebook associated with one or more of the plurality of CSI feedback components to reduce a number of bits used to convey the single encoded packet to the predetermined number of bits.

Some examples of the method, apparatus, and non-transitory computer-readable medium described above may further include processes, features, means, or instructions for inserting one or more padding bits to the single encoded packet to increase a number of bits used to convey the single encoded packet to the predetermined number of bits.

In some examples of the method, apparatus, and non-transitory computer-readable medium described above, the one or more padding bits may be inserted at an end of the single encoded packet.

Some examples of the method, apparatus, and non-transitory computer-readable medium described above may further include processes, features, means, or instructions for prioritizing an encoding order of the plurality of CSI feedback components within the single encoded packet based at least in part on a reliability of bits associated with the encoding order.

A method of wireless communication is described. The method may include identifying uplink control resources allocated to the UE for transmitting a CSI report, wherein the CSI report includes a first plurality of CSI feedback components and a second plurality of CSI feedback components, identifying a subset of uplink control resource configurations corresponding to the identified uplink control resources from a set of uplink control resource configurations, encoding the first plurality of CSI feedback components into a first encoded packet and the second plurality of CSI feedback components into a second encoded packet based at least in part on the identified subset of uplink control resource configurations, mapping the first encoded packet and the second encoded packet to the identified uplink control resources based at least in part on the identified subset of uplink control resource configurations, and transmitting the first encoded packet and the second encoded packet on the identified uplink control resources according to the mapping.

An apparatus for wireless communication is described. The apparatus may include means for identifying uplink control resources allocated to the UE for transmitting a CSI report, wherein the CSI report includes a first plurality of CSI feedback components and a second plurality of CSI feedback components, means for identifying a subset of uplink control resource configurations corresponding to the identified uplink control resources from a set of uplink control resource configurations, means for encoding the first plurality of CSI feedback components into a first encoded packet and the second plurality of CSI feedback components into a second encoded packet based at least in part on the identified subset of uplink control resource configurations, means for mapping the first encoded packet and the second encoded packet to the identified uplink control resources based at least in part on the identified subset of uplink control resource configurations, and means for transmitting the first encoded packet and the second encoded packet on the identified uplink control resources according to the mapping.

Another apparatus for wireless communication is described. The apparatus may include a processor, memory in electronic communication with the processor, and instructions stored in the memory. The instructions may be operable to cause the processor to identify uplink control resources allocated to the UE for transmitting a CSI report, wherein the CSI report includes a first plurality of CSI feedback components and a second plurality of CSI feedback components, identify a subset of uplink control resource configurations corresponding to the identified uplink control resources from a set of uplink control resource configurations, encode the first plurality of CSI feedback components into a first encoded packet and the second plurality of CSI feedback components into a second encoded packet based at least in part on the identified subset of uplink control resource configurations, map the first encoded packet and the second encoded packet to the identified uplink control resources based at least in part on the identified subset of uplink control resource configurations, and transmit the first encoded packet and the second encoded packet on the identified uplink control resources according to the mapping.

A non-transitory computer readable medium for wireless communication is described. The non-transitory computer-readable medium may include instructions operable to cause a processor to identify uplink control resources allocated to the UE for transmitting a CSI report, wherein the CSI report includes a first plurality of CSI feedback components and a second plurality of CSI feedback components, identify a subset of uplink control resource configurations corresponding to the identified uplink control resources from a set of uplink control resource configurations, encode the first plurality of CSI feedback components into a first encoded packet and the second plurality of CSI feedback components into a second encoded packet based at least in part on the identified subset of uplink control resource configurations, map the first encoded packet and the second encoded packet to the identified uplink control resources based at least in part on the identified subset of uplink control resource configurations, and transmit the first encoded packet and the second encoded packet on the identified uplink control resources according to the mapping.

In some examples of the method, apparatus, and non-transitory computer-readable medium described above, the identified subset of uplink control resource configurations includes a number of discrete resources from which the identified uplink control resources may be included.

Some examples of the method, apparatus, and non-transitory computer-readable medium described above may further include processes, features, means, or instructions for determining that the identified uplink control resources includes a single discrete resource. Some examples of the method, apparatus, and non-transitory computer-readable medium described above may further include processes, features, means, or instructions for mapping the first encoded packet and the second encoded packet within the single discrete resource.

Some examples of the method, apparatus, and non-transitory computer-readable medium described above may further include processes, features, means, or instructions for determining that the identified uplink control resources includes a plurality of discrete resources. Some examples of the method, apparatus, and non-transitory computer-readable medium described above may further include processes, features, means, or instructions for mapping the first encoded packet to a first discrete resource of the plurality of discrete resources and the second encoded packet to a second discrete resource of the plurality of discrete resources.

Some examples of the method, apparatus, and non-transitory computer-readable medium described above may further include processes, features, means, or instructions for receiving control signaling indicating an index for the plurality of discrete resources, wherein mapping the first encoded packet to the first discrete resource and the second encoded packet to the second discrete resource may be based at least in part on the index.

In some examples of the method, apparatus, and non-transitory computer-readable medium described above, the identified subset of uplink control resource configurations includes a relative duration of the identified uplink control resources relative to a slot duration.

In some examples of the method, apparatus, and non-transitory computer-readable medium described above, the first plurality of CSI feedback components correspond to a first frequency band and the second plurality of CSI feedback components correspond to a frequency sub-band within the frequency band.

In some examples of the method, apparatus, and non-transitory computer-readable medium described above, the first encoded packet includes a RI, a CRI, a CQI, or any combination thereof, and the second encoded packet includes a wideband PMI, a narrowband PMI, a CQI, or any combination thereof.

In some examples of the method, apparatus, and non-transitory computer-readable medium described above, the first encoded packet includes a RI, a CRI, a wideband PMI, or any combination thereof, and the second encoded packet includes a narrowband PMI, or a CQI, or both.

A method of wireless communication is described. The method may include receiving configuration signaling associated with transmitting a CSI report, wherein the CSI report includes a first plurality of CSI feedback components and a second plurality of CSI feedback components, identifying, in a first slot, first uplink control resources allocated to the UE, and in at least one subsequent slot, second uplink control resources allocated to the UE, transmitting, during the first slot, the first plurality of CSI feedback components based at least in part on the received configuration signaling, wherein the first plurality of CSI feedback components correspond to a frequency band, and transmitting, during the at least one subsequent slot, the second plurality of CSI feedback components based at least in part on the received configuration signaling, wherein the second plurality of CSI feedback components correspond to a frequency sub-band within the frequency band.

1 An apparatus for wireless communication is described. The apparatus may include means for receiving configuration signaling associated with transmitting a CSI report, wherein the CSI report includes a first plurality of CSI feedback components and a second plurality of CSI feedback components, means for identifying, in a first slot, first uplink control resources allocated to the UE, and in at least one subsequent slot, second uplink control resources allocated to the UE, means for transmitting, during the first slot, the first plurality of CSI feedback components based at least in part on the received configuration signaling, wherein the first plurality of CSI feedback components correspond to a frequency band, and means for transmitting, during the at least one subsequent slot, the second plurality of CSI feedback components based at least in part on the received configuration signaling, wherein the second plurality of CSI feedback components correspond to a frequency sub-band within the frequency band.

Another apparatus for wireless communication is described. The apparatus may include a processor, memory in electronic communication with the processor, and instructions stored in the memory. The instructions may be operable to cause the processor to receive configuration signaling associated with transmitting a CSI report, wherein the CSI report includes a first plurality of CSI feedback components and a second plurality of CSI feedback components, identify, in a first slot, first uplink control resources allocated to the UE, and in at least one subsequent slot, second uplink control resources allocated to the UE, transmit, during the first slot, the first plurality of CSI feedback components based at least in part on the received configuration signaling, wherein the first plurality of CSI feedback components correspond to a frequency band, and transmit, during the at least one subsequent slot, the second plurality of CSI feedback components based at least in part on the received configuration signaling, wherein the second plurality of CSI feedback components correspond to a frequency sub-band within the frequency band.

A non-transitory computer readable medium for wireless communication is described. The non-transitory computer-readable medium may include instructions operable to cause a processor to receive configuration signaling associated with transmitting a CSI report, wherein the CSI report includes a first plurality of CSI feedback components and a second plurality of CSI feedback components, identify, in a first slot, first uplink control resources allocated to the UE, and in at least one subsequent slot, second uplink control resources allocated to the UE, transmit, during the first slot, the first plurality of CSI feedback components based at least in part on the received configuration signaling, wherein the first plurality of CSI feedback components correspond to a frequency band, and transmit, during the at least one subsequent slot, the second plurality of CSI feedback components based at least in part on the received configuration signaling, wherein the second plurality of CSI feedback components correspond to a frequency sub-band within the frequency band.

In some examples of the method, apparatus, and non-transitory computer-readable medium described above, the second plurality of CSI feedback components may be transmitted over a plurality of subsequent slots, and wherein a number of the plurality of subsequent slots may be based at least in part on a size of the identified second uplink control resources.

In some examples of the method, apparatus, and non-transitory computer-readable medium described above, the first uplink control resources include a duration that may be greater than a duration of the second uplink control resources.

In some examples of the method, apparatus, and non-transitory computer-readable medium described above, the first uplink control resources include a duration that may be less than a duration of the second uplink control resources.

In some examples of the method, apparatus, and non-transitory computer-readable medium described above, the first uplink control resources include a duration that may be equal to a duration of the second uplink control resources.

In some examples of the method, apparatus, and non-transitory computer-readable medium described above, the configuration signaling indicates a periodicity associated with the first uplink control resources, or the second uplink control resources, or both.

Some examples of the method, apparatus, and non-transitory computer-readable medium described above may further include processes, features, means, or instructions for receiving a trigger signaling that triggers the UE to prepare the CSI report prior to the UE identifying the first uplink control resources and the second uplink control resources.

Some examples of the method, apparatus, and non-transitory computer-readable medium described above may further include processes, features, means, or instructions for transmitting an acknowledgement frame in response to receiving the trigger signaling.

Some examples of the method, apparatus, and non-transitory computer-readable medium described above may further include processes, features, means, or instructions for identifying a time period after transmission of the acknowledgment frame, wherein the first plurality of CSI feedback components may be transmitted after the time period may have expired.

In some examples of the method, apparatus, and non-transitory computer-readable medium described above, the time period may be indicated in the received configuration signaling.

In some examples of the method, apparatus, and non-transitory computer-readable medium described above, a periodicity of transmitting the CSI report may be based at least in part on a sum of a number of slots allocated to transmit the first plurality of CSI feedback components and a number of slots allocated to transmit the second plurality of CSI feedback components.

A method of wireless communication is described. The method may include allocating, to a UE, uplink control resources for transmitting a CSI report in a slot, wherein the CSI report includes a first plurality of CSI feedback components corresponding to a frequency band and a second plurality of CSI feedback components corresponding to a frequency sub-band within the frequency band, transmitting, to the UE, configuration signaling that indicates a size of the frequency sub-band, wherein the size of the frequency sub-band is based at least in part on the uplink control resources allocated to the UE, and receiving, during the slot, the CSI report over the uplink control resources.

An apparatus for wireless communication is described. The apparatus may include means for allocating, to a UE, uplink control resources for transmitting a CSI report in a slot, wherein the CSI report includes a first plurality of CSI feedback components corresponding to a frequency band and a second plurality of CSI feedback components corresponding to a frequency sub-band within the frequency band, means for transmitting, to the UE, configuration signaling that indicates a size of the frequency sub-band, wherein the size of the frequency sub-band is based at least in part on the uplink control resources allocated to the UE, and means for receiving, during the slot, the CSI report over the uplink control resources.

Another apparatus for wireless communication is described. The apparatus may include a processor, memory in electronic communication with the processor, and instructions stored in the memory. The instructions may be operable to cause the processor to allocate, to a UE, uplink control resources for transmitting a CSI report in a slot, wherein the CSI report includes a first plurality of CSI feedback components corresponding to a frequency band and a second plurality of CSI feedback components corresponding to a frequency sub-band within the frequency band, transmit, to the UE, configuration signaling that indicates a size of the frequency sub-band, wherein the size of the frequency sub-band is based at least in part on the uplink control resources allocated to the UE, and receive, during the slot, the CSI report over the uplink control resources.

A non-transitory computer readable medium for wireless communication is described. The non-transitory computer-readable medium may include instructions operable to cause a processor to allocate, to a UE, uplink control resources for transmitting a CSI report in a slot, wherein the CSI report includes a first plurality of CSI feedback components corresponding to a frequency band and a second plurality of CSI feedback components corresponding to a frequency sub-band within the frequency band, transmit, to the UE, configuration signaling that indicates a size of the frequency sub-band, wherein the size of the frequency sub-band is based at least in part on the uplink control resources allocated to the UE, and receive, during the slot, the CSI report over the uplink control resources.

A method of wireless communication is described. The method may include allocating, to a UE, uplink control resources for transmitting a CSI report in a slot, wherein the CSI report includes a plurality of CSI feedback components, receiving, from the UE, a single encoded packet comprising the plurality of CST feedback components over the uplink control resources, wherein the single encoded packet includes a predetermined number of bits, and decoding the single encoded packet.

An apparatus for wireless communication is described. The apparatus may include means for allocating, to a UE, uplink control resources for transmitting a CSI report in a slot, wherein the CSI report includes a plurality of CSI feedback components, means for receiving, from the UE, a single encoded packet comprising the plurality of CSI feedback components over the uplink control resources, wherein the single encoded packet includes a predetermined number of bits, and means for decoding the single encoded packet.

Another apparatus for wireless communication is described. The apparatus may include a processor, memory in electronic communication with the processor, and instructions stored in the memory. The instructions may be operable to cause the processor to allocate, to a UE, uplink control resources for transmitting a CSI report in a slot, wherein the CSI report includes a plurality of CSI feedback components, receive, from the UE, a single encoded packet comprising the plurality of CSI feedback components over the uplink control resources, wherein the single encoded packet includes a predetermined number of bits, and decode the single encoded packet.

A non-transitory computer readable medium for wireless communication is described. The non-transitory computer-readable medium may include instructions operable to cause a processor to allocate, to a UE, uplink control resources for transmitting a CSI report in a slot, wherein the CSI report includes a plurality of CSI feedback components, receive, from the UE, a single encoded packet comprising the plurality of CSI feedback components over the uplink control resources, wherein the single encoded packet includes a predetermined number of bits, and decode the single encoded packet.

In some examples of the method, apparatus, and non-transitory computer-readable medium described above, decoding the single encoded packet includes: decoding the single encoded packet a first time based at least in part on the predetermined number of bits. Some examples of the method, apparatus, and non-transitory computer-readable medium described above may further include processes, features, means, or instructions for updating a size of a rank indicator (RI) feedback component based at least in part on the first decoding.

In some examples of the method, apparatus, and non-transitory computer-readable medium described above, decoding the single encoded packet includes: decoding the single encoded packet a second time based at least in part on the updated size of the RI feedback component. Some examples of the method, apparatus, and non-transitory computer-readable medium described above may further include processes, features, means, or instructions for updating a size of a PMI feedback component and a size of a CQI feedback component based at least in part on the second decoding.

In some examples of the method, apparatus, and non-transitory computer-readable medium described above, decoding the single encoded packet includes: decoding the single encoded packet a third time based at least in part on the updated size of the PMI feedback component and the updated size of the CQI feedback component.

A method of wireless communication is described. The method may include transmitting, to a UE, configuration signaling associated with transmitting a CSI report, wherein the CSI report includes a first plurality of CSI feedback components and a second plurality of CSI feedback components, identifying, in a first slot, first uplink control resources allocated to the UE, and in at least one subsequent slot, second uplink control resources allocated to the UE, receiving, during the first slot, the first plurality of CSI feedback components based at least in part on the transmitted configuration signaling, wherein the first plurality of CSI feedback components correspond to a frequency band, and receiving, during the at least one subsequent slot, the second plurality of CSI feedback components based at least in part on the transmitted configuration signaling, wherein the second plurality of CSI feedback components correspond to a frequency sub-band within the frequency band.

An apparatus for wireless communication is described. The apparatus may include means for transmitting, to a UE, configuration signaling associated with transmitting a CSI report, wherein the CSI report includes a first plurality of CSI feedback components and a second plurality of CSI feedback components, means for identifying, in a first slot, first uplink control resources allocated to the UE, and in at least one subsequent slot, second uplink control resources allocated to the UE, means for receiving, during the first slot, the first plurality of CSI feedback components based at least in part on the transmitted configuration signaling, wherein the first plurality of CSI feedback components correspond to a frequency band, and means for receiving, during the at least one subsequent slot, the second plurality of CSI feedback components based at least in part on the transmitted configuration signaling, wherein the second plurality of CSI feedback components correspond to a frequency sub-band within the frequency band.

Another apparatus for wireless communication is described. The apparatus may include a processor, memory in electronic communication with the processor, and instructions stored in the memory. The instructions may be operable to cause the processor to transmit, to a UE, configuration signaling associated with transmitting a CSI report, wherein the CSI report includes a first plurality of CSI feedback components and a second plurality of CSI feedback components, identify, in a first slot, first uplink control resources allocated to the UE, and in at least one subsequent slot, second uplink control resources allocated to the UE, receive, during the first slot, the first plurality of CSI feedback components based at least in part on the transmitted configuration signaling, wherein the first plurality of CSI feedback components correspond to a frequency band, and receive, during the at least one subsequent slot, the second plurality of CSI feedback components based at least in part on the transmitted configuration signaling, wherein the second plurality of CSI feedback components correspond to a frequency sub-band within the frequency band.

A non-transitory computer readable medium for wireless communication is described. The non-transitory computer-readable medium may include instructions operable to cause a processor to transmit, to a UE, configuration signaling associated with transmitting a CSI report, wherein the CSI report includes a first plurality of CSI feedback components and a second plurality of CSI feedback components, identify, in a first slot, first uplink control resources allocated to the UE, and in at least one subsequent slot, second uplink control resources allocated to the UE, receive, during the first slot, the first plurality of CSI feedback components based at least in part on the transmitted configuration signaling, wherein the first plurality of CSI feedback components correspond to a frequency band, and receive, during the at least one subsequent slot, the second plurality of CSI feedback components based at least in part on the transmitted configuration signaling, wherein the second plurality of CSI feedback components correspond to a frequency sub-band within the frequency band.

Some examples of the method, apparatus, and non-transitory computer-readable medium described above may further include processes, features, means, or instructions for transmitting a trigger signaling that triggers the UE to prepare the CSI report.

Some examples of the method, apparatus, and non-transitory computer-readable medium described above may further include processes, features, means, or instructions for receiving an acknowledgement frame based at least in part on the trigger signaling.

Some examples of the method, apparatus, and non-transitory computer-readable medium described above may further include processes, features, means, or instructions for identifying a time period after reception of the acknowledgment frame, wherein the first plurality of CSI feedback components may be received after the time period may have expired.

DETAILED DESCRIPTION

Figure 1:
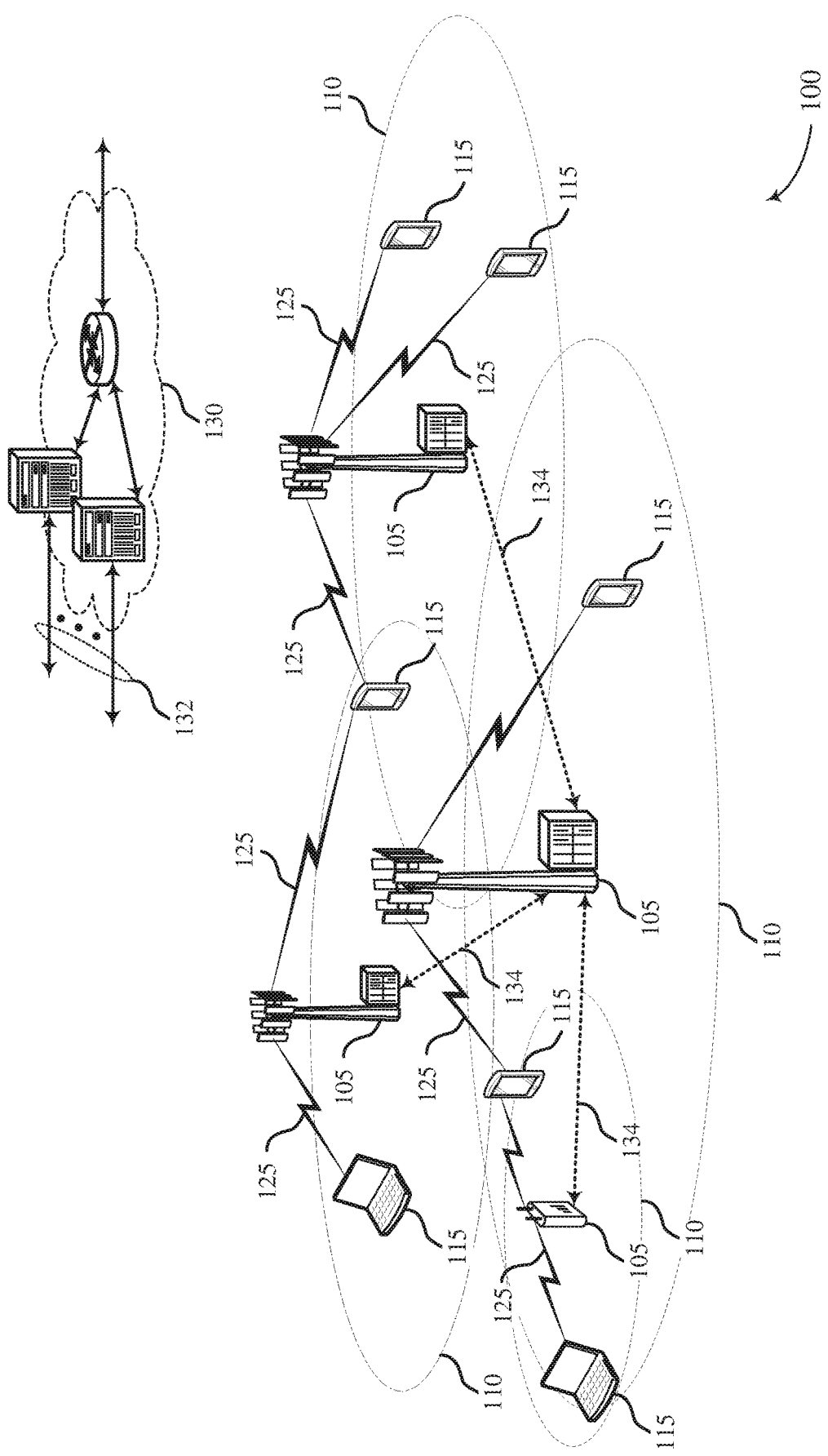
FIG. 1 illustrates an example of a wireless communications system that supports channel state information (CSI) feedback for flexible uplink control signaling in accordance with various aspects of the present disclosure.

A wireless communications system (e.g., a Long Term Evolution (LTE) or New Radio (NR) system) may utilize flexible uplink resource allocation to convey uplink data and uplink control information (UCI). For example, a time slot may include a relatively long uplink control resource, such as a physical uplink control channel (PUCCH) resource, with respect to the duration of the slot (e.g., a long PUCCH resource), while another slot may include a relatively short PUCCH resource (e.g., a short PUCCH resource). Such flexibility may introduce timing and frequency bandwidth restrictions associated with the scheduling and transmission of uplink information, such as the transmission of channel state information (CSI) feedback. To efficiently schedule and transmit CSI feedback utilizing such flexible uplink resources, a wireless communications system may utilize techniques for reducing the overhead associated with transmitting CSI feedback, or may utilize techniques for mapping CSI feedback to uplink resources, using either a single or multiple packets, over a single or multiple slots.

In one example, a user equipment (UE) may generate a CSI report to be transmitted in a single slot. For instance, the UE may generate a CSI report so that it can be transmitted in either a short PUCCH or a long PUCCH in a slot. In some aspects, the UE may limit the reporting of certain CSI feedback components—e.g., a narrowband precoding matrix indicator (PMI) and a channel quality indicator (CQI)—to a limited number of subbands, as opposed to all of the subbands in a frequency band, to reduce the size of the CSI report. In some aspects, the number of subbands is based on an indication received from a base station or is calculated by the UE based on a maximum payload size supported by a PUCCH resource in a slot.

In another example, a UE may encode a CSI report as a single encoded packet. In some aspects, the UE may encode higher priority CSI feedback components to higher reliability bits in the single encoded packet. In some aspects, the UE may increase (e.g., by padding) or decrease (e.g., by codebook subsampling), the size of (or number of bits used to represent) certain CSI feedback components so that the single encoded packet is a consistent or predetermined size. In some aspects, the predetermined size is within a maximum payload size for a PUCCH resource. A base station that receives the single encoded packet may decode the encoded packet according to an iterative process.

In another example, a UE may encode a CSI report as a first encoded packet carrying a first set of CSI feedback components—e.g., wideband components such as a CSI-reference signal (CSI-RS) resource indicator (CRI), layer indicator (LI), a rank indicator (RI), or a wideband PMI—and as a second encoded packet carrying a second set of CSI feedback components—e.g., narrowband components such as narrowband PMI and CQI. As above, the first and second encoded packets may have a set or predetermined size. A base station that receives the first and second encoded packets may decode the first and second encoded packets according to an iterative process.

In another example, a UE may transmit a CSI report across multiple slots. In some aspects, the UE may be periodically scheduled multiple slots for CSI reporting. In some aspects, a first slot of the multiple slots is used for reporting CSI feedback components of a first type—e.g., wideband components such as CRI, LI, RI, or PMI-1—and the remaining slots are used for reporting CSI feedback components of a second type—e.g., narrowband components such as PMI-2 and CQI. In some aspects, the second type of CSI feedback components transmitted in the remaining slots are transmitted for a fixed number of subbands. In some examples, the fixed number of subbands may be indicated by a base station. In other aspects, the second type of CSI feedback components transmitted in the remaining slot are transmitted for a calculated number of subbands. In some examples, the calculated number of subbands may be calculated based on the maximum payload supported by a PUCCH resource in the slots. In some aspects, the UE is triggered to transmit a CSI report. In some aspects, the UE reports CSI feedback components of a first type—e.g., wideband components such as CRI, LI, RI, or PMI-1—in the first slot after a time delay has passed. In such examples, the UE reports CSI feedback components of a second type—e.g., narrowband components such as PMI-2 and CQI—for a number of subbands in PUCCH resources of subsequent slots until the second type of CSI feedback components has been reported for all of the subbands in a frequency band.

Any of the techniques discussed above may be used alone or in any combination with one another. Features of the disclosure introduced above are further described below in the context of a wireless communications system. Specific examples are then described of an example process flow for CSI feedback for flexible uplink control signaling. These and other features of the disclosure are further illustrated by and described with reference to apparatus diagrams, system diagrams, and flowcharts that relate to CSI feedback for flexible uplink control signaling.

FIG. 1 illustrates an example of a wireless communications system 100 in accordance with various aspects of the present disclosure. The wireless communications system 100 includes base stations 105 (e.g., gNodeBs (gNBs)), UEs 115, and a core network 130. In some examples, the wireless communications system 100 may be a Long Term Evolution (LTE), LTE-Advanced (LTE-A) network, or a New Radio (NR) network. In some aspects, wireless communications system 100 may support enhanced broadband communications, ultra-reliable (i.e., mission critical) communications, low latency communications, and communications with low-cost and low-complexity devices. The wireless communications system 100 may support flexible uplink resource allocation and techniques for scheduling, mapping, and transmitting CSI feedback on those flexible uplink resources. As described in more detail below, the wireless communications system 100 may support reducing the overhead associated with CSI feedback, encoding CSI feedback into single or multiple packets, mapping components of CSI feedback to various uplink resources, transmitting CSI feedback components over a single or multiple slots, or any combination of these techniques.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some aspects, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some aspects, this may facilitate use of antenna arrays within a UE 115 (e.g., for directional beamforming). However, EHF transmissions may be subject to even greater atmospheric attenuation and shorter range than UHF transmissions.

Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Wireless communications system 100 may utilize different transmission techniques, such as multiple-input multiple-output (MIMO) transmissions, to increase the capacity of a wireless channel. MIMO transmissions are associated with a transmission scheme between a transmitter (e.g., a base station 105) and a receiver (e.g., a UE 115), where both transmitter and receiver are equipped with multiple antennas. Wireless communications system 100 may also use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some aspects, the antennas of a base station 105 or UE 115 may be located within one or more antenna arrays, which may support beamforming or MIMO operation. One or more base station antennas or antenna arrays may be collocated at an antenna assembly, such as an antenna tower. In some aspects, antennas or antenna arrays associated with a base station 105 may be located in diverse geographic locations. A base station 105 may multiple use antennas or antenna arrays to conduct beamforming operations for directional communications with a UE 115.

Wireless communications system 100 may use fixed timing intervals and designated frequency locations to facilitate organizing and scheduling transmissions. Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some aspects the subframe may be the smallest scheduling unit, also known as a TTI. In other aspects, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may schedule the above resources to support both uplink and downlink transmissions. For instance, wireless communications system 100 may allocate a first set of resources to downlink transmission and a second set of resources to uplink transmissions. If wireless communications system 100 utilizes frequency division duplexing (FDD) for communications, then uplink and downlink transmissions may occur simultaneously. That is, wireless communications system 100 may allocate a first set of frequencies to uplink transmissions and a second set of frequencies to downlink transmissions. If wireless communications system 100 utilizes time division duplexing (TDD) for communications, then uplink and downlink transmissions may not occur simultaneously. That is, wireless communications system 100 may allocate all of the frequency resources to downlink transmissions during a first interval (e.g., one or more subframes) and may allocate all of the frequency resources to uplink transmissions during a second interval (e.g., a subsequent subframe). Wireless communications system 100 may also use a combination of FDD and TDD techniques.

The resources allocated to uplink transmissions may be further partitioned into control and data resources. The resources that carry uplink transmissions of control information may be denoted as the PUCCH, while the resources that carry uplink transmissions of data may be denoted as the physical uplink shared channel (PUSCH). The wireless communications system 100 may schedule uplink control and data transmissions in a same slot used for downlink transmissions.

A UE 115 may transmit data and control information to a base station 105. For instance, a UE 115 may transmit CSI feedback information to a base station 105. The CSI may include multiple feedback components including a CRI, LI, RI, a PMI (e.g., PMI-1 and PMI-2), a CQI, or some combination of these components. The UE 115 may use the CRI component to indicate which CSI-RS resource is used for the corresponding RI/PMI/CQI measurements (i.e., which transmission beam of multiple beamformed transmissions is preferred). The UE 115 may use the LI component to indicate a preferred layer for single-user MIMO (SU-MIMO). The CRI and LI components may be optionally transmitted—e.g., based on whether the UE 115 is configured to report these components. The UE 115 may use the RI component to recommend a number of transmission layers (i.e., the rank) for the base station 105 to use in subsequent transmissions based on the signal/interference to noise (SINR) of a previous transmission received at the UE 115. The size of the RI component is based on the number of transmit layers used by the base station 105. For instance, if the UE 115 uses two transmit layers, then the UE 115 indicates the rank using one bit, and if the base station 105 uses four layers, then the UE indicates the rank using two bits. In an example where a UE 115 is capable of using two transmit layers, the UE 115 indicates rank 1 (e.g., by sending a bit 0) if the channel conditions associated with receiving two layers are poor and indicates rank 2 (e.g., by sending a bit 1) if the channel conditions associated with receiving two layer are adequate. Base station 105 may perform subsequent transmissions using a single transmit layer if rank 1 is indicated and may schedule multiple transmission layers if rank 2 is indicated.

The UE 115 may use the PMI component to signal preferred weights to be applied by the base station 105 during the precoding process, where the signaled weights may increase the S/N ratio of transmissions received at the UE 115. The PMI component may be separated into two sub-components: PMI-1 and PMI-2. PMI-1 may be associated with channel conditions of the full frequency band and/or long-term channel conditions, while PMI-2 may be associated with channel conditions of fixed frequency subbands and/or short-term channel conditions. In some aspects, PMI-2 may be reported per fixed frequency subband. Thus, the size of the PMI-2 component may be proportional to the number of fixed frequency subbands within the frequency band used for downlink transmissions to the UE.

Typically, the UE 115 and the base station 105 agree on a codebook that includes preferred precoding matrices for downlink transmissions. In some aspects, the codebook includes a long-term sub-codebook, associated with relatively slow changes in channel conditions, and a short-term sub-codebook, associated with channel conditions that change at an increased rate. Oftentimes, the precoding matrix codebook is defined per rank (e.g., rank 1 is associated with a first codebook, rank 2 is associated with a second codebook, and so on). Moreover, the number of bits used to convey different precoding matrices is often different based on the codebook used. Thus, the size of both PMI component may further vary based on the rank selected by the UE 115. In order to reduce PMI feedback, a UE 115 may use sub-sampled codebooks, which include a subset of the precoding matrices available in a full codebook.

The UE 115 may use the CQI component to signal channel quality information to the base station 105, and the base station 105 may use the information in the CQI component to select a modulation and coding scheme (MCS) for subsequent transmissions. Similar to the PMI-2 components, CQI may be reported per fixed frequency subband. Thus, the size of the CQI component may be proportional to the number of fixed frequency subbands within the frequency band used for downlink transmissions to the UE The CSI may be reported, by the UE 115, either periodically or aperiodically. For example, for periodic CSI reporting, a base station 105 may direct a UE 115 to report CSI according to a specified interval. In some aspects, the specified interval is unique in either the time or frequency domain from intervals specified to other UEs 115 within the coverage area. The base station 105 may expect a response from the UE 115 during the specified interval using specified resources and correlate information received during that interval with the scheduled UE 115. That is, the base station 105 may identify a UE 115 based on the time and frequency resources used to convey the CSI report. In some aspects, the periodic CSI may be reported using PUCCH resources.

For aperiodic reporting, a base station 105 may send a trigger to the UE 115 that triggers the UE 115 to report CSI. After receiving the trigger, the UE 115 may transmit the CSI to the base station 105. In some aspects, the aperiodic CSI report may be transmitted using PUSCH resources, and a base station 105 may receive the CSI report over the scheduled resources. After receiving the CSI report, the base station 105 decodes the CSI report. To decode the full CSI report, the base station 105 first decodes the RI since the PMI is based on the size of the RI. And once the RI has been decoded, the base station may decode the PMI and CQI fields.

As mentioned above, the wireless communications system 100 may schedule both uplink and downlink communications in a single slot. Thus, a single slot may include a PDCCH, a PDSCH, a PUCCH, and a PUSCH. Moreover, the wireless communications system 100 may use multiple slot configurations (e.g., DL-centric slots and UL-centric slots) with different PUCCH resource allocations (e.g., short PUCCH, long PUCCH, or long+short PUCCH).

Wireless communications system 100 may use enhanced CSI reporting techniques to support CSI reporting over the such flexible and varying uplink resources. In one example, the wireless system may modify CSI feedback to enable CSI reporting in a single slot. For instance, a UE 115 may report, in a single slot, a set of CSI feedback components for a limited number or for a limited size of subbands. In another example, a UE 115 may encode all of the CSI feedback components into a single encoded packet having a predetermined size and may transmit, in a single slot, the single encoded packet over assigned uplink control resources. In another example, a UE 115 may encode a first set of CSI feedback components into a first encoded packet and a second set of CSI feedback components into a second encoded packet and may transmit, in a single slot, the first encoded packet over assigned uplink control resources before transmitting the second encoded packet over remaining uplink control resources assigned to the UE in the single slot.

In another example, the wireless communications system 100 may support CSI feedback reporting across multiple slots. For instance, the wireless communications system 100 may designate a first slot for transmission of a first set of CSI feedback components and may designate one or more subsequent slots for transmission of a second set of CSI feedback components. In some aspects, the wireless communications system 100 may limit a number of subbands for which to report the second set of CSI feedback components in one or more of the subsequent slots. In some aspects, the wireless communications system 100 may utilize a triggering mechanism for multi-slot CSI reporting.

Figure 2:
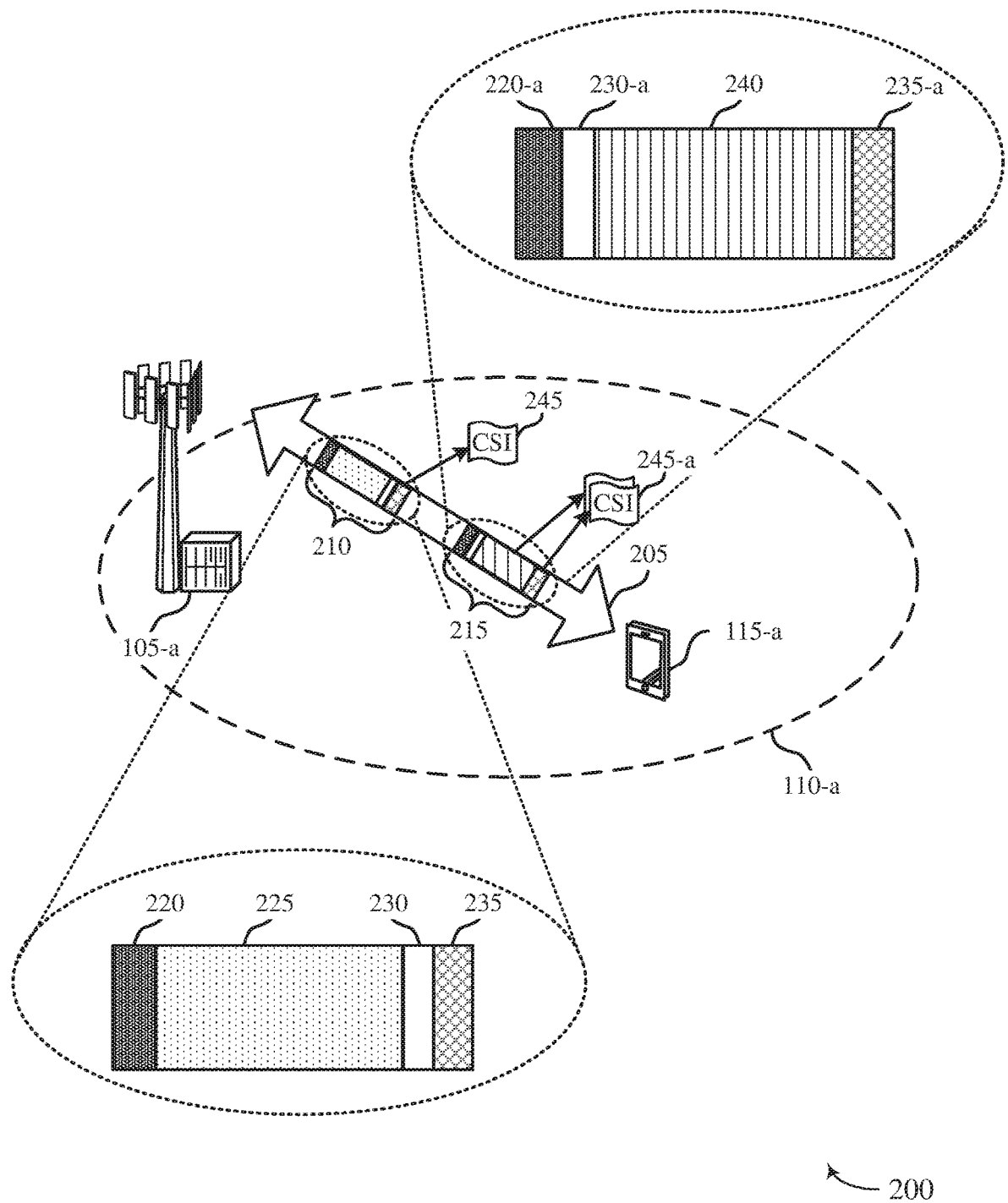
FIG. 2 illustrates an example of a wireless communications subsystem that supports CSI feedback for flexible uplink control signaling in accordance with various aspects of the present disclosure.

FIG. 2 illustrates an example of a wireless communications subsystem 200 that supports CSI feedback for flexible uplink control signaling in accordance with various aspects of the present disclosure. Wireless communications subsystem 200 may include UEs, such as UE 115-a, and base stations, such as base station 105-a. UE 115-a and base station 105-a may be examples of a UE 115 or a base station 105 and may communicate with one another as described above with reference to FIG. 1.

UE 115-a and base station 105-a may communicate with one another over bi-directional link 205. In some examples, UE 115-a and base station 105-a may perform both uplink and downlink transmissions within a single slot, such as DL-centric slot 210 and UL-centric slot 215. Both DL-centric slot 210 and UL-centric slot 215 may span a fixed time duration and may span across all or part of a frequency band. DL-centric slot 210 may include PDCCH 220, PDSCH 225, gap 230, and short PUCCH 235. Transmission resources (e.g., resource elements) included in PDCCH 220 may be allocated to downlink transmissions of control information by base station 105-a to one or more UEs, which may include UE 115-a. Transmission resources included in PDSCH 225 may be allocated to downlink transmissions of data by base station 105-a to one or more UEs, which may include UE 115-a. Transmission resources included in gap 230 may be left unused to provide a UE, such as UE 115-a, time to transition from a receiving mode to a transmitting mode. And transmission resources included in short PUCCH may be allocated to uplink transmissions of control information by one or more UEs, which may include UE 115-a. UL-centric slot 215 may similarly include PDCCH 220-a, gap 230-a, and short PUCCH 235-a. UL-centric slot 215 may also include long PUCCH/PUSCH 240. Transmission resources included in long PUCCH/PUSCH 240 may be allocated to uplink transmission of both data and control information.

UE 115-a may report channel conditions in a CSI report (e.g., CSI report 245) to base station 105-a using a short PUCCH of a DL-centric slot (e.g., short PUCCH 235 of DL-centric slot 210), and/or a long or short PUCCH of an UL-centric slot (e.g., short PUCCH 235-a or long PUCCH/PUSCH 240 of UL-centric slot 215). Base station 105-a may use the information in the feedback components of the CSI report 245 to adapt subsequent transmissions to UE 115-a. The CSI report may include multiple CSI feedback components including: CRI, LI, RI, PMI-1, PMI-2, and/or CQI. A subset of the CSI feedback components (or "wideband CSI feedback"), such as CRI, LI, RI, and PMI-1, may be used to report channel conditions for a wide frequency range (e.g., a frequency band) and/or long-term channel conditions. As discussed above, CRI and LI feedback may be optional, a size of the RI feedback may vary based on how many transmission layers are supported by a UE, and a size of PMI-1 may be based on the value of the RI feedback component. Thus, the size of the CSI report may fluctuate based on a configuration of UE 115-a.

Another subset of the CSI feedback components (or "narrowband CSI feedback"), such as PMI-2 and CQI, may be used to report channel conditions for narrow frequency ranges (e.g., a frequency subband) and/or short-term channel conditions. In some aspects, PMI-2 and CQI may be transmitted per frequency subband of a larger frequency band. Thus, the size of the CSI report may vary based on the number of frequency subbands for which UE 115-a transmits narrowband CSI feedback. In some aspects, base station 105-a may configure UE 115-a to transmit CSI reports 245 on a periodic basis (e.g., according to a set interval) in designated resources. In other aspects, UE 115-a may transmit CSI reports 245 on semi-persistent basis. That is, UE 115-a may report CSI periodically after receiving a trigger and may refrain from reporting CSI after receiving a termination or release signal from base station 105-a.

In one example, UE 115-a may transmit a CSI report in a single slot, such as DL-centric slot 210 or UL-centric slot 215. For instance, base station 105-a may allocate all or a portion of the control resources in short PUCCH 235 of DL-centric slot 210 to UE 115-a for CSI reporting. During DL-centric slot 210, UE 115-a may identify the uplink control resources allocated to UE 115-a in short PUCCH 235 using downlink control information transmitted in the PDCCH 220 of DL-centric slot 210. UE 115-a may also calculate CSI feedback components for the frequency resources used for downlink transmissions. For instance, UE 115-a may calculate CRI, LI, RI, and/or PMI-1 based on the full frequency band used for downlink transmissions, and may also calculate PMI-2 and/or CQI for each frequency subband of the frequency band.

UE 115-a may then determine a size of a frequency subband within the frequency band. In some aspects, base station 105-a may transmit configuration signaling to UE 115-a indicating the size of the frequency subband—e.g., base station 105-a may indicate that the frequency subband spans one fixed frequency subbands, two fixed frequency subbands, and so on. In other aspects, UE 115-a may determine the size of the frequency subband after determining a maximum payload size supported by the control resources allocated to UE 115-a in short PUCCH 235. UE 115-a may also take into account the number of bits used to convey the values of the wideband CSI when determining the size of the frequency subband. For instance, UE 115-a may determine that the maximum payload size supported by short PUCCH 235 is X bits, the number of bits used to convey the wideband CSI feedback is Y bits and that the remaining bits, Z=X−Y, only support the transmission of narrowband CSI feedback for N subbands. For example, the number of subbands $N_{sb}$ may be calculated so that the summation of payload bits used to convey the CSI components, CRI+RI+PMI−1+$N_{sb}$(PMI−2+CQI), is less than the maximum supported payload size of short PUCCH 235 or long PUCCH/PUSCH 240. The subband size may then be based on the size of the frequency band and the determined number of subbands $$\left(\text{i.e., } \frac{f_{sb}(\text{Hz})}{N_{sb}}\right).$$

After determining the size of the frequency subband, UE 115-a may transmit CSI report 245 over the resources of short PUCCH 235 to base station 105-a. CSI report 245 may include the wideband CSI feedback and the narrowband CSI feedback for a number of fixed frequency subbands that corresponds to the size of the determined frequency subband. UE 115-a may similarly transmit CSI reports 245-a in UL-centric slot 215 using short PUCCH 235-a and/or long PUCCH/PUSCH 240. By limiting the size of the narrowband CSI feedback based on allocated and available uplink resources, UE 115-a may support periodic or semi-persistent CSI feedback transmissions in either type of slot configuration.

In another example, UE 115-a may encode a single packet comprising all of the feedback components of CSI report 245, where the single encoded packet has a predetermined size. In some aspects, UE 115-a may sub-sample a codebook used for reporting the PMI components to reduce the number of bits used in conveying these components. In this way, the size of the single encoded packet may be reduced and limited to a predetermined size. In other aspects, UE 115-a may insert padding bits (e.g., bits representing the value '0') into the encoded packet to increase a number of bits used to convey the encoded packet to the predetermined size. In some aspects, UE 115-a may allocate higher reliability bits in the encoded packet to higher priority CSI feedback components. For instance, UE 115-a may allocate the highest reliability bits to CRI, the next highest reliability bits to RI, the next highest reliability bits to PMI-1, the next highest reliability bits to PMI-2, the next highest reliability bits to CQI, and the lowest reliability bits to the padding. After encoding the single packet, UE 115-a may transmit the single encoded packet to base station 105-a in short PUCCH 235. UE 115-a may similarly transmit the single encoded packet in UL-centric slot 215 using short PUCCH 235-a and/or long PUCCH/PUSCH 240. By generating a single encoded packet that is a predetermined size and including all of the CSI feedback components, UE 115-a may facilitate the decoding process for base station 105-a.

Base station 105-a may use an iterative decoding process to decode the single encoded packet. For instance, base station 105-a may first decode the single encoded packet using the predetermined size (e.g., assuming no padding is used). If UE 115-a attached a CRC to the single encoded packet and the CRC was passed when base station 105-a decoded the single encoded packet or if some metric output from the decoder passes a threshold (e.g., a path-based metric, or a correlation values-based metric) then base station 105-a may terminate the decoding process. Otherwise, base station 105-a updates the size of the RI based on the decoded result of the CRI in the first decoding and decodes the single encoded packet a second time. Again, if UE 115-a attached a CRC to the single encoded packet and the CRC was passed when base station 105-a decoded the single encoded packet or if some metric output from the decoder passes a threshold (e.g., a path-based metric, or a correlation values-based metric) then base station 105-a may terminate the decoding process. Otherwise, base station 105-a updates the size of the PMI and CQI based on the decoded result of the RI in the second decoding and decodes the single encoded packet a third time. After each decoding, the decoding performance may be improved based on the base station 105-a identifying which bits in the single encoded packet are padding bits.

In another example, UE 115-a may encode a first packet including a first set of feedback components of CSI report 245 and a second packet including a second set of feedback components of CSI report 245. For instance, UE 115-a may encode a first packet including CRI (if applicable) and RI and may encode a second packet including PMI-1, PMI-2, and CQI. In another instance, UE 115-a may encode a first packet including CRI (if applicable), LI (if applicable), RI, and PMI- and may encode a second packet including PMI-2 and CQI. After encoding the first and second packet, UE 115-a may transmit the first packet and the second packet to base station 105-a during a single slot. If a single PUCCH resource is configured for a slot, such as short PUCCH 235, then UE 115-a transmits the first encoded packet on the PUCCH resource and concatenates the second encoded packet on the PUCCH resource. UE 115-a may similarly transmit the single encoded packet in UL-centric slot 215 using short PUCCH 235-a and/or long PUCCH/PUSCH 240.

If multiple PUCCH resources are configured for a slot—e.g., the slot includes two short PUCCHs or the slot includes a long PUCCH/PUSCH and a short PUCCH, such as in UL-centric slot 215—then UE 115-a transmits the first encoded packet on the first PUCCH (e.g., long PUCCH/PUSCH 240) and transmits the second encoded packet on the second PUCCH (e.g., short PUCCH 235-a). In some aspects, base station 105-a decoding the second encoded packet correctly may be dependent on the result of base station 105-a decoding the first encoded packet. By encoding the components of CSI report 245 in two encoded packets, UE 115-a may increase the likelihood that at least the first set of CSI feedback components, which may contain higher priority information, will be transmitted to base station 105-a over the allocated uplink control resources.

In another example, UE 115-a may transmit a CSI report using multiple slots. Base station 105-a may allocate uplink control resources to UE 115-a in multiple slots, such as DL-centric slot 210 and UL-centric slot 215. For example, base station 105-a may allocate to UE 115-a uplink control resources in a first slot (e.g., short PUCCH 235), and in one or more subsequent slots (e.g., including short PUCCH 235-a). UE 115-a may identify the allocated uplink resources and may transmit a packet including a first set of CSI feedback components (e.g., wideband feedback components such as CRI, LI, RI, and PMI-1) in DL-centric slot 210. UE 115-a may also identify allocated uplink resources in one or more subsequent slots.

In some aspects, the number of subsequent slots identified by UE 115-a is based on a size of—or the number of bits used to convey—the narrowband CSI feedback components, a number of fixed frequency subbands in the frequency band, and/or the number of resources allocated to UE 115-a in each of the subsequent slots, an indication from base station 105-a, or any combination thereof.

In some aspects, base station 105-a signals to UE 115-a a number of fixed frequency subbands for which to report narrowband CSI feedback per subsequent PUCCH resource—e.g., base station 105-a indicates to UE 115-a that UE 115-a should transmit PMI-2 and CQI for two subbands in short PUCCH 235-a. In other aspects, UE 115-a determines the number of fixed frequency subbands to report narrowband CSI feedback for in a subsequent PUCCH slot based on the number of uplink resources allocated to UE 115-a in a PUCCH slot—e.g., UE 115-a determine that X resources in short PUCCH 235-a are allocated to UE 115-a and that PMI-2 and CQI for three subbands will use Y resources, where Y<X, while PMI-2 and CQI for four subbands will use Z resources, where Z>X. After determining a number of fixed frequency subbands to report the narrowband CSI feedback components for, UE 115-a may continue to report the narrowband CSI feedback in subsequent slots until all of the fixed frequency subbands in the frequency band have been reported. By reporting CSI using multiple slots, UE 115-a may transmit narrowband CSI feedback for each of the fixed frequency subbands.

In some aspects, base station 105-a may configure UE 115-a using RRC signaling that indicates that CSI feedback contains two PUCCH types: one PUCCH type for wideband CSI feedback components, such as RI and PMI-1, and another PUCCH type for narrowband CSI feedback components, such as PMI-2 and CQI. Base station 105-a may further indicate that the first PUCCH type has a higher priority than the second PUCCH type, and may also define rules for transmissions over the second PUCCH type prior to a transmission over the first PUCCH type. In some aspects, base station 105-a may transmit a triggering mechanism to UE 115-a prior to UE 115-a reporting CSI. UE 115-a may respond to the triggering mechanism by transmitting an acknowledgement (ACK) frame to base station 105-a. UE 115-a may then wait for a period of time (i.e., observe a delay) after transmitting the ACK frame prior to transmitting the first set of CSI feedback components in a first slot. By utilizing a triggering mechanism, base station 105-a may be able to reduce the overhead used to decode CSI feedback by providing a definite starting point. This way, base station 105-a may not define which PUCCH resources carry a first set of CSI feedback components (e.g., wideband CSI components) and which PUCCH resources carry a second set of CSI feedback components (e.g., narrowband CSI components).

Figure 3A:
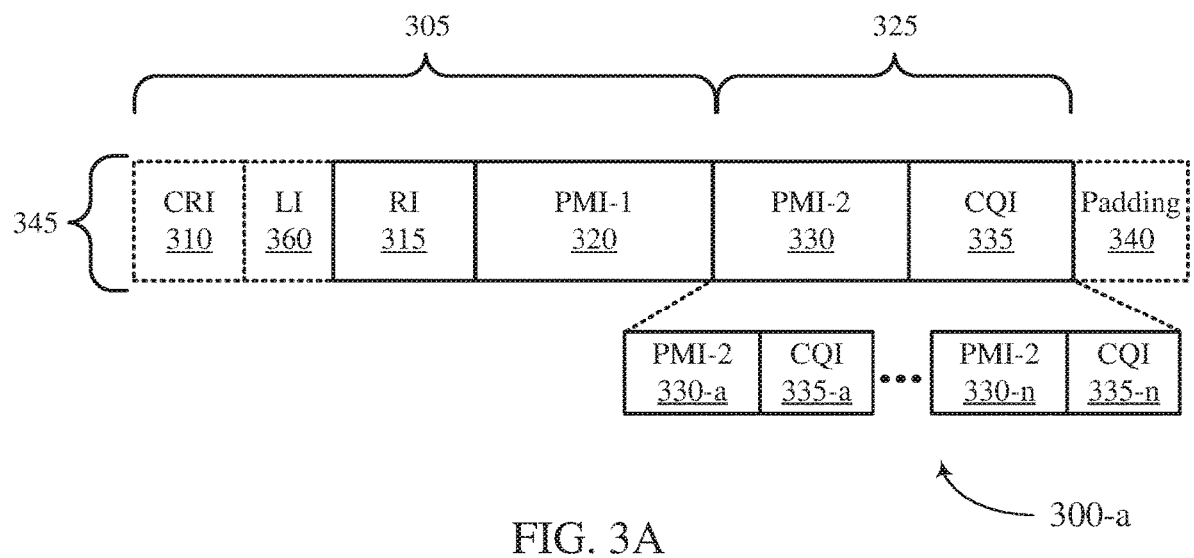
FIGS. 3A to 3C illustrate example CSI reports for CSI feedback for flexible uplink control signaling in accordance with various aspects of the present disclosure.

FIG. 3A illustrates an example of a CSI report 300-a for CSI feedback for flexible uplink control signaling in accordance with various aspects of the present disclosure. CSI report 300-a may illustrate aspects of a transmission between a UE 115 and a base station 105, as described above with reference to FIGS. 1-2. CSI report 300-a may include first CSI feedback components 305, second CSI feedback components 325, and padding 340. First CSI feedback components 305 may include CRI 310 (if applicable), LI 360 (if applicable), RI 315, and PMI-1 320. Second CSI feedback components 325 may include PMI-2 330 and CQI 335.

First CSI feedback components 305 may be used to report long-term channel conditions for a frequency band (or "wideband CSI feedback"). A UE may use CRI 310 to indicate to a base station which transmission beam is preferred by the UE. In some aspects, only one transmission beam is used, and therefore, CRI 310 is not signaled. Thus, the size (or "length") of CRI 310 may be 0 bits. In some aspects, the maximum size of CRT 310 is three bits in order to support eight simultaneous transmission beams. A UE may use RI 315 to suggest to a base station a number of transmission layers that a base station should transmit to the UE. If CRI 310 is signaled above, the size of RI 315 may be dependent on the number of transmission layers supported by the selected transmission beam. For instance, if the transmission beam supports four transmission layers, than RI 315 may use two bits. In some aspects, the maximum size of RI 315 is three bits to support eight transmission layers. A UE may use PMI-1 320 to suggest a precoding matrix that a base station should use for subsequent transmissions. A size of PMI-1 320 may vary based on the value indicated in RI 315. For instance, the size of PMI-1 320 may be smaller if RI 315 suggest one transmission layer (e.g., six bits) than if RI 315 suggest two transmission layers (e.g., 8 bits). As discussed above, a UE may select a value for PMI-1 320 based on a codebook or sub-codebook that is shared by the UE and a base station.

Second CSI feedback components 325 may be used to report short-term channel conditions on a per fixed frequency subband basis (e.g., second CSI feedback components 325 may be transmitted for each 15 Khz range of a 20 Mhz frequency band). A UE may use PMI-2 330 to suggest a precoding matrix that a base station should for subsequent transmissions on a designated fixed frequency subband. Similar to PMI-1 320, a size of PMI-2 330 may change based on a value of RI 315. And as discussed above, a UE may select a value for PMI-2 330 based on a codebook (or sub-codebook) that is shared by the UE and a base station. A UE may use CQI 335 to report short-term channel conditions to a base station, and the base station may use the reported channel conditions to update a MCS for subsequent transmissions to the UE. Since PMI-2 330 and CQI 335 are transmitted on a per fixed frequency subband basis, the number of bits allocated to represent PMI-2 330 and CQI 335 may be proportional to the number, n, of fixed frequency subbands for which the second CSI feedback components 325 is reported.

In some aspects, a wireless system may direct a UE to limit the size of CSI report 300-a to enable the UE to transmit the CSI report in a PUCCH of either a DL-centric slot or a UL-centric slot, such as the DL-centric slot 210 or UL-centric slot 215 of FIG. 2. In some examples, the UE may use codebook subsampling to limit a size of CSI report 300-a. In some examples, the UE may limit the size of CSI report 300-a by limiting the number of fixed frequency subbands for which to report the second CSI feedback components 325. In some examples, a base station signals to UE a number of fixed frequency subbands (e.g., 1 subband, 2 subbands, 3 subbands, and so on) that may be included in CSI report 300-a. In other examples, the UE may determine a maximum payload size (e.g., maximum number of bits) supported by PUCCH resources allocated to the UE in a slot; may determine a number of bits used to allocate the first CSI feedback components 305; and may determine a number of fixed frequency subbands that the second CSI feedback components 325 may be reported for based on the remaining number of bits available in the allocated PUCCH resources. By reporting second CSI feedback components 325 for a limited number of subbands, UE may increase the likelihood or ensure that CSI report 300-a may be transmitted in allocated PUCCH resources using one or more flexibly allocated slot types.

In some examples to limit the size of CSI report 300-a, a base station signals to the UE a subband size for narrowband reporting. In some examples and as previously discussed, the UE determines a subband size and corresponding number of subbands for narrowband reporting based on a maximum payload size supported by PUCCH resources allocated to the UE. The UE may reduce the size of CSI report 300-a by reporting for a fewer number of subbands having a larger subband size—i.e. reporting for subbands spanning a larger frequency bandwidth.

All of the feedback components of CSI report 300-*a*—i.e., first CSI feedback components 305 and second CSI feedback components 325—may be encoded as a single encoded packet 345. In some aspects, single encoded packet 345 may be a predetermined or fixed size. By encoding all of the feedback components in a single packet having a predetermined size, decoding of the encoded packet by a base station may be facilitated. In some aspects, a UE sub-samples the codebooks used for PMI-1 320 and PMI-2 330 to obtain a single encoded packet 345 with a fixed size. Sub-sampling the codebook for one or both of PMI-1 320 and PMI-2 330 may reduce the number of bits used to represent these components and may compensate for size differences in PMI-1 320 and PMI-2 330 due to different values being used for RI 315. In other aspects, the UE may insert padding into either or both of first CSI feedback components 305 and second CSI feedback components 325. For instance, the UE may add padding bits to RI 315 so that the size of RI 315 is equal to the maximum size. The UE may similarly add padding bits to CRI 310, PMI-1 320, PMI-2 330, and CQI 335. In some aspects, the UE places all of the padding bits at the end of single encoded packet 345 in padding 340. Thus, the size of padding 340 may be equal to a predetermined payload size of single encoded packet 345 minus the number of bits used to represent the first CSI feedback components 305 and the second CSI feedback components 325. In some aspects, first CSI feedback components 305 may be associated with a higher priority than the second CSI feedback components 325, and the values of the higher priority components are represented using higher reliability bits in the encoding.

A base station may use an iterative decoding process to decode the single encoded packet 345. For instance, the base station may first decode the single encoded packet using the predetermined size (e.g., assuming no padding is used). If the UE attached a CRC to the single encoded packet and the CRC was passed when the base station decoded the single encoded packet or if some metric output from the decoder passes a threshold (e.g., a path-based metric, or a correlation values-based metric) then the base station may terminate the decoding process. Otherwise, the base station updates the size of RI 315 based on the decoded result of CRI 310 in the first decoding and decodes the single encoded packet a second time. Again, if the UE attached a CRC to the single encoded packet 345 and the CRC was passed when the base station decoded the single encoded packet or if some metric output from the decoder passes a threshold (e.g., a path-based metric, or a correlation values-based metric) then the base station may terminate the decoding process. Otherwise, the base station updates the size of PMI-1 320, PMI-2 330, and CQI 335 based on the decoded result of RI 315 in the second decoding and decodes the single encoded packet a third time. After each decoding, the decoding performance may be improved based on the base station identifying which bits in the single encoded packet are padding bits.

Figure 3B:
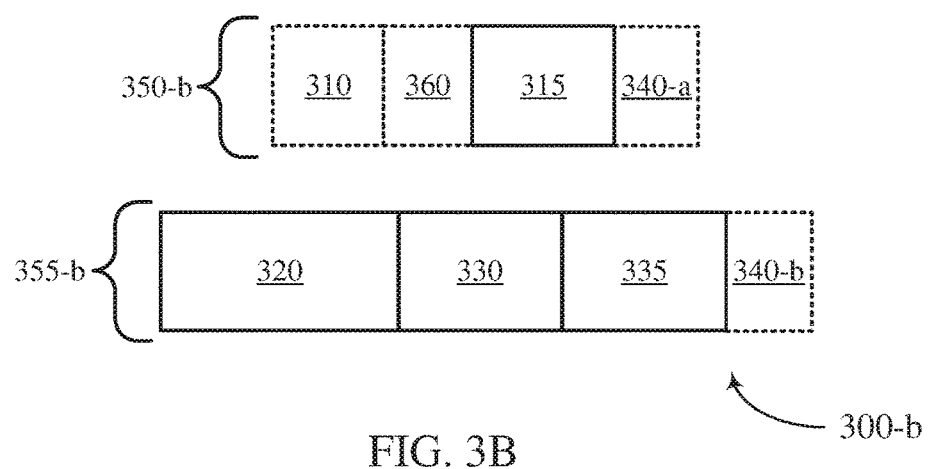

FIG. 3B illustrates an example of a CSI report 300-*b* for CSI feedback for flexible uplink control signaling in accordance with various aspects of the present disclosure. CSI report 300-*b* may illustrate aspects of a transmission between a UE 115 and a base station 105, as described above with reference to FIGS. 1-2. CSI report 300-*b* may include a first encoded packet 350-*b* and a second encoded packet 355-*b*. First encoded packet 350-*b* may include CRI 310 (if applicable), LI 360 (if applicable), RI 315, and padding 340-*a*. Second encoded packet 355-*b* may include PMI-1 320, PMI-2 330, CQI 335, and padding 340-*b*. In some aspects, the UE may limit the number of fixed frequency subbands for which to report PMI-2 330 and CQI 335 in second encoded packet 355-*b* as discussed in FIG. 3A.

In some examples, both the first encoded packet 350-*b* and the second encoded packet 355-*b* may be encoded using the techniques discussed above in FIG. 3A for encoding single encoded packet 345. By encoding CSI report 300-*b* into separate encoded packets, the wireless system may increase the likelihood or ensure that the CSI feedback components, which may be higher priority, in first encoded packet 350-*b* will be transmitted using allocated PUCCH resources in one or more of the varying slot types described herein.

Figure 3C:
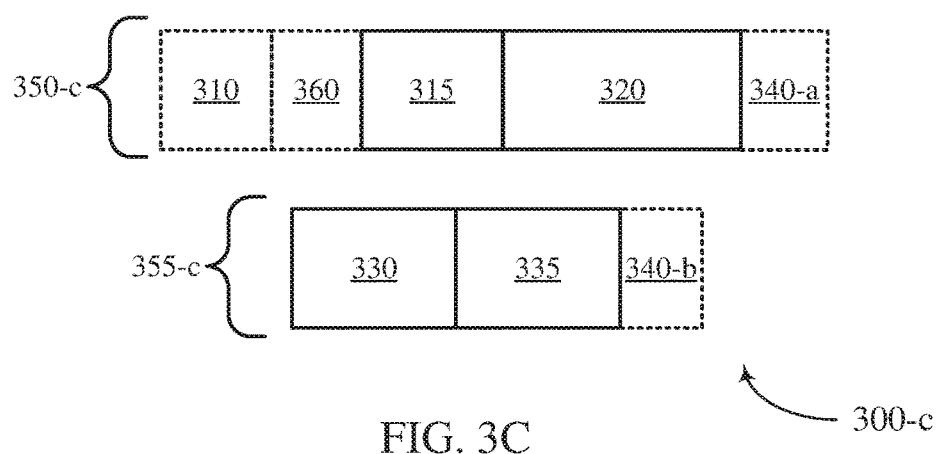

FIG. 3C illustrates an example of a CSI report 300-*c* for CSI feedback for flexible uplink control signaling in accordance with various aspects of the present disclosure. CSI report 300-*c* may illustrate aspects of a transmission between a UE 115 and a base station 105, as described above with reference to FIGS. 1-2. CSI report 300-*c* may include a first encoded packet 350-*c* and a second encoded packet 355-*c*. First encoded packet 350-*c* may include CRI 310 (if applicable), LI 360 (if applicable), RI 315, PMI-1 320, and padding 340-*a*. Second encoded packet 355-*c* may include PMI-2 330, CQI 335, and padding 340-*b*. In some aspects, the UE may limit the number of fixed frequency subbands for which to report PMI-2 330 and CQI 335 in second encoded packet 355 as discussed in FIG. 3A.

In some examples, both the first encoded packet 350-*c* and the second encoded packet 355-*c* may be encoded using the techniques discussed above in FIG. 3A for encoding single encoded packet 345. By encoding CSI report 300-*c* into separate encoded packets, the wireless system may increase the likelihood or ensure that the CSI feedback components, which may be higher priority, in first encoded packet 350-*c* will be transmitted using allocated PUCCH resources in one or more of the varying slot types described herein.

Figure 4A:
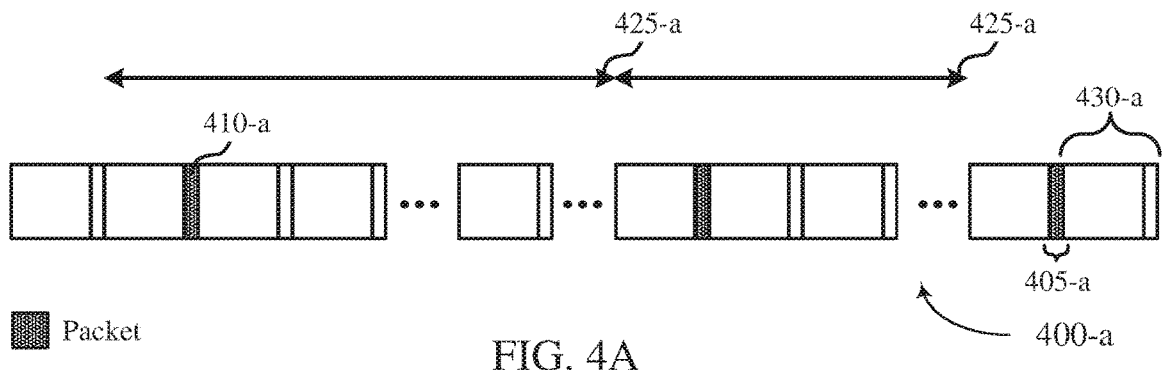
FIGS. 4A to 4D illustrate example frame configurations for CSI feedback for flexible uplink control signaling in accordance with various aspects of the present disclosure.

FIG. 4A illustrates an example of a frame configuration 400-*a* for CSI feedback for flexible uplink control signaling in accordance with various aspects of the present disclosure. Frame configuration 400-*a* may illustrate aspects of a transmission between a UE 115 and a base station 105, as described above with reference to FIGS. 1-2. Frame configuration 400-*a* may include DL-centric slots 430-*a*, which may be an example of a DL-centric slot 210 of FIG. 2. DL-centric slots 430-*a* may include a short PUCCH 405-*a*.

In some aspects, a base station may configure a UE for periodic CSI reporting. For example, the base station may configure the UE with a reporting interval 425-*a* using higher-layer signaling (e.g., RRC signaling) or in downlink control signaling. In some aspects, the UE may identify slots or a range of slots in which to report CSI feedback based on reporting interval 425-*a*. In some examples, UE may identify control resources allocated to the UE during a short PUCCH 405-*a* of an identified slot. The UE may then transmit first packet 410-*a* including all or part of a CSI report on the allocated resources. In some aspects, the packet reports CSI feedback, such as PMI-2 and CQI, for a limited number of fixed frequency subbands, using a computed frequency subband size, and/or is a single encoded packet, similar to the single encoded packet 345 of FIG. 3.

Figure 4B:
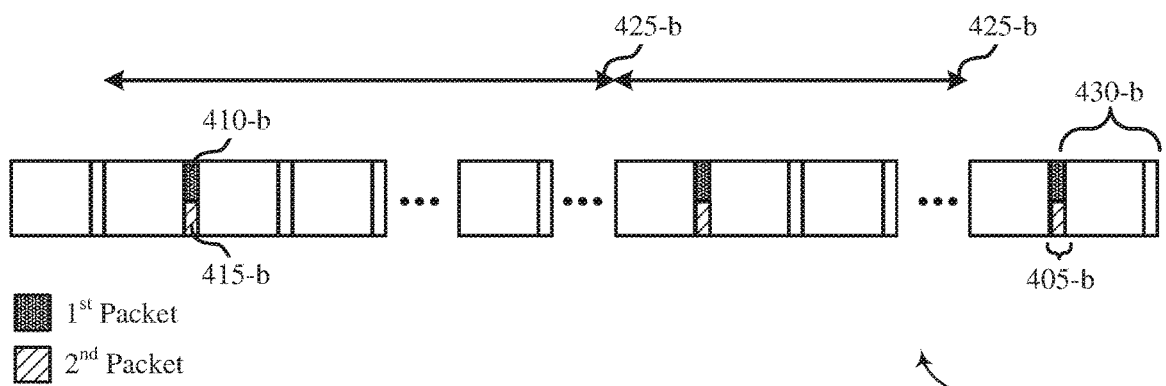

FIG. 4B illustrates an example of a frame configuration 400-*b* for CSI feedback for flexible uplink control signaling in accordance with various aspects of the present disclosure. Frame configuration 400-*b* may illustrate aspects of a transmission between a UE 115 and a base station 105, as described above with reference to FIGS. 1-2. Frame configuration 400-*b* may include DL-centric slots 430-*b*, which may be an example of a DL-centric slot 210 of FIG. 2. DL-centric slots 430-*b* may include a short PUCCH 405-*b*.

In some aspects, a base station may configure a UE for periodic CSI reporting. For example, the base station may configure the UE with a reporting interval 425-*b* using higher-layer signaling (e.g., RRC signaling) or in downlink control signaling. In some aspects, the UE may identify slots or a range of slots in which to report CSI feedback based on reporting interval 425-*b*. In some examples, a UE may identify control resources allocated to the UE during a short PUCCH 405-*b* of an identified slot. The UE may then transmit first packet 410-*b* and second packet 415-*b* on the allocated resources. In some aspects, second packet 415-*b* is concatenated to the end of first packet 410-*b*, and the result of decoding first packet 410-*b* is used by a base station to decode second packet 415-*b*—e.g., the decoding of the first packet is used to determine a size of the second packet, for instance, based on the decoded value of the RI component.

In some aspects, the first packet 410-*b* includes a subset of CSI feedback components, such as CRI, LI, RI, and/or PMI-1 and is a first encoded packet, similar to the first encoded packets 350-*b* or 350-*c* of FIGS. 3B and 3C. In some aspects, the second packet 415-*b* includes the remaining CSI feedback components, such as PMI-1, PMI-2, and CQI, reports PMI-2 and CQI for all or a limited number of fixed frequency subbands, and is a second encoded packet, similar to second encoded packets 355-*b* or 355-*c* of FIGS. 3B and 3C.

Figure 4C:
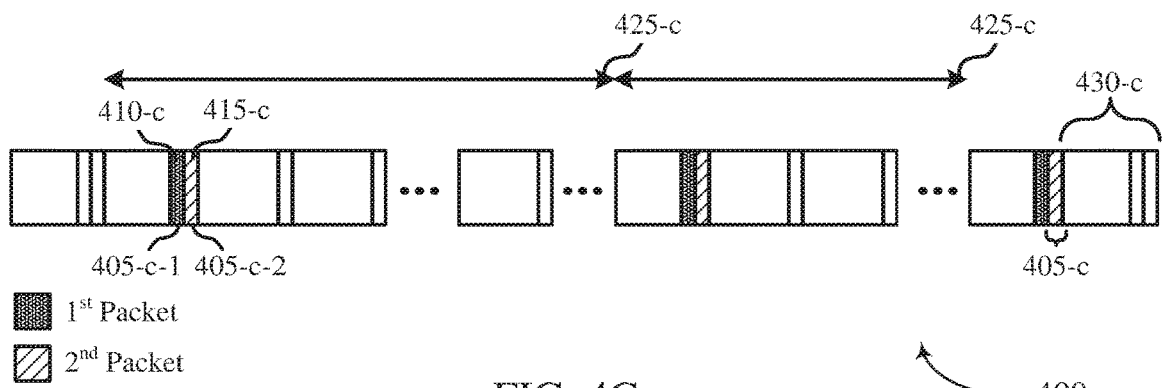

FIG. 4C illustrates an example of a frame configuration 400-*c* for CSI feedback for flexible uplink control signaling in accordance with various aspects of the present disclosure. Frame configuration 400-*c* may illustrate aspects of a transmission between a UE 115 and a base station 105, as described above with reference to FIGS. 1-2. Frame configuration 400-*c* may include DL-centric slots 430-*c*, which may be an example of a DL-centric slot 210 of FIG. 2. DL-centric slots 430-*c* may include one or more short PUCCHs 405-*c*.

In some aspects, a base station may configure a UE for periodic CSI reporting. For example, the base station may configure the UE with a reporting interval 425-*c* using higher-layer signaling (e.g., RRC signaling) or in downlink control signaling. In some aspects, the UE may identify slots or a range of slots in which to report CSI feedback based on reporting interval 425-*c*. In some examples, the UE may identify control resources allocated to the UE during a short PUCCH 405-*c* of an identified slot. In some aspects, the UE may identify that a DL-centric slot 430-*c* includes two short PUCCHs. The UE may then transmit first packet 410-*c* on the allocated resources in the first short PUCCH 405-*c*-1 and may transmit second packet 415-*c* on the allocated resources in the second short PUCCH 405-*c*-2. In some aspects, first packet 410-*c* is transmitted before second packet 415-*c*, and the result of decoding first packet 410-*c* is used by a base station to decode second packet 415-*c*—e.g., the decoding of the first packet is used to determine a size of the second packet, for instance, based on the decoded value of the RI component.

In some aspects, the first packet 410-*c* includes a subset of CSI feedback components, such as CRI, LI, RI, and/or PMI-1 and is a first encoded packet, similar to the first encoded packets 350-*b* or 350-*c* of FIGS. 3B and 3C. In some aspects, the second packet 415-*c* includes the remaining CSI feedback components, such as PMI-1, PMI-2, and CQI, reports PMI-2 and CQI for all or a limited number of fixed frequency subbands, and is a second encoded packet, similar to the second encoded packets 355-*b* or 355-*c* of FIGS. 3B and 3C.

Figure 4D:
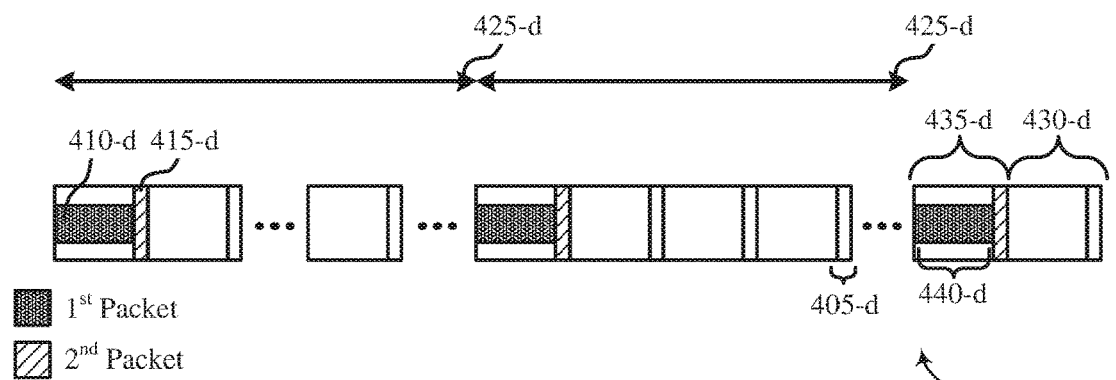

FIG. 4D illustrates an example of a frame configuration 400-*d* for CSI feedback for flexible uplink control signaling in accordance with various aspects of the present disclosure. Frame configuration 400-*d* may illustrate aspects of a transmission between a UE 115 and a base station 105, as described above with reference to FIGS. 1-2. Frame configuration 400-*d* may include DL-centric slots 430-*d* and UL-centric slots 435-*d*, which may be an example of a DL-centric slot 210 and an UL-centric slot 215 of FIG. 2. DL-centric slots 430-*d* may include short PUCCH 405-*d*, while UL-centric slots 435-*d* may include long PUCCH 440-*d* and short PUCCH 405-*d*.

In some aspects, a base station may configure a UE for periodic CSI reporting. For example, the base station may configure the UE with a reporting interval 425-*d* using higher-layer signaling (e.g., RRC signaling) or in downlink control signaling. In some aspects, the UE may identify slots or a range of slots in which to report CSI feedback based on reporting interval 425-*d*. In some examples, the UE may identify control resources allocated to the UE during a short PUCCH 405-*d* of an identified slot. In some aspects, the UE may identify that a DL-centric slot 430-*d* includes a long PUCCH 440-*d* and a short PUCCH 405-*d*. The UE may then transmit first packet 410-*d* on the allocated resources in the long PUCCH 440-*d* and may transmit second packet 415-*d* on the allocated resources in the short PUCCH 405-*d*. In some aspects, first packet 410-*d* is transmitted before second packet 415-*d*, and the result of decoding first packet 410-*d* is used by a base station to decode second packet 415-*d*—e.g., the decoding of the first packet is used to determine a size of the second packet, for instance, based on the decoded value of the RI component.

In some aspects, the first packet 410-*d* includes a subset of CSI feedback components, such as CRI, LI, RI, and/or PMI-1 and is a first encoded packet, similar to the first encoded packets 350-*b* or 350-*c* of FIGS. 3B and 3C. In some aspects, the second packet 415-*d* includes the remaining CSI feedback components, such as PMI-1, PMI-2, and CQI, reports PMI-2 and CQI for all or a limited number of fixed frequency subbands, and is a second encoded packet, similar to second encoded packets 355-*b* or 355-*c* of FIGS. 3B and 3C.

Figure 5A:
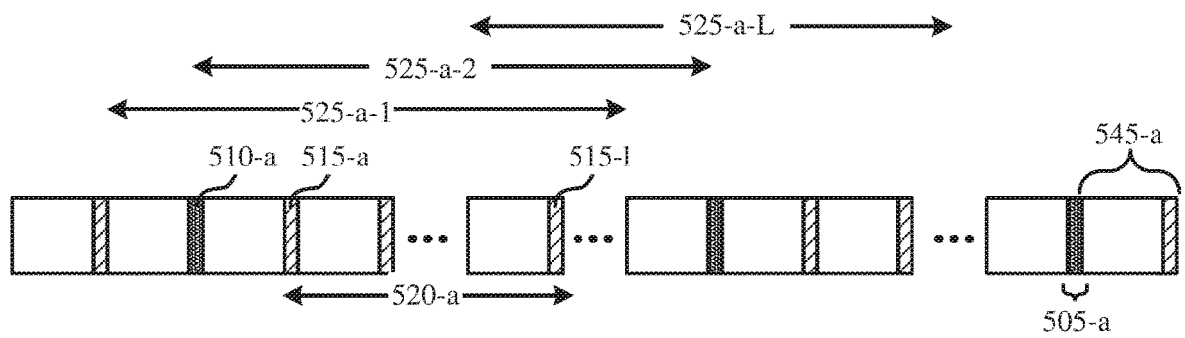
FIGS. 5A to 5C illustrate example frame configurations for CSI feedback for flexible uplink control signaling in accordance with various aspects of the present disclosure.

FIG. 5A illustrates an example of a frame configuration 500-*a* for CSI feedback for flexible uplink control signaling in accordance with various aspects of the present disclosure. Frame configuration 500-*a* may illustrate aspects of a transmission between a UE 115 and a base station 105, as described above with reference to FIGS. 1-2. Frame configuration 500-*a* may include DL-centric slots 545-*a*, which may be an example of a DL-centric slot 210 of FIG. 2. DL-centric slots 545-*a* may include a short PUCCH 505-*a*.

In some aspects, a base station may configure a UE for periodic CSI reporting. For example, the base station may configure the UE with a reporting interval 525-*a* using higher-layer signaling (e.g., RRC signaling) or in downlink control signaling. In some aspects, the base station may designate a reporting interval 525-*a* for each PUCCH resource scheduled to carry CSI. For instance, the base station may designate reporting interval 525-*a*-1 to a UE for transmitting a first set of CSI feedback components, such as CRI, RI, and PMI-1 (or "wideband CSI feedback"), and reporting intervals 525-*a*-2 to 525-*a*-L for transmitting all or a portion of a second set of CSI feedback components, such as PMI-2 and CQI (or "narrowband CSI feedback").

In some examples, the UE may identify uplink control resources allocated to the UE in a short PUCCH 505-*a* associated with wideband CSI feedback reporting and may transmit first packet 510-*a* carrying channel state information for a frequency band. The UE may also identify resources allocated to the UE in one or more subsequent short PUCCHs 505-*a* associated with narrowband CSI feedback reporting and may report narrowband CSI feedback for a number of fixed frequency subbands in each of the one or more subsequent short PUCCHs 505-*a*. In some aspects, the base station indicates to the UE a number of fixed frequency subbands for which to report during each of the subsequent short PUCCH 505-*a* associated with narrowband CSI feedback reporting. In some examples, the UE or base station determines a number of fixed frequency subbands for which to report based on a maximum payload supported by the uplink resources allocated to the UE in each subsequent short PUCCH 505-*a* and a number of bits used to represent narrowband CSI feedback for each fixed frequency subband—i.e., the number of subbands N equals the max payload size X divided by the number of bits used to represent narrowband CSI feedback for a fixed frequency subband Y, or $$N = \frac{X}{Y}.$$

The UE may transmit subsequent packet 515-*a* in a subsequent short PUCCH 505-*a*, where subsequent packet 515-*a* carries narrowband CSI feedback for the determined number of fixed frequency subbands. The UE may continue to transmit additional packets up to subsequent packet 515-1 until narrowband CSI feedback has been reported for all of the fixed frequency subbands in the frequency band or until short PUCCHs designated for narrowband CSI feedback end. Thus, narrowband CSI feedback for a most or all of an entire frequency band may be transmitted over period 520-*a*.

Figure 5B:
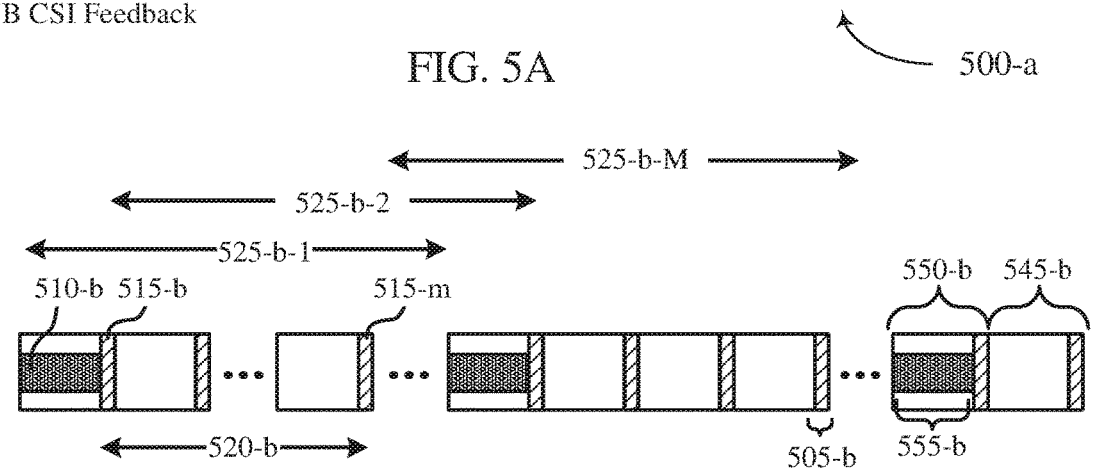

In some aspects, first packet 510-*a* includes a subset of CSI feedback components, such as CRI, LI, RI, and/or PMI-1 and is a first encoded packet, similar to the first encoded packets 350-*b* or 350-*c* of FIGS. 3B and 3C. In some aspects, subsequent packets 515-*a* to 515-1 include the remaining CSI feedback components, such as PMI-1, PMI-2, and CQI, reports PMI-2 and CQI for a determined number of fixed frequency subbands, and is a second encoded packet, similar to second encoded packets 355-*b* or 355-*c* of FIGS. 3B and 3C. Note that similar CSI reporting methods may be applied to frame configurations that include any combination of UL-centric subframes and DL-centric subframes FIG. 5B illustrates an example of a frame configuration 500-*b* for CSI feedback for flexible uplink control signaling in accordance with various aspects of the present disclosure. Frame configuration 500-*b* may illustrate aspects of a transmission between a UE 115 and a base station 105, as described above with reference to FIGS. 1-2. Frame configuration 500-*b* may include DL-centric slots 545-*b* and UL-centric slots 550-*b*, which may be an example of a DL-centric slot 210 and an UL-centric slot 215 of FIG. 2. DL-centric slots 545-*b* may include a short PUCCH 505-*b*, while UL-centric slots 550-*b* may include both a short PUCCH 505-*b* and a long PUCCH 555-*b*.

In some aspects, a base station may configure a UE for periodic CSI reporting. For example, the base station may configure the UE with a reporting interval 525-*b* using higher-layer signaling (e.g., RRC signaling) or in downlink control signaling. In some aspects, the base station may designate a reporting interval 525-*b* for each PUCCH resource scheduled to carry CSI. For instance, the base station may designate reporting interval 525-*b*-1 to a UE for transmitting a first set of CSI feedback components, such as CRI, LI, RI, and PMI-1 (or "wideband CSI feedback"), and reporting intervals 525-*b*-2 to 525-*b*-M for transmitting all or a portion of a second set of CSI feedback components, such as PMI-2 and CQI (or "narrowband CSI feedback").

In some examples, the UE may identify uplink control resources allocated to the UE in a long PUCCH 555-*b* for wideband CSI feedback reporting and may transmit first packet 510-*b* carrying channel state information for a frequency band. The UE may also identify resources allocated to the UE in one or more subsequent short PUCCHs 505-*b* for narrowband CSI feedback reporting and may report narrowband CSI feedback for a number of fixed frequency subbands in each of the one or more subsequent short PUCCHs 505-*b*. In some aspects, the base station indicates to the UE a number of fixed frequency subbands for which to report during each of the subsequent short PUCCH 505-*b* associated with narrowband CSI feedback reporting. In some examples, the UE or base station determines a number of fixed frequency subbands for which to report based on a maximum payload supported by the uplink resources allocated to the UE in each subsequent short PUCCH 505-*a* and a number of bits used to represent narrowband CSI feedback for each fixed frequency subband, as discussed above in FIG. 5A.

The UE may transmit subsequent packet 515-*b* in a subsequent short PUCCH 505-*b*, where subsequent packet 515-*b* carries narrowband CSI feedback for the determined number of fixed frequency subbands. The UE may continue to transmit additional packets up to subsequent packet 515-*m* until narrowband CSI feedback has been reported for all of the fixed frequency subbands in the frequency band or until short PUCCHs designated for narrowband CSI feedback end. Thus, narrowband CSI feedback for most or all of an entire frequency band may be transmitted over period 520-*b*.

In some aspects, first packet 510-*b* includes a subset of CSI feedback components, such as CRI, LI, RI, and/or PMI-1 and is a first encoded packet, similar to the first encoded packets 350-*b* or 350-*c* of FIGS. 3B and 3C. In some aspects, subsequent packets 515-*b* to 515-*m* includes the remaining CSI feedback components, such as PMI-1, PMI-2, and CQI, reports PMI-2 and CQI for a determined number of fixed frequency subbands, and is a second encoded packet, similar to second encoded packets 355-*b* or 355-*c* of FIGS. 3B and 3C. Note that similar CSI reporting methods may be applied to frame configurations that include any combination of UL-centric subframes and DL-centric subframes.

Figure 5C:
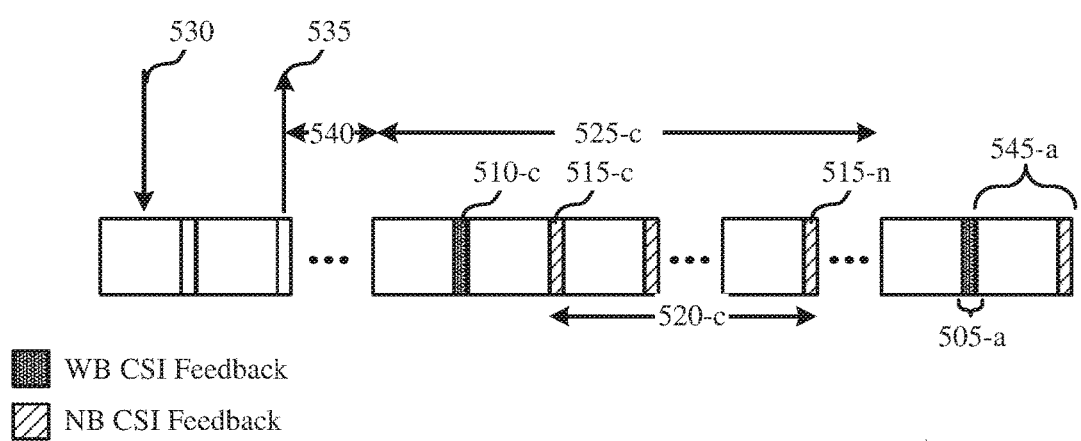

FIG. 5C illustrates an example of a frame configuration 500-*c* for CSI feedback for flexible uplink control signaling in accordance with various aspects of the present disclosure. Frame configuration 500-*c* may illustrate aspects of a transmission between a UE 115 and a base station 105, as described above with reference to FIGS. 1-2. Frame configuration 500-*c* may include DL-centric slots 545-*a*, which may be an example of a DL-centric slot 210 of FIG. 2. DL-centric slots 545-*a* may include a short PUCCH 505-*a*.

In some aspects, a base station may trigger a UE to perform periodic or semi-persistent CSI reporting. In some aspects, the base station may also indicate a reporting interval 525-*c* to a UE. For example, the base station may transmit triggering mechanism 530 to the UE in a first slot. The triggering mechanism 530 may include media access control (MAC)-control element (CE) or downlink control information (DCI) signaling indicating PUCCH resources selected from a configured PUCCH resource set, in addition to a transmission delay, such as delay period 540.

The UE may respond to triggering mechanism 530 with an acknowledgement (ACK) message 535. After transmitting the ACK message, the UE may observe a delay period 540, and after waiting for the delay period 540, the UE may identify uplink control resources in a slot to transmit first packet 510-c. After transmitting first packet 510-c, the UE may transmit narrowband CSI feedback in subsequent packet 515-c. The UE may continue to transmit narrowband CSI feedback in subsequent packets, up to subsequent packet 515-n, until narrowband CSI feedback has been reported for each fixed frequency subband of a frequency band. After transmitting all of the CSI feedback, the UE may wait until the interval has expired and may repeat the above process. In some examples, base station may send a termination signal to the UE to prevent the UE from reporting CSI. By using a triggering message, a base station may reduce overhead associated with designating PUCCHs for CSI reporting and with defining intervals for each designated PUCCH.

Figure 6:
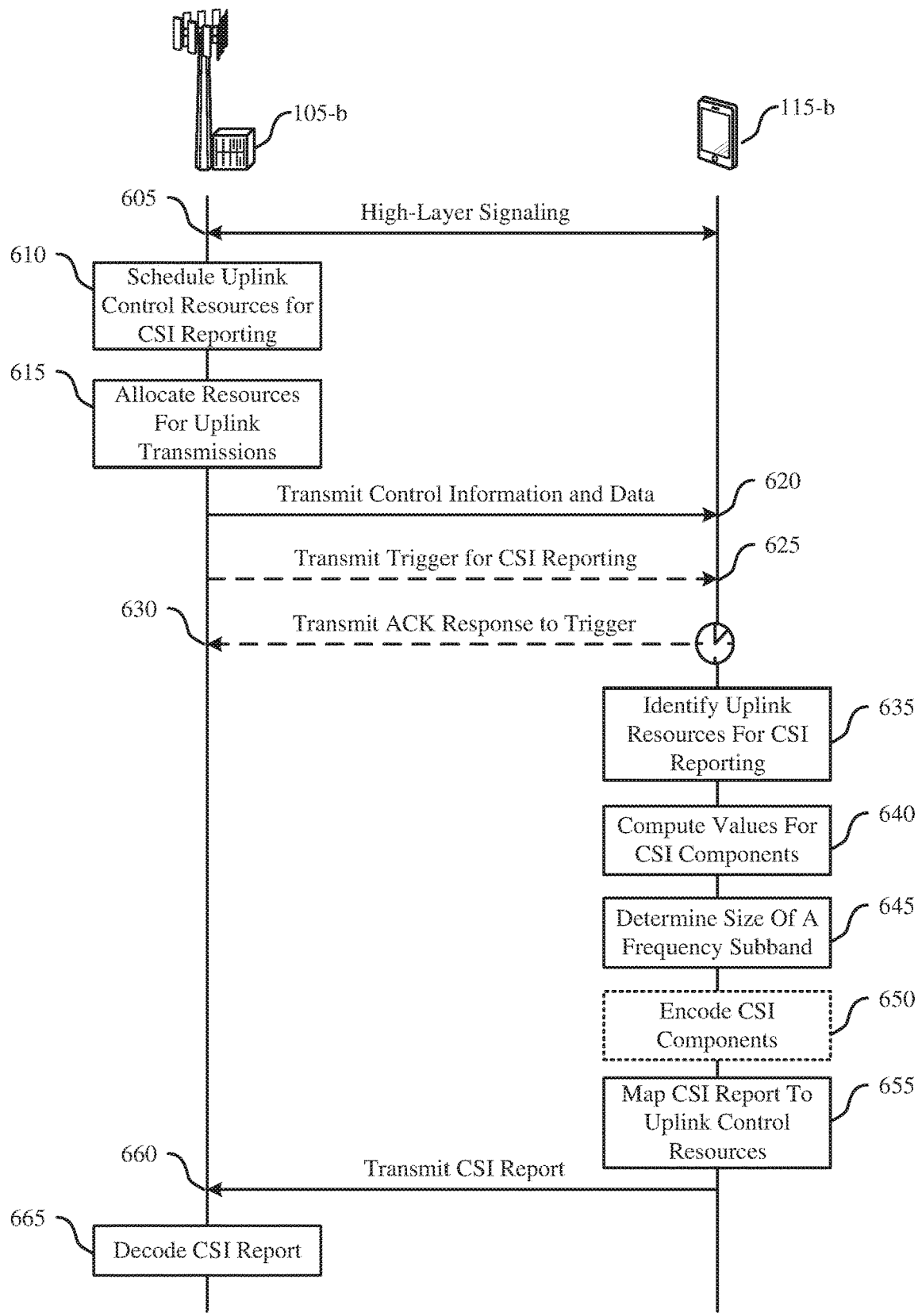
FIG. 6 illustrates an example of a process flow for CSI feedback for flexible uplink control signaling in accordance with various aspects of the present disclosure.

FIG. 6 illustrates an example of a process flow 600 for CSI feedback for flexible uplink control signaling in accordance with various aspects of the present disclosure. Process flow 600 may be performed by UE 115-b and base station 105-b, which may be an example of a UE 115 and base station 105 described above with reference to FIGS. 1-2. In some examples, UE 115-b may report CSI feedback to base station 105-b using techniques that support flexible PUCCH resource allocations within slots.

At 605, UE 115-b and base station 105-b may exchange high-layer signaling, such as RRC signaling. In some aspects, UE 115-b and base station 105-b exchange configuration information within the high-layer signaling. For example, UE 115-b may indicate to base station 105-b a capability for certain aspects of communications. Base station 105-b may similarly indicate a capability for certain aspects of communications. In some aspects, base station 105-b may include scheduling information for CSI reporting in the signaling to UE 115-b. For instance, base station 105-b may designate PUCCH resources for CSI reporting and may convey an interval for reporting CSI in designated PUCCH resources to a UE.

In some aspects, base station 105-b may designate a first set of PUCCH resources for reporting a first type of CSI feedback (e.g., wideband CSI feedback, such as CRI, LI, RI, and/or PMI-1), and a second set of PUCCH resources for a second type of CSI feedback (e.g., narrowband CSI feedback, such as PMI-2 and/or CQI). In some aspects, base station 105-b indicates an interval for each set of designated PUCCH resources. Base station 105-b may also indicate a size of frequency subbands, or a number of fixed frequency subbands, for which to report the second type of CSI feedback.

At 610, base station 105-b may schedule uplink control resources in one or more slots for CSI reporting. In some aspects, the uplink control resources are allocated in a slot, such as a DL-centric slot or an UL-centric slot. For example, base station 105-b may schedule uplink control resources in a short PUCCH of a DL-centric slot, a long PUCCH of an UL-centric slot, or a short PUCCH of an UL-centric slot, or any combination thereof.

At 615, base station 105-b may allocate all or some of the scheduled uplink control resources in the one or more slots to UE 115-b. In some aspects, base station 105-b may allocate uplink control resources to UE 115-b in a single slot. In other aspects, base station 105-b may allocate uplink control resource to UE 115-b in multiple slots.

At 620, base station 105-b may transmit control information and data to UE 115-b during one or more slots.

At 625, base station 105-b may optionally transmit a triggering mechanism or triggering signaling to UE 115-b that directs UE 115-b to begin reporting CSI feedback. The triggering mechanism may include MAC-CE or DCI signaling indicating PUCCH resources selected from a configured PUCCH resource set, in addition to a transmission delay.

At 630, UE 115-b may respond to the triggering mechanism (if transmitted by base station 105-b) with an ACK response. After transmitting the ACK response, UE 115-b may observe a delay period before transmitting CSI feedback.

At 635, UE 115-b may identify, in or more slots, uplink control resources allocated to UE 115-b for CSI reporting. In some aspects, UE 115-b identifies uplink control resources for CSI reporting based on the configuration signaling that was previously received at UE 115-b. For instance, UE 115-b identifies the uplink control resources based on the designated interval and identifies the designated resources. In some examples, UE 115-b may identify, in a single slot, PUCCH resources for reporting CSI feedback. In some examples, UE 115-b may identify, in a single slot, first PUCCH resources for reporting a first type of CSI feedback (e.g., wideband CSI feedback) and may identify second PUCCH resources for reporting a second type of CSI feedback (e.g., narrowband CSI feedback). In some examples, UE 115-b may identify, in multiple slots, first PUCCH resources for reporting a first type of CSI feedback (e.g., wideband CSI feedback including CRI, LI, RI, and/or PMI-1) and may identify second PUCCH resources for reporting a second type of CSI feedback (e.g., narrowband CSI feedback, PMI-2 and/or CQI).

If base station 105-b transmits the triggering mechanism, then UE 115-b may identify the uplink control resources in a first slot that occurs after or concurrently with the expiration of the delay period. In some examples, the first slot is an DL-centric slot and contains a short PUCCH. In other examples, the first slot is an UL-centric slot and contains a long PUCCH. UE 115-b may also identify uplink control resources in slots that follow the first slot. The subsequent slots may either be UL-centric slots or DL-centric slots. In some examples, the first slot is used for CSI feedback transmissions of a first type (e.g., for CRI, LI, RI, and PMI-1), while the subsequent slots are used for CSI feedback transmissions of a second type (e.g., PMI-2 and CQI). In some examples, UE 115-b may dictate the number of subsequent slots to be used for CSI feedback transmission of the second type based on how many fixed frequency subbands the second type of CSI feedback is transmitted for per subsequent slot and how many fixed frequency subbands make up a frequency band.

At 640, UE 115-b may compute values for CSI feedback components of the CSI report. In some examples, CSI report may include two types of CSI feedback components: a first set of CSI feedback components used to communicate long-term/wideband channel conditions (e.g., CRI, LI, RI, PMI-1), and a second set of CSI feedback components used to communicate short-term/narrowband channel conditions (e.g., PMI-2 and CQI), which are transmitted on a per fixed frequency subband basis. UE 115-*b* may compute the first set of CSI feedback components using reference signals that are dispersed across the frequency band and may compute the second set of CSI feedback components using reference signals that are dispersed across a fixed frequency subband (e.g., a 15 KHz range). The second set of CSI feedback components may be computed for non-overlapping frequency ranges having a fixed bandwidth (e.g., 15 KHz).

At 645, UE 115-*b* may determine a size of a frequency subband within a frequency band used by base station 105-*b* for downlink transmissions to UE 115-*a*. UE 115-*b* may determine the size of the frequency subband based on an indicated size received from base station 105-*b*, a maximum supported payload size of the one or more PUCCH resources, or the number of bits used to represent the first set of CSI feedback components, or any combination thereof. In some aspects, the size of the frequency subband is equivalent to a discrete number of fixed frequency subbands. After determining the size of the frequency subband, UE 115-*b* may identify how many bits will be used to represent the second set of CSI feedback components—e.g., if the size of the frequency subband is equivalent to two fixed frequency subbands, UE 115-*b* will report the second set of CSI feedback components for two fixed frequency subbands in the CSI report.

At 650, UE 115-*b* may encode the calculated CSI components of the CSI report. In some aspects, UE 115-*b* may encode all of the CSI components into a single encoded packet. In other aspects, UE 115-*b* may encode a first set of CSI component into a first encoded packet and a second set of CSI components into a second encoded packet. In some examples, UE 115-*a* may encode the CSI components so that higher priority CSI components are mapped to higher reliability bits in the encoded packet. In some aspects, the size of certain CSI components are reduced (e.g., using codebook subsampling) to achieve a encoded packet that has a predetermined size. For example, UE 115-*b* may use codebook subsampling for the encoded packet when a rank (e.g., rank 2) associated with a larger CSI payload (e.g., 14 bits) than a rank (e.g. rank 1) associated with a smaller CSI payload (e.g., 13 bits) is used. In this way, a size of an encoded packet for the rank associated with a larger CSI payload may be reduced to match the size of an encoded packet for the rank associated with the smaller CSI payload. In some aspects, the size of certain CSI component are increased (e.g., using padding) to achieve a encoded packet that has a predetermined size. For example, UE 115-*a* may insert padding bits to an encoded packet when a rank (e.g., rank 1) associated with a smaller CSI payload (e.g., 13 bits) than a rank (e.g., rank 2) associated with a larger CSI payload (e.g., 14 bits) is used. In this way, a size of an encoded packet for the rank associated with the smaller CSI payload may be increased to match the size of an encoded packet for the ranks associated with the larger CSI payload.

At 655, UE 115-*b* may map the CSI report to the previously identified uplink control resources. If UE 115-*b* identifies a single slot for CSI reporting, UE 115-*b* may map a CSI report that is encoded as a single packet or that reports a second type of CSI for a limited number of subbands, or both, to a PUCCH resource (e.g., short PUCCH or long PUCCH) in the single slot. In some aspects, UE 115-*b* may map a CSI report that is encoded as a first and second packet to one or more PUCCH resources (e.g., two short PUCCHs or a short and a long PUCCH) in the single slot. If UE 115-*b* identifies multiple slots for CSI reporting, UE 115-*b* may map a first set of CSI feedback components to a first PUCCH resource and the second set of CSI feedback components to the remaining PUCCH resources. For triggered CSI reporting, UE 115-*b* may map a first set of CSI feedback components to the first PUCCH resources that occurs after the delay period ends, and map the second set of CSI feedback components to subsequent PUCCH resources until the second set of CSI feedback components has been reported for each fixed frequency subband in a frequency band.

At 660, UE 115-*b* may transmit the CSI report to base station 105-*b* based on the previous mapping.

At 665, base station 105-*b* may receive the CSI report on one or more slots and may decode the CSI report. If the CSI report is transmitted in one or more encoded packets having predetermined sizes, base station 105-*b* may apply an iterative decoding to the packet. For instance, base station 105-*b* may decode the packet a first time according to the predetermined size. Base station 105-*b* may decode the packet a second time based on a result of the first decoding (e.g., a value of CRI). And base station may decode the packet a third time based on a result of the second decoding (e.g., a value of RI).

For periodic and semi-persistent CSI reporting, base station 105-*b* and UE 115-*b* may repeat many of the above functions—e.g., according to the interval designated in the high layer signaling. For aperiodic reporting, UE 115-*b* may refrain from repeating the above steps unless the triggering function is received a second time. In some aspects, the above techniques may be performed in the order given above. In other aspects, certain techniques may be performed earlier or later, or omitted.

Figure 7:
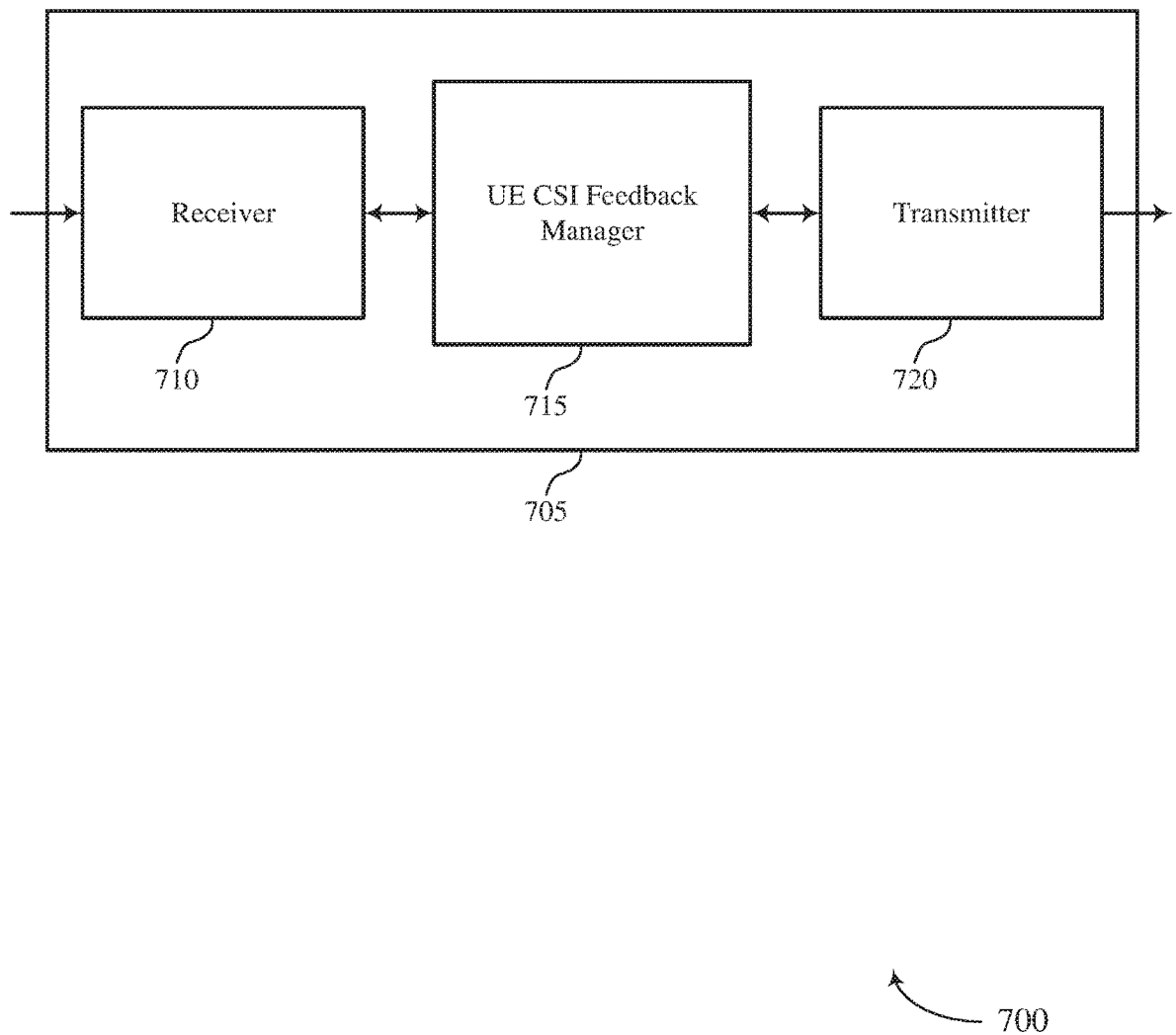
FIGS. 7 through 9 show block diagrams of a device that supports CSI feedback for flexible uplink control signaling in accordance with aspects of the present disclosure.

FIG. 7 shows a block diagram 700 of a wireless device 705 that supports CSI feedback for flexible uplink control signaling in accordance with aspects of the present disclosure. Wireless device 705 may be an example of aspects of a UE 115 as described herein. Wireless device 705 may include receiver 710, UE CSI feedback manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to CSI feedback for flexible uplink control signaling, etc.). Information may be passed on to other components of the device. The receiver 710 may be an example of aspects of the transceiver 1035 described with reference to FIG. 10. The receiver 710 may utilize a single antenna or a set of antennas.

UE CSI feedback manager 715 may be an example of aspects of the UE CSI feedback manager 1015 described with reference to FIG. 10.

UE CSI feedback manager 715 and/or at least some of its various sub-components may be implemented in hardware, software executed by a processor, firmware, or any combination thereof. If implemented in software executed by a processor, the functions of the UE CSI feedback manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE CSI feedback manager 715 and/or at least some of its various sub-components may be physically located at various positions, including being distributed such that portions of functions are implemented at different physical locations by one or more physical devices. In some examples, UE CSI feedback manager 715 and/or at least some of its various sub-components may be a separate and distinct component in accordance with various aspects of the present disclosure. In other examples, UE CSI feedback manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE CSI feedback manager 715 may identify, in a slot, uplink control resources allocated to the UE for transmitting a CSI report, compute values for a first set of CSI feedback components of the CSI report corresponding to a frequency band, determine a size of a frequency subband within the frequency band based on the uplink control resources allocated to the UE, or the values of the first set of CSI feedback components, or both, and compute values for a second set of CSI feedback components of the CSI report corresponding to the frequency subband.

The UE CSI feedback manager 715 may also receive an allocation of uplink control resources for transmitting a CSI report, where the CSI report includes a set of CSI feedback components and encode the set of CSI feedback components into a single encoded packet, where the single encoded packet includes a predetermined number of bits.

The UE CSI feedback manager 715 may also identify uplink control resources allocated to the UE for transmitting a CSI report, where the CSI report includes a first set of CSI feedback components and a second set of CSI feedback components, identify a subset of uplink control resource configurations corresponding to the identified uplink control resources from a set of uplink control resource configurations, encode the first set of CSI feedback components into a first encoded packet and the second set of CSI feedback components into a second encoded packet based on the identified subset of uplink control resource configurations, and map the first encoded packet and the second encoded packet to the identified uplink control resources based on the identified subset of uplink control resource configurations.

The UE CSI feedback manager 715 may also receive configuration signaling associated with transmitting a CSI report, where the CSI report includes a first set of CST feedback components and a second set of CSI feedback components, identify, in a first slot, first uplink control resources allocated to the UE, and in at least one subsequent slot, second uplink control resources allocated to the UE, transmit, during the first slot, the first set of CSI feedback components based on the received configuration signaling, where the first set of CSI feedback components correspond to a frequency band, and transmit, during the at least one subsequent slot, the second set of CSI feedback components based on the received configuration signaling, where the second set of CSI feedback components correspond to a frequency subband within the frequency band.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit, during the slot, the CSI report over the uplink control resources, transmit the single encoded packet over the uplink control resources during a single slot, and transmit the first encoded packet and the second encoded packet on the identified uplink control resources according to the mapping.

Figure 8:
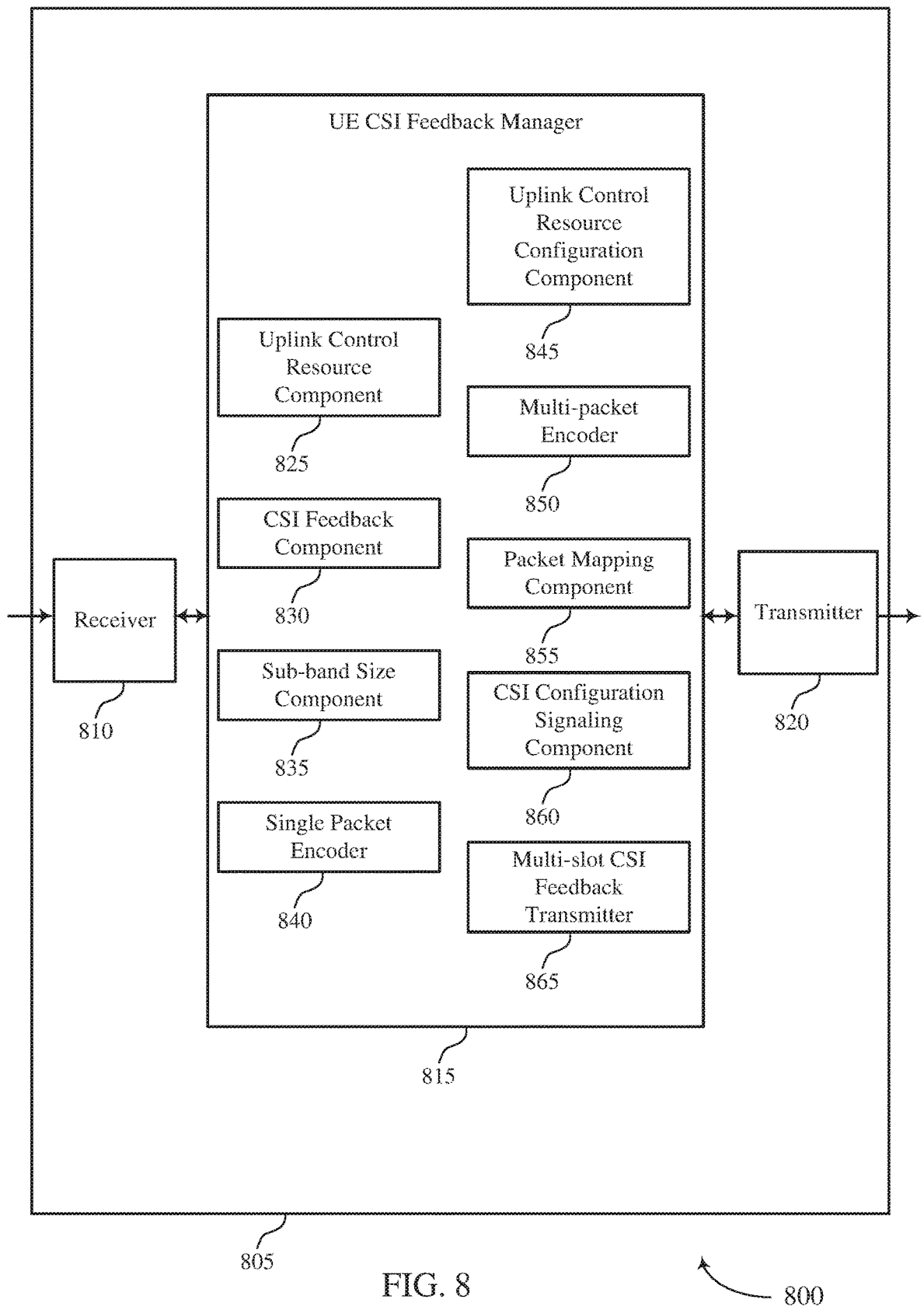

FIG. 8 shows a block diagram 800 of a wireless device 805 that supports CSI feedback for flexible uplink control signaling in accordance with aspects of the present disclosure. Wireless device 805 may be an example of aspects of a wireless device 705 or a UE 115 as described with reference to FIG. 7. Wireless device 805 may include receiver 810, UE CSI feedback manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to CSI feedback for flexible uplink control signaling, etc.). Information may be passed on to other components of the device. The receiver 810 may be an example of aspects of the transceiver 1035 described with reference to FIG. 10. The receiver 810 may utilize a single antenna or a set of antennas.

UE CSI feedback manager 815 may be an example of aspects of the UE CSI feedback manager 1015 described with reference to FIG. 10.

UE CSI feedback manager 815 may also include uplink control resource component 825, CSI feedback component 830, subband size component 835, single packet encoder 840, uplink control resource configuration component 845, multi-packet encoder 850, packet mapping component 855, CSI configuration signaling component 860, and multi-slot CSI feedback transmitter 865.

Uplink control resource component 825 may identify, in a slot, uplink control resources allocated to the UE for transmitting a CSI report, receive an allocation of uplink control resources for transmitting a CSI report, where the CSI report includes a set of CSI feedback components, identify uplink control resources allocated to the UE for transmitting a CSI report, where the CSI report includes a first set of CSI feedback components and a second set of CSI feedback components, and identify, in a first slot, first uplink control resources allocated to the UE, and in at least one subsequent slot, second uplink control resources allocated to the UE.

In some aspects, the uplink control resources include PUCCH resources or PUSCH resources, or both. In some aspects, the first set of CSI feedback components correspond to a first frequency band and the second set of CSI feedback components correspond to a frequency subband within the frequency band. In some aspects, the first uplink control resources include a duration that is greater than a duration of the second uplink control resources. In some aspects, the first uplink control resources include a duration that is less than a duration of the second uplink control resources. In some aspects, the first uplink control resources include a duration that is equal to a duration of the second uplink control resources. In some aspects, a periodicity of transmitting the CSI report is based on a sum of a number of slots allocated to transmit the first set of CSI feedback components and a number of slots allocated to transmit the second set of CSI feedback components.

CSI feedback component 830 may compute values for a first set of CSI feedback components of the CSI report corresponding to a frequency band and compute values for a second set of CSI feedback component 830 of the CSI report corresponding to the frequency subband. In some aspects, the first set of CSI feedback component 830 includes a RI, a CRI, an LI, a wideband PMI, or any combination thereof. In some aspects, the second set of CSI feedback component 830 includes a wideband PMI, narrowband PMI, a CQI, or any combination thereof. In some aspects, the CSI report is configured for periodic, aperiodic, or semi-persistent transmission.

Subband size component 835 may determine a size of a frequency subband within the frequency band based on the uplink control resources allocated to the UE, or the values of the first set of CSI feedback components, or both, receive configuration signaling that indicates the size of the frequency subband, where determining the size of the frequency subband is based on the received configuration signaling, and determine a maximum supported payload size associated with the allocated uplink resources, where determining the size of the frequency subband is based on the maximum supported payload size. In some aspects, the size of the frequency subband is determined based on a number of bits used to convey the values of the first plurality of CSI feedback components and the second plurality of CSI feedback components.

Single packet encoder 840 may encode the set of CSI feedback components into a single encoded packet, where the single encoded packet includes a predetermined number of bits and prioritize an encoding order of the set of CSI feedback components within the single encoded packet based on a reliability of bits associated with the encoding order.

Uplink control resource configuration component 845 may identify a subset of uplink control resource configurations corresponding to the identified uplink control resources from a set of uplink control resource configurations. In some aspects, the identified subset of uplink control resource configurations includes a number of discrete resources from which the identified uplink control resources are included. In some aspects, the identified subset of uplink control resource configurations includes a relative duration of the identified uplink control resources relative to a slot duration.

Multi-packet encoder 850 may encode the first set of CSI feedback components into a first encoded packet and the second set of CSI feedback components into a second encoded packet based on the identified subset of uplink control resource configurations. In some aspects, the first encoded packet includes a RI, a CRI, an LI, or both, and the second encoded packet includes a wideband PMI, a narrowband PMI, a CQI, or any combination thereof. In some aspects, the first encoded packet includes a RI, a CRI, an LI, a wideband PMI, or any combination thereof, and the second encoded packet includes a wideband PMI, a narrowband PMI, a CQI, or both.

Packet mapping component 855 may map the first encoded packet and the second encoded packet to the identified uplink control resources based on the identified subset of uplink control resource configurations, determine that the identified uplink control resources includes a single discrete resource, map the first encoded packet and the second encoded packet within the single discrete resource, determine that the identified uplink control resources includes a set of discrete resources, map the first encoded packet to a first discrete resource of the set of discrete resources and the second encoded packet to a second discrete resource of the set of discrete resources, and receive control signaling indicating an index for the set of discrete resources, where mapping the first encoded packet to the first discrete resource and the second encoded packet to the second discrete resource is based on the index.

CSI configuration signaling component 860 may receive configuration signaling associated with transmitting a CSI report, where the CSI report includes a first set of CSI feedback components and a second set of CSI feedback components. In some aspects, the configuration signaling indicates a periodicity associated with the first uplink control resources, or the second uplink control resources, or both.

Multi-slot CSI feedback transmitter 865 may transmit, during the first slot, the first set of CSI feedback components based on the received configuration signaling, where the first set of CSI feedback components correspond to a frequency band and transmit, during the at least one subsequent slot, the second set of CSI feedback components based on the received configuration signaling, where the second set of CSI feedback components correspond to a frequency subband within the frequency band. In some aspects, the second set of CSI feedback components are transmitted over a set of subsequent slots, and where a number of the set of subsequent slots is based on a size of the identified second uplink control resources.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
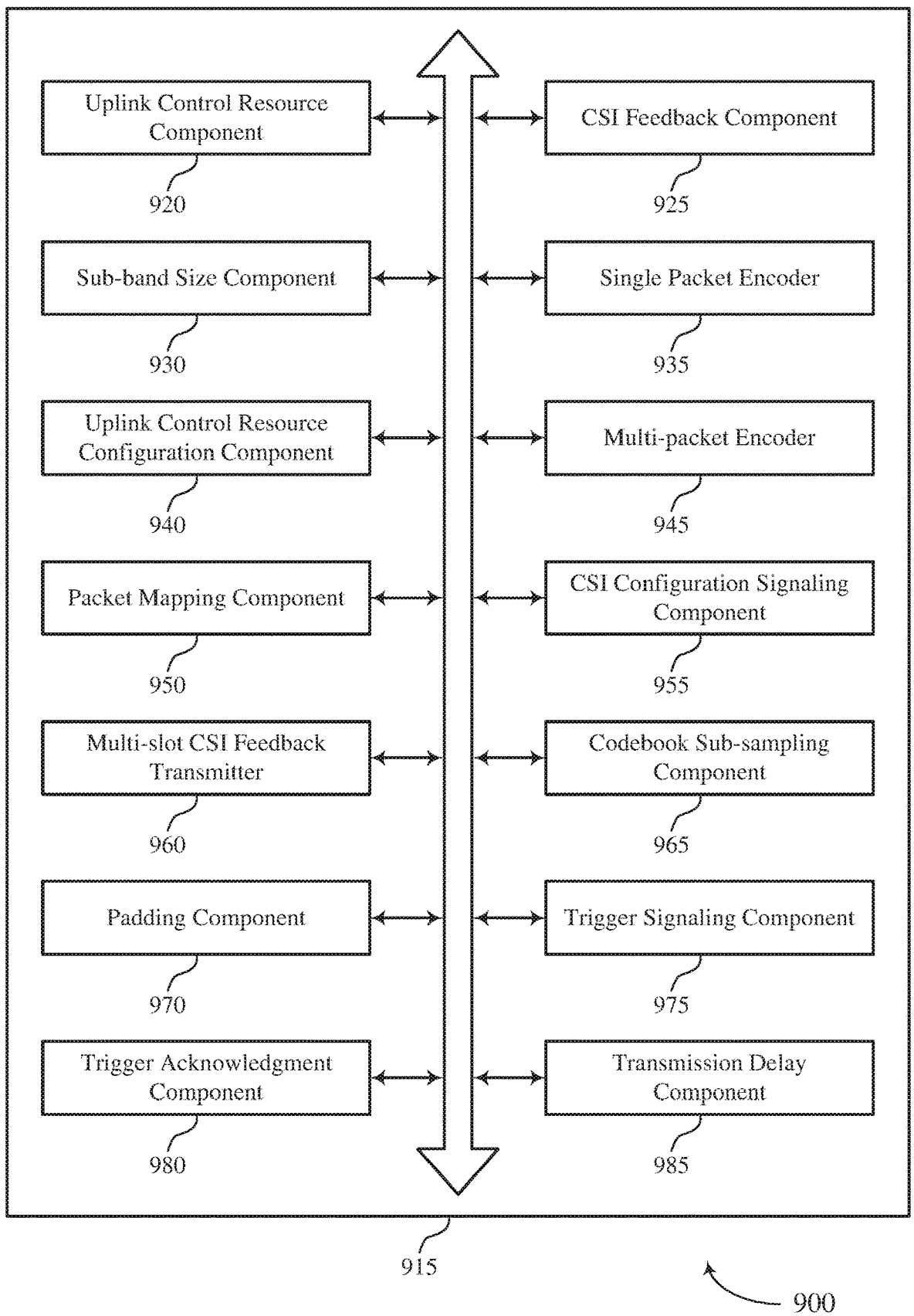

FIG. 9 shows a block diagram 900 of a UE CSI feedback manager 915 that supports CST feedback for flexible uplink control signaling in accordance with aspects of the present disclosure. The UE CSI feedback manager 915 may be an example of aspects of a UE CSI feedback manager 715, a UE CSI feedback manager 815, or a UE CSI feedback manager 1015 described with reference to FIGS. 7, 8, and 10. The UE CSI feedback manager 915 may include uplink control resource component 920, CSI feedback component 925, subband size component 930, single packet encoder 935, uplink control resource configuration component 940, multi-packet encoder 945, packet mapping component 950, CSI configuration signaling component 955, multi-slot CSI feedback transmitter 960, codebook sub-sampling component 965, padding component 970, trigger signaling component 975, trigger acknowledgment component 980, and transmission delay component 985. Each of these modules may communicate, directly or indirectly, with one another (e.g., via one or more buses).

Uplink control resource component 920 may identify, in a slot, uplink control resources allocated to the UE for transmitting a CSI report, receive an allocation of uplink control resources for transmitting a CSI report, where the CSI report includes a set of CSI feedback components, identify uplink control resources allocated to the UE for transmitting a CSI report, where the CSI report includes a first set of CSI feedback components and a second set of CSI feedback components, and identify, in a first slot, first uplink control resources allocated to the UE, and in at least one subsequent slot, second uplink control resources allocated to the UE.

In some aspects, the uplink control resources include PUCCH resources or physical uplink shared channel (PUSCH) resources, or both. In some aspects, the first set of CSI feedback components correspond to a first frequency band and the second set of CSI feedback components correspond to a frequency subband within the frequency band. In some aspects, the first uplink control resources include a duration that is greater than a duration of the second uplink control resources. In some aspects, the first uplink control resources include a duration that is less than a duration of the second uplink control resources. In some aspects, the first uplink control resources include a duration that is equal to a duration of the second uplink control resources. In some aspects, a periodicity of transmitting the CSI report is based on a sum of a number of slots allocated to transmit the first set of CSI feedback components and a number of slots allocated to transmit the second set of CSI feedback components.

CSI feedback component 925 may compute values for a first set of CSI feedback component 925 of the CSI report corresponding to a frequency band and compute values for a second set of CSI feedback component 925 of the CSI report corresponding to the frequency subband. In some aspects, the first set of CSI feedback component 925 includes a RI, an LI, a CRT, a wideband PMI, or any combination thereof. In some aspects, the second set of CSI feedback component 925 includes a wideband PMI, a narrowband PMI, a CQI, or any combination thereof. In some aspects, the CSI report is configured for periodic, aperiodic, or semi-persistent transmission.

Subband size component 930 may determine a size of a frequency subband within the frequency band based on the uplink control resources allocated to the UE, or the values of the first set of CSI feedback components, or both, receive configuration signaling that indicates the size of the frequency subband, where determining the size of the frequency subband is based on the received configuration signaling, and determine a maximum supported payload size associated with the allocated uplink resources, where determining the size of the frequency subband is based on the maximum supported payload size. In some aspects, the size of the frequency subband is determined based on a number of bits used to convey the values of the first plurality of CSI feedback components and the second plurality of CSI feedback components.

Single packet encoder 935 may encode the set of CSI feedback components into a single encoded packet, where the single encoded packet includes a predetermined number of bits and prioritize an encoding order of the set of CSI feedback components within the single encoded packet based on a reliability of bits associated with the encoding order.

Uplink control resource configuration component 940 may identify a subset of uplink control resource configurations corresponding to the identified uplink control resources from a set of uplink control resource configurations. In some aspects, the identified subset of uplink control resource configurations includes a number of discrete resources from which the identified uplink control resources are included. In some aspects, the identified subset of uplink control resource configurations includes a relative duration of the identified uplink control resources relative to a slot duration.

Multi-packet encoder 945 may encode the first set of CSI feedback components into a first encoded packet and the second set of CSI feedback components into a second encoded packet based on the identified subset of uplink control resource configurations. In some aspects, the first encoded packet includes a RI, an LI, or a CRI, or any combination thereof, and the second encoded packet includes a wideband PMI, a narrowband PMI, a CQI, or any combination thereof. In some aspects, the first encoded packet includes a RI, an LI, a CRI, a wideband PMI, or any combination thereof, and the second encoded packet includes a wideband PMI, a narrowband PMI, or a CQI, or any combination thereof.

Packet mapping component 950 may map the first encoded packet and the second encoded packet to the identified uplink control resources based on the identified subset of uplink control resource configurations, determine that the identified uplink control resources includes a single discrete resource, map the first encoded packet and the second encoded packet within the single discrete resource, determine that the identified uplink control resources includes a set of discrete resources, map the first encoded packet to a first discrete resource of the set of discrete resources and the second encoded packet to a second discrete resource of the set of discrete resources, and receive control signaling indicating an index for the set of discrete resources, where mapping the first encoded packet to the first discrete resource and the second encoded packet to the second discrete resource is based on the index.

CSI configuration signaling component 955 may receive configuration signaling associated with transmitting a CSI report, where the CSI report includes a first set of CSI feedback components and a second set of CSI feedback components. In some aspects, the configuration signaling indicates a periodicity associated with the first uplink control resources, or the second uplink control resources, or both.

Multi-slot CSI feedback transmitter 960 may transmit, during the first slot, the first set of CSI feedback components based on the received configuration signaling, where the first set of CSI feedback components correspond to a frequency band and transmit, during the at least one subsequent slot, the second set of CSI feedback components based on the received configuration signaling, where the second set of CSI feedback components correspond to a frequency subband within the frequency band. In some aspects, the second set of CSI feedback components are transmitted over a set of subsequent slots, and where a number of the set of subsequent slots is based on a size of the identified second uplink control resources.

Codebook sub-sampling component 965 may sub-sample a codebook associated with one or more of the first set or the second set of CSI feedback components and sub-sample a codebook associated with one or more of the set of CSI feedback components to reduce a number of bits used to convey the single encoded packet to the predetermined number of bits.

Padding component 970 may insert one or more padding bits to the single encoded packet to increase a number of bits used to convey the single encoded packet to the predetermined number of bits. In some aspects, the one or more padding bits are inserted at an end of the single encoded packet.

Trigger signaling component 975 may receive a trigger signaling that triggers the UE to prepare the CSI report prior to the UE identifying the first uplink control resources and the second uplink control resources.

Trigger acknowledgment component 980 may transmit an acknowledgement frame in response to receiving the trigger signaling.

Transmission delay component 985 may identify a time period after transmission of the acknowledgment frame, where the first set of CSI feedback components are transmitted after the time period has expired. In some aspects, the time period is indicated in the received configuration signaling.

Figure 10:
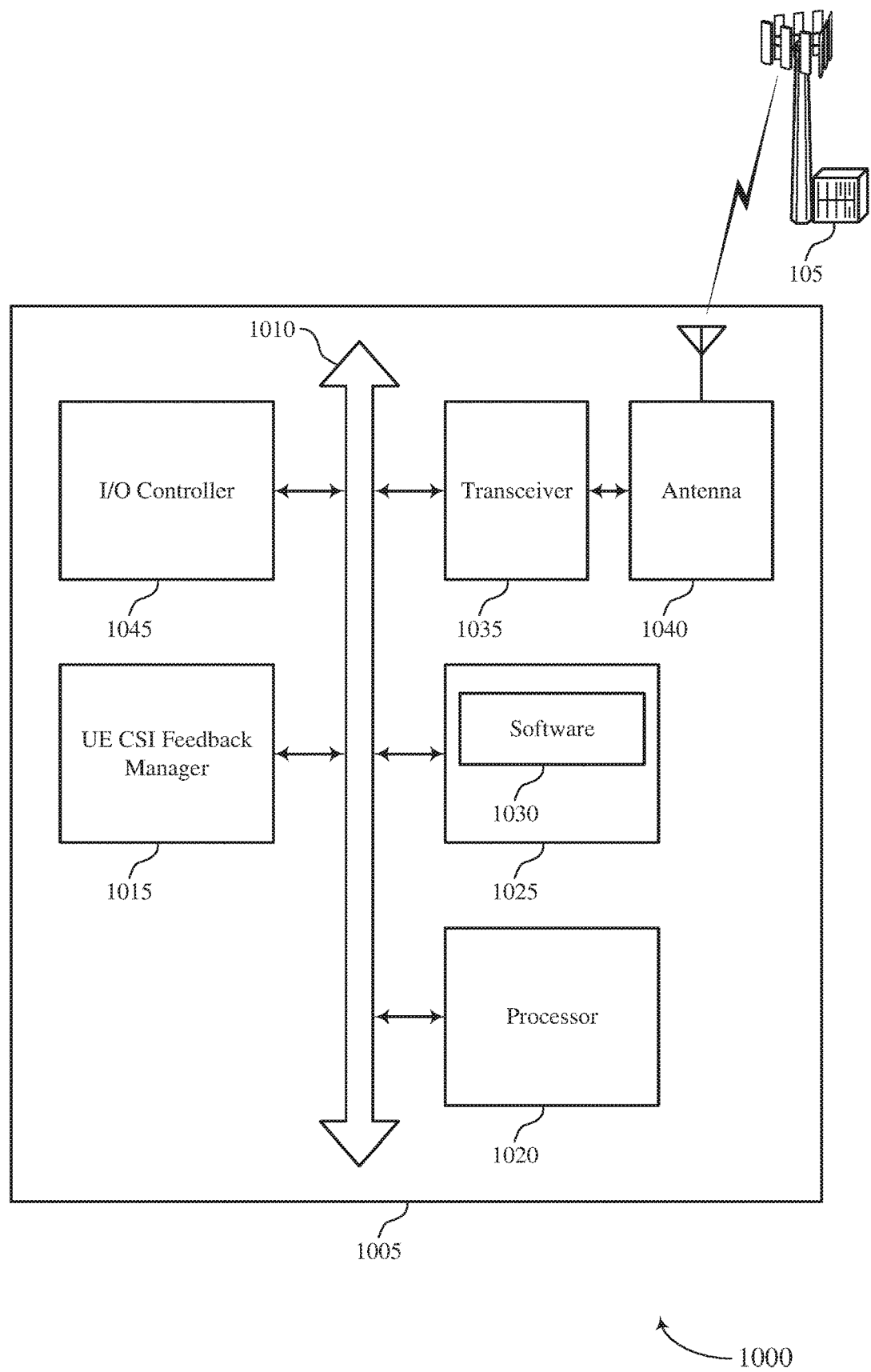
FIG. 10 illustrates a block diagram of a system including a user equipment (UE) that supports CSI feedback for flexible uplink control signaling in accordance with aspects of the present disclosure.

FIG. 10 shows a diagram of a system 1000 including a device 1005 that supports CSI feedback for flexible uplink control signaling in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE CSI feedback manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some aspects, processor 1020 may be configured to operate a memory array using a memory controller. In other aspects, a memory controller may be integrated into processor 1020. Processor 1020 may be configured to execute computer-readable instructions stored in a memory to perform various functions (e.g., functions or tasks supporting CSI feedback for flexible uplink control signaling).

Memory 1025 may include random access memory (RAM) and read only memory (ROM). The memory 1025 may store computer-readable, computer-executable software 1030 including instructions that, when executed, cause the processor to perform various functions described herein. In some aspects, the memory 1025 may contain, among other things, a basic input/output system (BIOS) which may control basic hardware or software operation such as the interaction with peripheral components or devices.

Software 1030 may include code to implement aspects of the present disclosure, including code to support CSI feedback for flexible uplink control signaling. Software 1030 may be stored in a non-transitory computer-readable medium such as system memory or other memory. In some aspects, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some aspects, the wireless device may include a single antenna 1040. However, in some aspects the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some aspects, I/O controller 1045 may represent a physical connection or port to an external peripheral. In some aspects, I/O controller 1045 may utilize an operating system such as iOS®, ANDROID®, MS-DOS®, MS-WINDOWS®, OS/2®, UNIX®, LINUX®, or another known operating system. In other aspects, I/O controller 1045 may represent or interact with a modem, a keyboard, a mouse, a touchscreen, or a similar device. In some aspects, I/O controller 1045 may be implemented as part of a processor. In some aspects, a user may interact with device 1005 via I/O controller 1045 or via hardware components controlled by I/O controller 1045.

Figure 11:
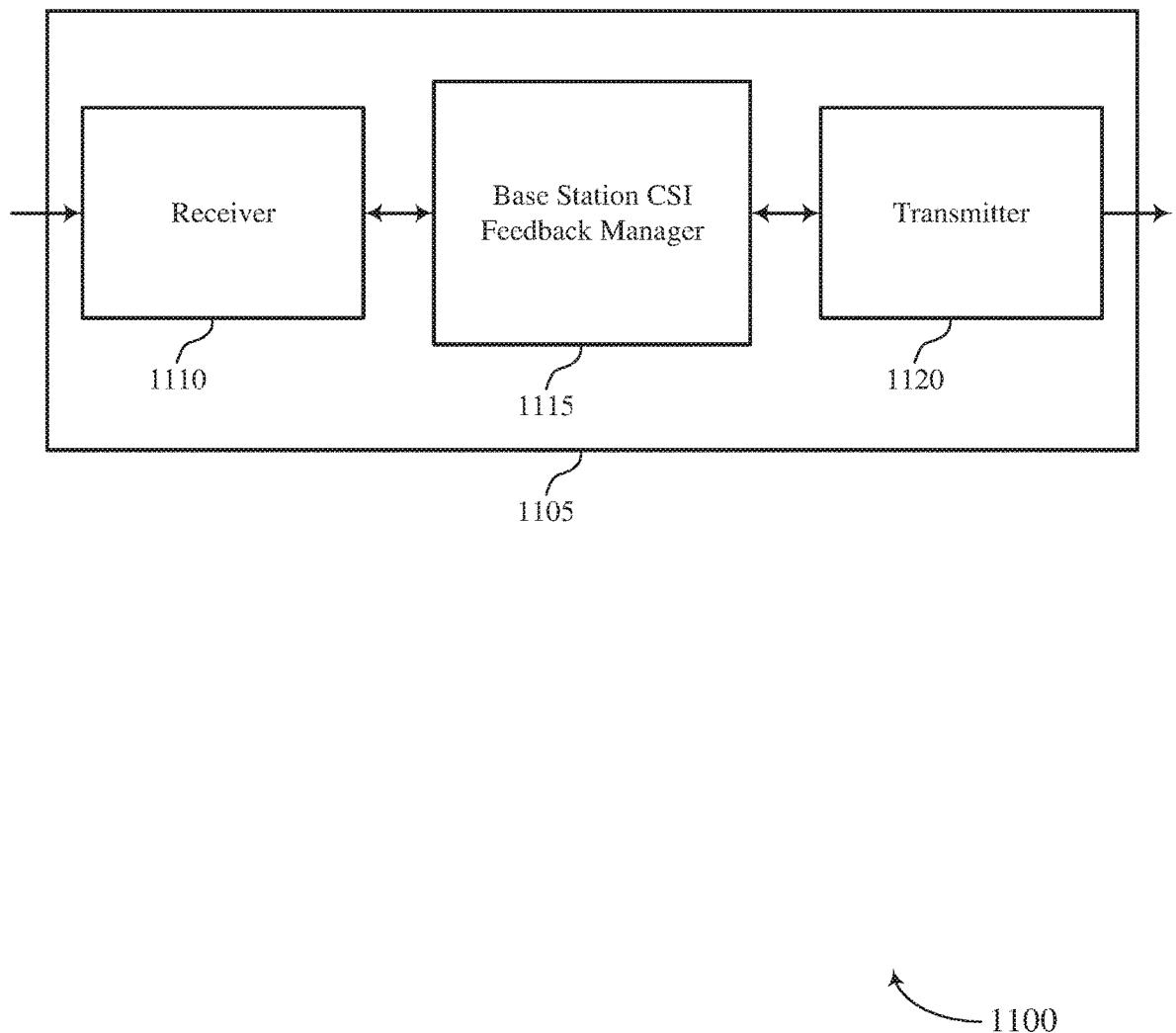
FIGS. 11 through 13 show block diagrams of a device that supports CSI feedback for flexible uplink control signaling in accordance with aspects of the present disclosure.

FIG. 11 shows a block diagram 1100 of a wireless device 1105 that supports CSI feedback for flexible uplink control signaling in accordance with aspects of the present disclosure. Wireless device 1105 may be an example of aspects of a base station 105 as described herein. Wireless device 1105 may include receiver 1110, base station CSI feedback manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to CSI feedback for flexible uplink control signaling, etc.). Information may be passed on to other components of the device. The receiver 1110 may be an example of aspects of the transceiver 1435 described with reference to FIG. 14. The receiver 1110 may utilize a single antenna or a set of antennas.

Receiver 1110 may receive, during the slot, the CSI report over the uplink control resources and receive, from the UE, a single encoded packet including the set of CSI feedback components over the uplink control resources, where the single encoded packet includes a predetermined number of bits.

Base station CSI feedback manager 1115 may be an example of aspects of the base station CSI feedback manager 1415 described with reference to FIG. 14.

Base station CSI feedback manager 1115 and/or at least some of its various sub-components may be implemented in hardware, software executed by a processor, firmware, or any combination thereof. If implemented in software executed by a processor, the functions of the base station CSI feedback manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station CSI feedback manager 1115 and/or at least some of its various sub-components may be physically located at various positions, including being distributed such that portions of functions are implemented at different physical locations by one or more physical devices. In some examples, base station CSI feedback manager 1115 and/or at least some of its various sub-components may be a separate and distinct component in accordance with various aspects of the present disclosure. In other examples, base station CSI feedback manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station CSI feedback manager 1115 may allocate, to a UE, uplink control resources for transmitting a CSI report in a slot, where the CSI report includes a first set of CSI feedback components corresponding to a frequency band and a second set of CSI feedback components corresponding to a frequency subband within the frequency band and transmit, to the UE, configuration signaling that indicates a size of the frequency subband, where the size of the frequency subband is based on the uplink control resources allocated to the UE.

The base station CSI feedback manager 1115 may also allocate, to a UE, uplink control resources for transmitting a CSI report in a slot, where the CSI report includes a set of CSI feedback components and decode the single encoded packet. The base station CSI feedback manager 1115 may also transmit, to a UE, configuration signaling associated with transmitting a CSI report, where the CSI report includes a first set of CSI feedback components and a second set of CSI feedback components, identify, in a first slot, first uplink control resources allocated to the UE, and in at least one subsequent slot, second uplink control resources allocated to the UE, receive, during the first slot, the first set of CSI feedback components based on the transmitted configuration signaling, where the first set of CSI feedback components correspond to a frequency band, and receive, during the at least one subsequent slot, the second set of CSI feedback components based on the transmitted configuration signaling, where the second set of CSI feedback components correspond to a frequency subband within the frequency band.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
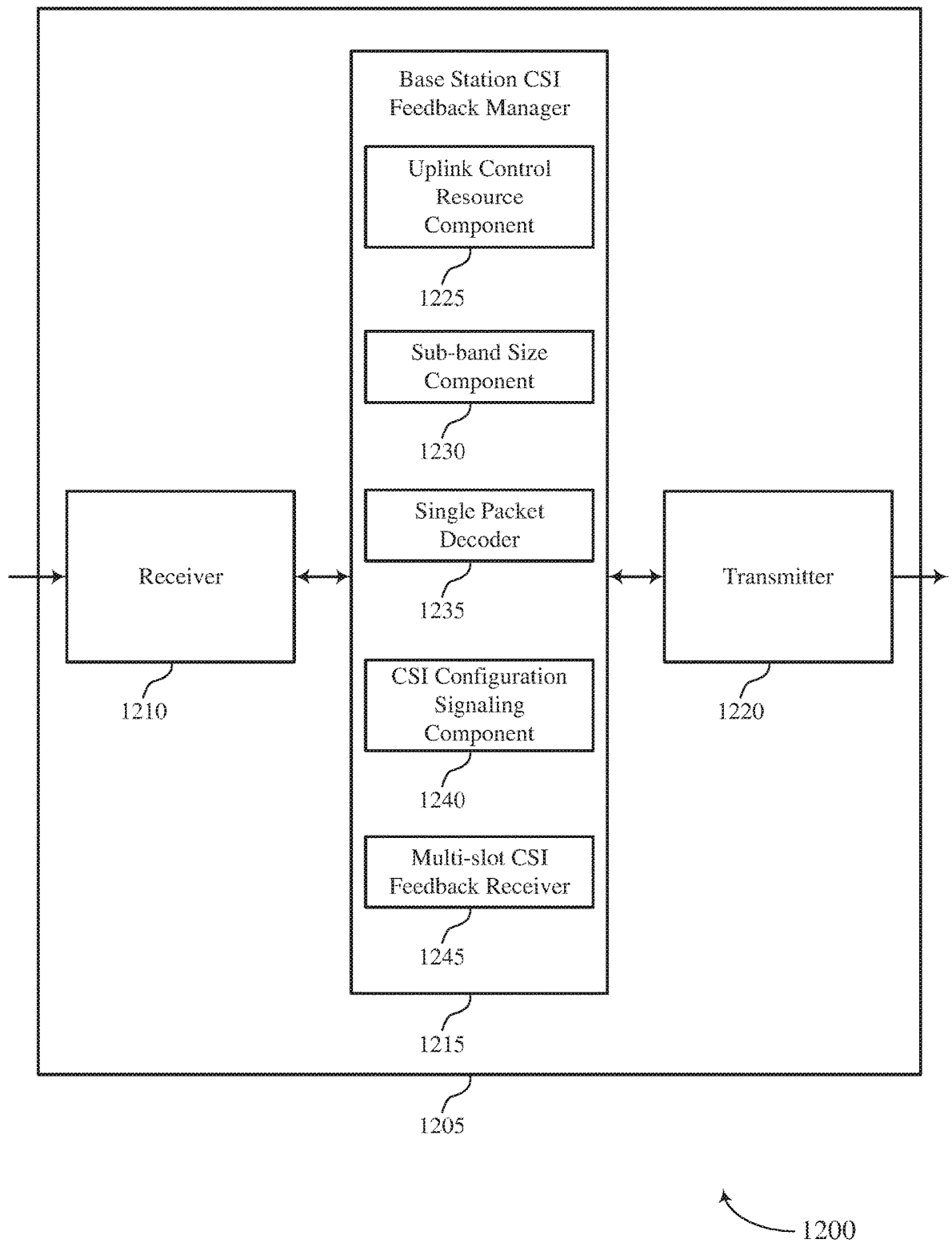

FIG. 12 shows a block diagram 1200 of a wireless device 1205 that supports CSI feedback for flexible uplink control signaling in accordance with aspects of the present disclosure. Wireless device 1205 may be an example of aspects of a wireless device 1105 or a base station 105 as described with reference to FIG. 11. Wireless device 1205 may include receiver 1210, base station CSI feedback manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to CSI feedback for flexible uplink control signaling, etc.). Information may be passed on to other components of the device. The receiver 1210 may be an example of aspects of the transceiver 1435 described with reference to FIG. 14. The receiver 1210 may utilize a single antenna or a set of antennas.

Base station CSI feedback manager 1215 may be an example of aspects of the base station CSI feedback manager 1415 described with reference to FIG. 14.

Base station CSI feedback manager 1215 may also include uplink control resource component 1225, subband size component 1230, single packet decoder 1235, CSI configuration signaling component 1240, and multi-slot CSI feedback receiver 1245.

Uplink control resource component 1225 may allocate, to a UE, uplink control resources for transmitting a CSI report in a slot, where the CSI report includes a first set of CSI feedback components corresponding to a frequency band and a second set of CSI feedback components corresponding to a frequency subband within the frequency band, allocate, to a UE, uplink control resources for transmitting a CSI report in a slot, where the CSI report includes a set of CSI feedback components, and identify, in a first slot, first uplink control resources allocated to the UE, and in at least one subsequent slot, second uplink control resources allocated to the UE.

Subband size component 1230 may transmit, to the UE, configuration signaling that indicates a size of the frequency subband, where the size of the frequency subband is based on the uplink control resources allocated to the UE.

Single packet decoder 1235 may decode the single encoded packet, update a size of a RI feedback component based on the first decoding, and update a size of a PMI feedback component and a size of a CQI feedback component based on the second decoding. In some aspects, decoding the single encoded packet includes decoding the single encoded packet a first time based on the predetermined number of bits. In some aspects, decoding the single encoded packet includes decoding the single encoded packet a second time based on the updated size of the RI feedback component. In some aspects, decoding the single encoded packet includes decoding the single encoded packet a third time based on the updated size of the PMI feedback component and the updated size of the CQI feedback component.

CSI configuration signaling component 1240 may transmit, to a UE, configuration signaling associated with transmitting a CSI report, where the CSI report includes a first set of CSI feedback components and a second set of CSI feedback components.

Multi-slot CSI feedback receiver 1245 may receive, during the first slot, the first set of CSI feedback components based on the transmitted configuration signaling, where the first set of CSI feedback components correspond to a frequency band and receive, during the at least one subsequent slot, the second set of CSI feedback components based on the transmitted configuration signaling, where the second set of CSI feedback components correspond to a frequency subband within the frequency band.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
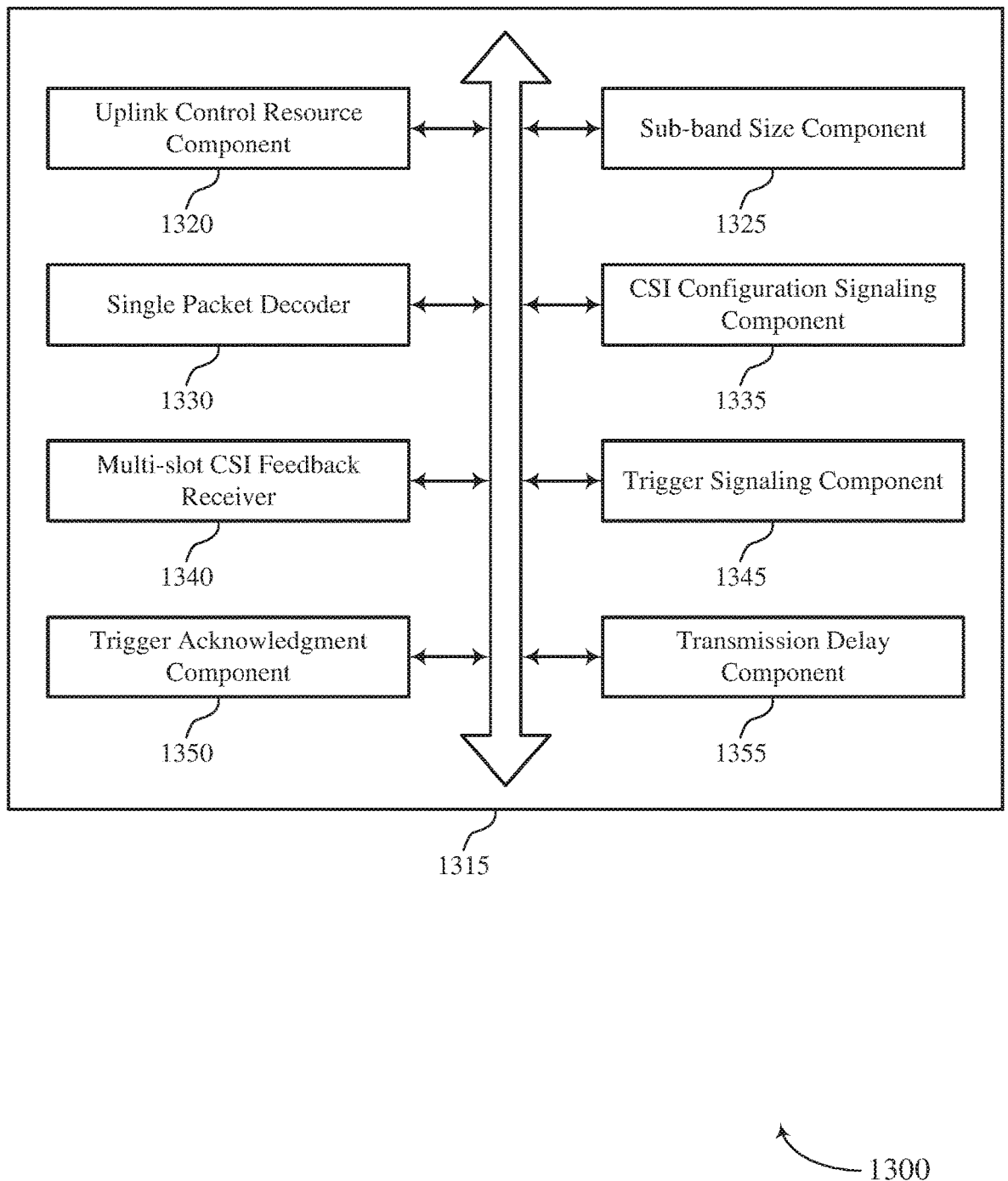

FIG. 13 shows a block diagram 1300 of a base station CSI feedback manager 1315 that supports CSI feedback for flexible uplink control signaling in accordance with aspects of the present disclosure. The base station CSI feedback manager 1315 may be an example of aspects of a base station CSI feedback manager 1415 described with reference to FIGS. 11, 12, and 14. The base station CSI feedback manager 1315 may include uplink control resource component 1320, subband size component 1325, single packet decoder 1330, CSI configuration signaling component 1335, multi-slot CSI feedback receiver 1340, trigger signaling component 1345, trigger acknowledgment component 1350, and transmission delay component 1355. Each of these modules may communicate, directly or indirectly, with one another (e.g., via one or more buses).

Uplink control resource component 1320 may allocate, to a UE, uplink control resources for transmitting a CSI report in a slot, where the CSI report includes a first set of CSI feedback components corresponding to a frequency band and a second set of CSI feedback components corresponding to a frequency subband within the frequency band, allocate, to a UE, uplink control resources for transmitting a CSI report in a slot, where the CSI report includes a set of CSI feedback components, and identify, in a first slot, first uplink control resources allocated to the UE, and in at least one subsequent slot, second uplink control resources allocated to the UE.

Subband size component 1325 may transmit, to the UE, configuration signaling that indicates a size of the frequency subband, where the size of the frequency subband is based on the uplink control resources allocated to the UE.

Single packet decoder 1330 may decode the single encoded packet, update a size of a RI feedback component based on the first decoding, and update a size of a PMI feedback component and a size of a CQI feedback component based on the second decoding. In some aspects, decoding the single encoded packet includes decoding the single encoded packet a first time based on the predetermined number of bits. In some aspects, decoding the single encoded packet includes decoding the single encoded packet a second time based on the updated size of the RI feedback component. In some aspects, decoding the single encoded packet includes decoding the single encoded packet a third time based on the updated size of the PMI feedback component and the updated size of the CQI feedback component.

CSI configuration signaling component 1335 may transmit, to a UE, configuration signaling associated with transmitting a CSI report, where the CSI report includes a first set of CSI feedback components and a second set of CSI feedback components.

Multi-slot CSI feedback receiver 1340 may receive, during the first slot, the first set of CSI feedback components based on the transmitted configuration signaling, where the first set of CSI feedback components correspond to a frequency band and receive, during the at least one subsequent slot, the second set of CSI feedback components based on the transmitted configuration signaling, where the second set of CSI feedback components correspond to a frequency subband within the frequency band.

Trigger signaling component 1345 may transmit a trigger signaling that triggers the UE to prepare the CSI report.

Trigger acknowledgment component 1350 may receive an acknowledgement frame based on the trigger signaling.

Transmission delay component 1355 may identify a time period after reception of the acknowledgment frame, where the first set of CSI feedback components are received after the time period has expired.

Figure 14:
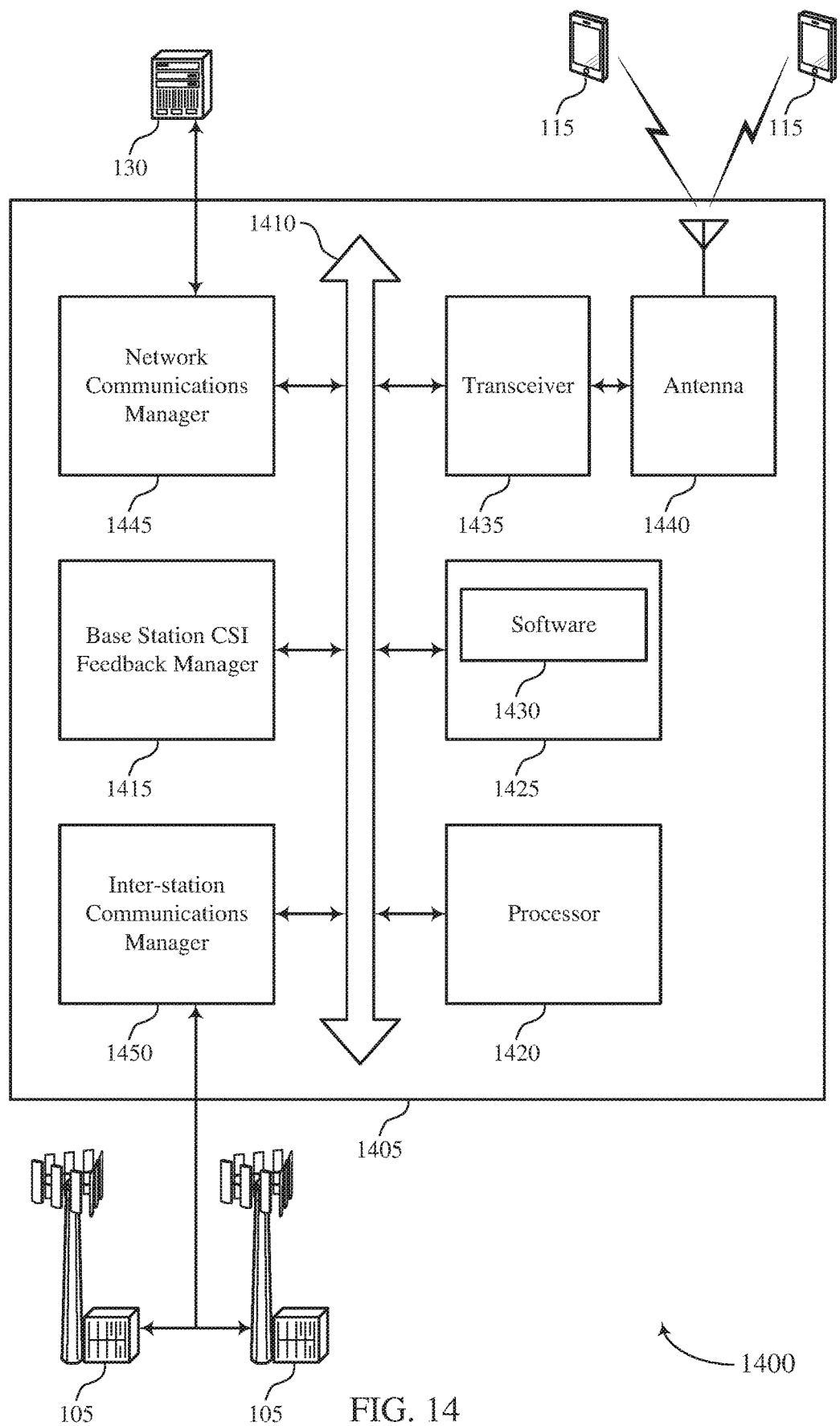
FIG. 14 illustrates a block diagram of a system including a base station that supports CSI feedback for flexible uplink control signaling in accordance with aspects of the present disclosure.

FIG. 14 shows a diagram of a system 1400 including a device 1405 that supports CSI feedback for flexible uplink control signaling in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station CSI feedback manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 1420 may be configured to operate a memory array using a memory controller. In other aspects, a memory controller may be integrated into processor 1420. Processor 1420 may be configured to execute computer-readable instructions stored in a memory to perform various functions (e.g., functions or tasks supporting CSI feedback for flexible uplink control signaling).

Memory 1425 may include RAM and ROM. The memory 1425 may store computer-readable, computer-executable software 1430 including instructions that, when executed, cause the processor to perform various functions described herein. In some aspects, the memory 1425 may contain, among other things, a BIOS which may control basic hardware or software operation such as the interaction with peripheral components or devices.

Software 1430 may include code to implement aspects of the present disclosure, including code to support CSI feedback for flexible uplink control signaling. Software 1430 may be stored in a non-transitory computer-readable medium such as system memory or other memory. In some aspects, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some aspects, the wireless device may include a single antenna 1440. However, in some aspects the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
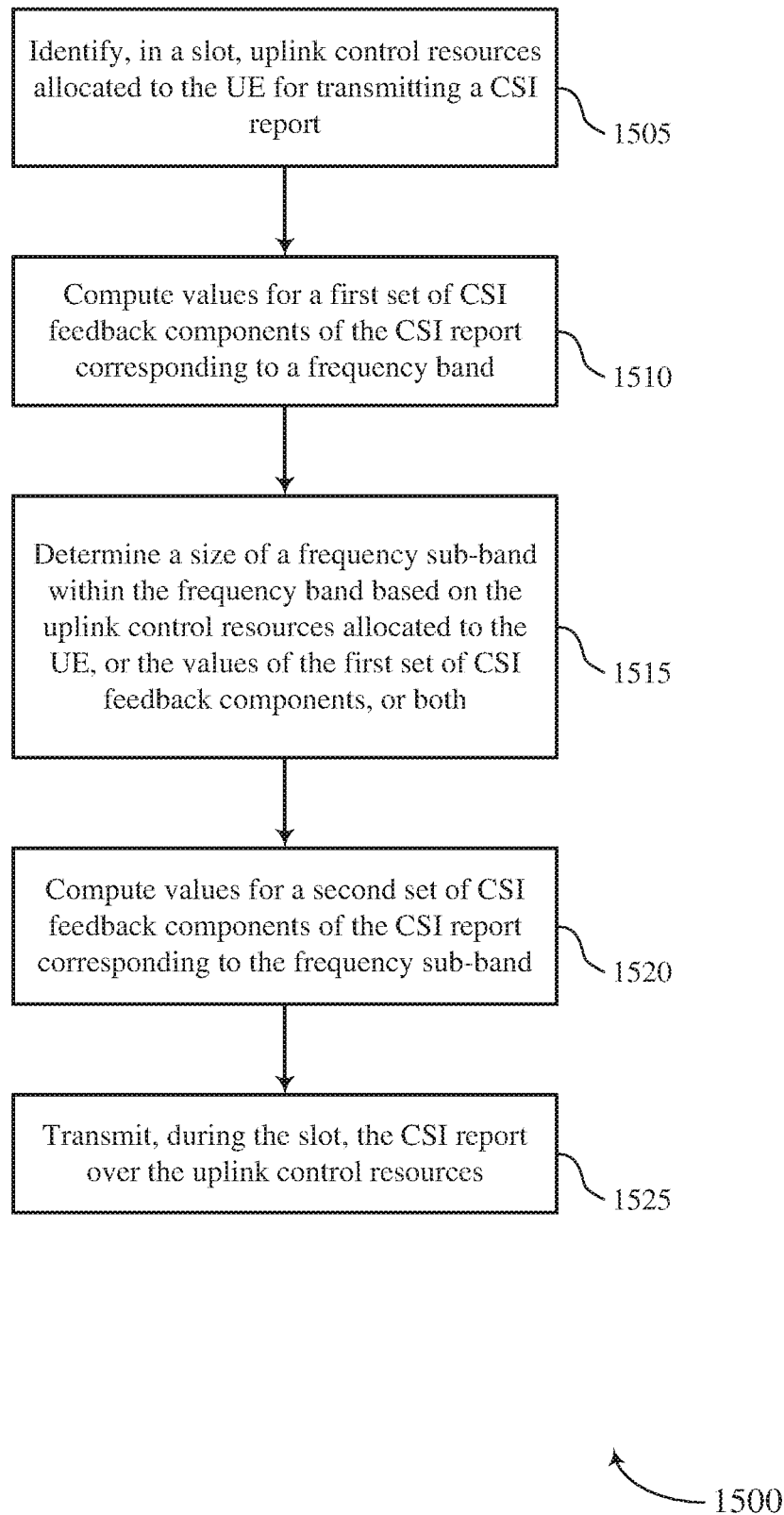
FIGS. 15 through 27 illustrate methods for CSI feedback for flexible uplink control signaling in accordance with aspects of the present disclosure.

FIG. 15 shows a flowchart illustrating a method 1500 for CSI feedback for flexible uplink control signaling in accordance with aspects of the present disclosure. The operations of method 1500 may be implemented by a UE 115 or its components as described herein. For example, the operations of method 1500 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 1505 the UE 115 may identify, in a slot, uplink control resources allocated to the UE for transmitting a CSI report. The operations of block 1505 may be performed according to the methods described herein. In certain examples, aspects of the operations of block 1505 may be performed by a uplink control resource component as described with reference to FIGS. 7 through 10.

At block 1510 the UE 115 may compute values for a first plurality of CSI feedback components of the CSI report corresponding to a frequency band. The operations of block 1510 may be performed according to the methods described herein. In certain examples, aspects of the operations of block 1510 may be performed by a CSI feedback component as described with reference to FIGS. 7 through 10.

At block 1515 the UE 115 may determine a size of a frequency subband within the frequency band based at least in part on the uplink control resources allocated to the UE, or the values of the first plurality of CSI feedback components, or both. The operations of block 1515 may be performed according to the methods described herein. In certain examples, aspects of the operations of block 1515 may be performed by a subband size component as described with reference to FIGS. 7 through 10.

At block 1520 the UE 115 may compute values for a second plurality of CSI feedback components of the CSI report corresponding to the frequency subband. The operations of block 1520 may be performed according to the methods described herein. In certain examples, aspects of the operations of block 1520 may be performed by a CSI feedback component as described with reference to FIGS. 7 through 10.

At block 1525 the UE 115 may transmit, during the slot, the CSI report over the uplink control resources. The operations of block 1525 may be performed according to the methods described herein. In certain examples, aspects of the operations of block 1525 may be performed by a transmitter as described with reference to FIGS. 7 through 10.

Figure 16:
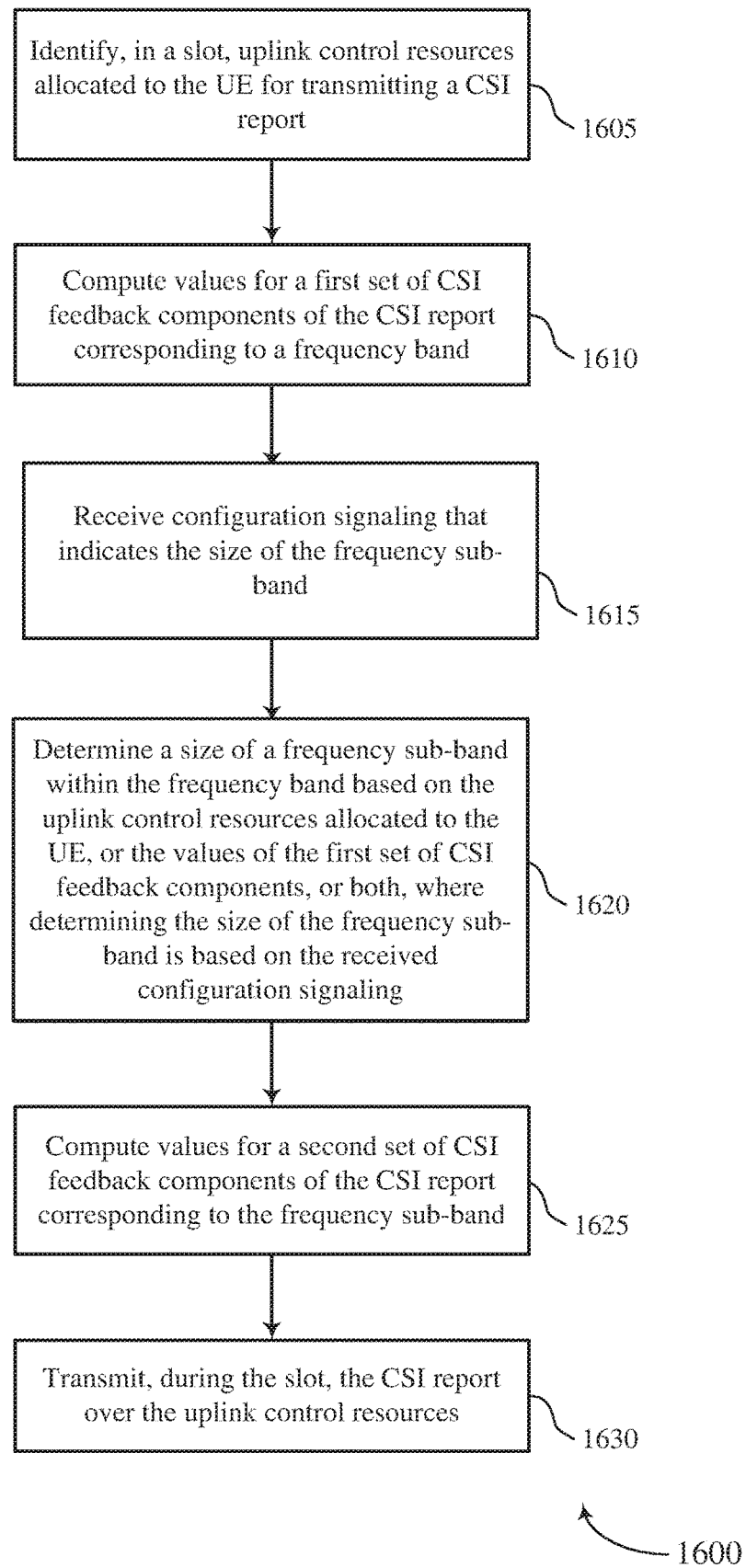

FIG. 16 shows a flowchart illustrating a method 1600 for CSI feedback for flexible uplink control signaling in accordance with aspects of the present disclosure. The operations of method 1600 may be implemented by a UE 115 or its components as described herein. For example, the operations of method 1600 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 1605 the UE 115 may identify, in a slot, uplink control resources allocated to the UE for transmitting a CSI report. The operations of block 1605 may be performed according to the methods described herein. In certain examples, aspects of the operations of block 1605 may be performed by a uplink control resource component as described with reference to FIGS. 7 through 10.

At block 1610 the UE 115 may compute values for a first plurality of CSI feedback components of the CSI report corresponding to a frequency band. The operations of block 1610 may be performed according to the methods described herein. In certain examples, aspects of the operations of block 1610 may be performed by a CSI feedback component as described with reference to FIGS. 7 through 10.

At block 1615 the UE 115 may receive configuration signaling that indicates the size of the frequency subband.

At block 1620 the UE 115 may determine a size of a frequency subband within the frequency band based at least in part on the uplink control resources allocated to the UE, or the values of the first plurality of CSI feedback components, or both. In some aspects, determining the size of the frequency subband is based at least in part on the received configuration signaling. The operations of block 1620 may be performed according to the methods described herein. In certain examples, aspects of the operations of block 1620 may be performed by a subband size component as described with reference to FIGS. 7 through 10.

At block 1625 the UE 115 may compute values for a second plurality of CSI feedback components of the CSI report corresponding to the frequency subband. The operations of block 1625 may be performed according to the methods described herein. In certain examples, aspects of the operations of block 1625 may be performed by a CSI feedback component as described with reference to FIGS. 7 through 10.

At block 1630 the UE 115 may transmit, during the slot, the CSI report over the uplink control resources. The operations of block 1630 may be performed according to the methods described herein. In certain examples, aspects of the operations of block 1630 may be performed by a transmitter as described with reference to FIGS. 7 through 10.

Figure 17:
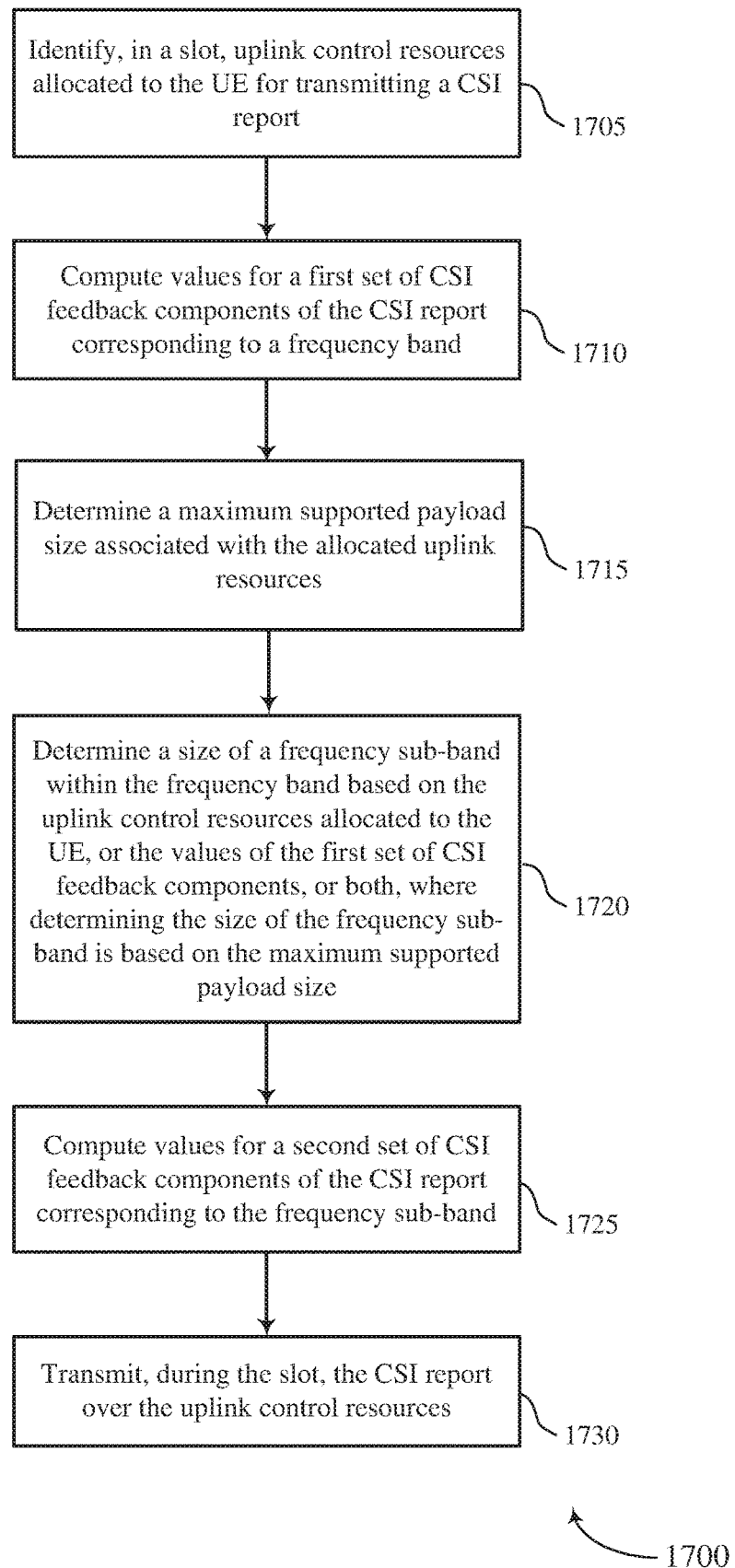

FIG. 17 shows a flowchart illustrating a method 1700 for CSI feedback for flexible uplink control signaling in accordance with aspects of the present disclosure. The operations of method 1700 may be implemented by a UE 115 or its components as described herein. For example, the operations of method 1700 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 1705 the UE 115 may identify, in a slot, uplink control resources allocated to the UE for transmitting a CSI report. The operations of block 1705 may be performed according to the methods described herein. In certain examples, aspects of the operations of block 1705 may be performed by a uplink control resource component as described with reference to FIGS. 7 through 10.

At block 1710 the UE 115 may compute values for a first plurality of CSI feedback components of the CSI report corresponding to a frequency band. The operations of block 1710 may be performed according to the methods described herein. In certain examples, aspects of the operations of block 1710 may be performed by a CSI feedback component as described with reference to FIGS. 7 through 10.

At block 1715 the UE 115 may determine a maximum supported payload size associated with the allocated uplink resources. The operations of block 1715 may be performed according to the methods described herein. In certain examples, aspects of the operations of block 1715 may be performed by a subband size component as described with reference to FIGS. 7 through 10.

At block 1720 the UE 115 may determine a size of a frequency subband within the frequency band based at least in part on the uplink control resources allocated to the UIE, or the values of the first plurality of CSI feedback components, or both. In some aspects, determining the size of the frequency subband is based at least in part on the maximum supported payload size. The operations of block 1720 may be performed according to the methods described herein. In certain examples, aspects of the operations of block 1720 may be performed by a subband size component as described with reference to FIGS. 7 through 10.

At block 1725 the UE 115 may compute values for a second plurality of CSI feedback components of the CSI report corresponding to the frequency subband. The operations of block 1725 may be performed according to the methods described herein. In certain examples, aspects of the operations of block 1725 may be performed by a CSI feedback component as described with reference to FIGS. 7 through 10.

At block 1730 the UE 115 may transmit, during the slot, the CSI report over the uplink control resources. The operations of block 1730 may be performed according to the methods described herein. In certain examples, aspects of the operations of block 1730 may be performed by a transmitter as described with reference to FIGS. 7 through 10.

Figure 18:
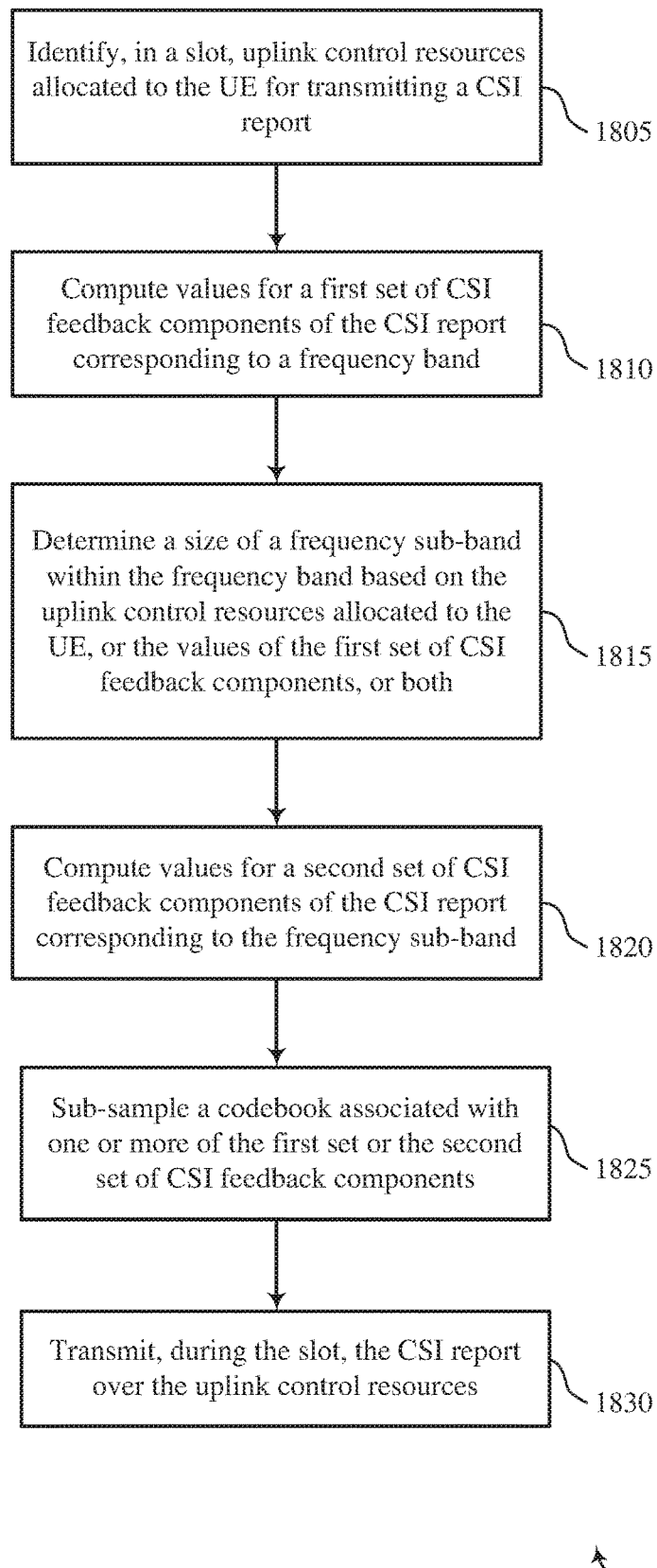

FIG. 18 shows a flowchart illustrating a method 1800 for CSI feedback for flexible uplink control signaling in accordance with aspects of the present disclosure. The operations of method 1800 may be implemented by a UE 115 or its components as described herein. For example, the operations of method 1800 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 1805 the UE 115 may identify, in a slot, uplink control resources allocated to the UE for transmitting a CSI report. The operations of block 1805 may be performed according to the methods described herein. In certain examples, aspects of the operations of block 1805 may be performed by a uplink control resource component as described with reference to FIGS. 7 through 10.

At block 1810 the UE 115 may compute values for a first plurality of CSI feedback components of the CSI report corresponding to a frequency band. The operations of block 1810 may be performed according to the methods described herein. In certain examples, aspects of the operations of block 1810 may be performed by a CSI feedback component as described with reference to FIGS. 7 through 10.

At block 1815 the UE 115 may determine a size of a frequency subband within the frequency band based at least in part on the uplink control resources allocated to the UE, or the values of the first plurality of CSI feedback components, or both. The operations of block 1815 may be performed according to the methods described herein. In certain examples, aspects of the operations of block 1815 may be performed by a subband size component as described with reference to FIGS. 7 through 10.

At block 1820 the UE 115 may compute values for a second plurality of CSI feedback components of the CSI report corresponding to the frequency subband. The operations of block 1820 may be performed according to the methods described herein. In certain examples, aspects of the operations of block 1820 may be performed by a CSI feedback component as described with reference to FIGS. 7 through 10.

At block 1825 the UE 115 may sub-sample a codebook associated with one or more of the first plurality or the second plurality of CSI feedback components. The operations of block 1825 may be performed according to the methods described herein. In certain examples, aspects of the operations of block 1825 may be performed by a codebook sub-sampling component as described with reference to FIGS. 7 through 10.

At block 1830 the UE 115 may transmit, during the slot, the CSI report over the uplink control resources. The operations of block 1830 may be performed according to the methods described herein. In certain examples, aspects of the operations of block 1830 may be performed by a transmitter as described with reference to FIGS. 7 through 10.

Figure 19:
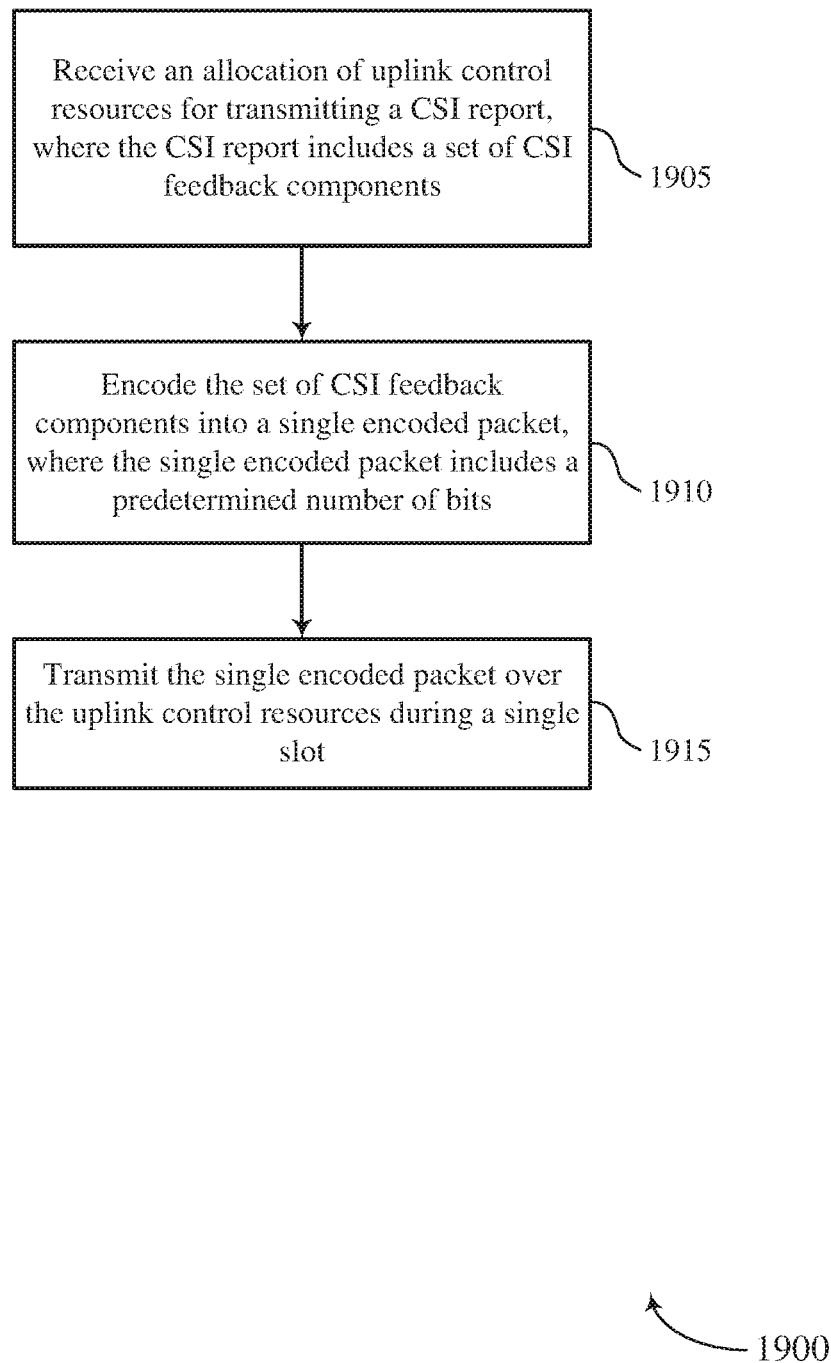

FIG. 19 shows a flowchart illustrating a method 1900 for CSI feedback for flexible uplink control signaling in accordance with aspects of the present disclosure. The operations of method 1900 may be implemented by a UE 115 or its components as described herein. For example, the operations of method 1900 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 1905 the UE 115 may receive an allocation of uplink control resources for transmitting a CSI report, wherein the CSI report comprises a plurality of CSI feedback components. The operations of block 1905 may be performed according to the methods described herein. In certain examples, aspects of the operations of block 1905 may be performed by a uplink control resource component as described with reference to FIGS. 7 through 10.

At block 1910 the UE 115 may encode the plurality of CSI feedback components into a single encoded packet, wherein the single encoded packet comprises a predetermined number of bits. The operations of block 1910 may be performed according to the methods described herein. In certain examples, aspects of the operations of block 1910 may be performed by a single packet encoder as described with reference to FIGS. 7 through 10.

At block 1915 the UE 115 may transmit the single encoded packet over the uplink control resources during a single slot. The operations of block 1915 may be performed according to the methods described herein. In certain examples, aspects of the operations of block 1915 may be performed by a transmitter as described with reference to FIGS. 7 through 10.

Figure 20:
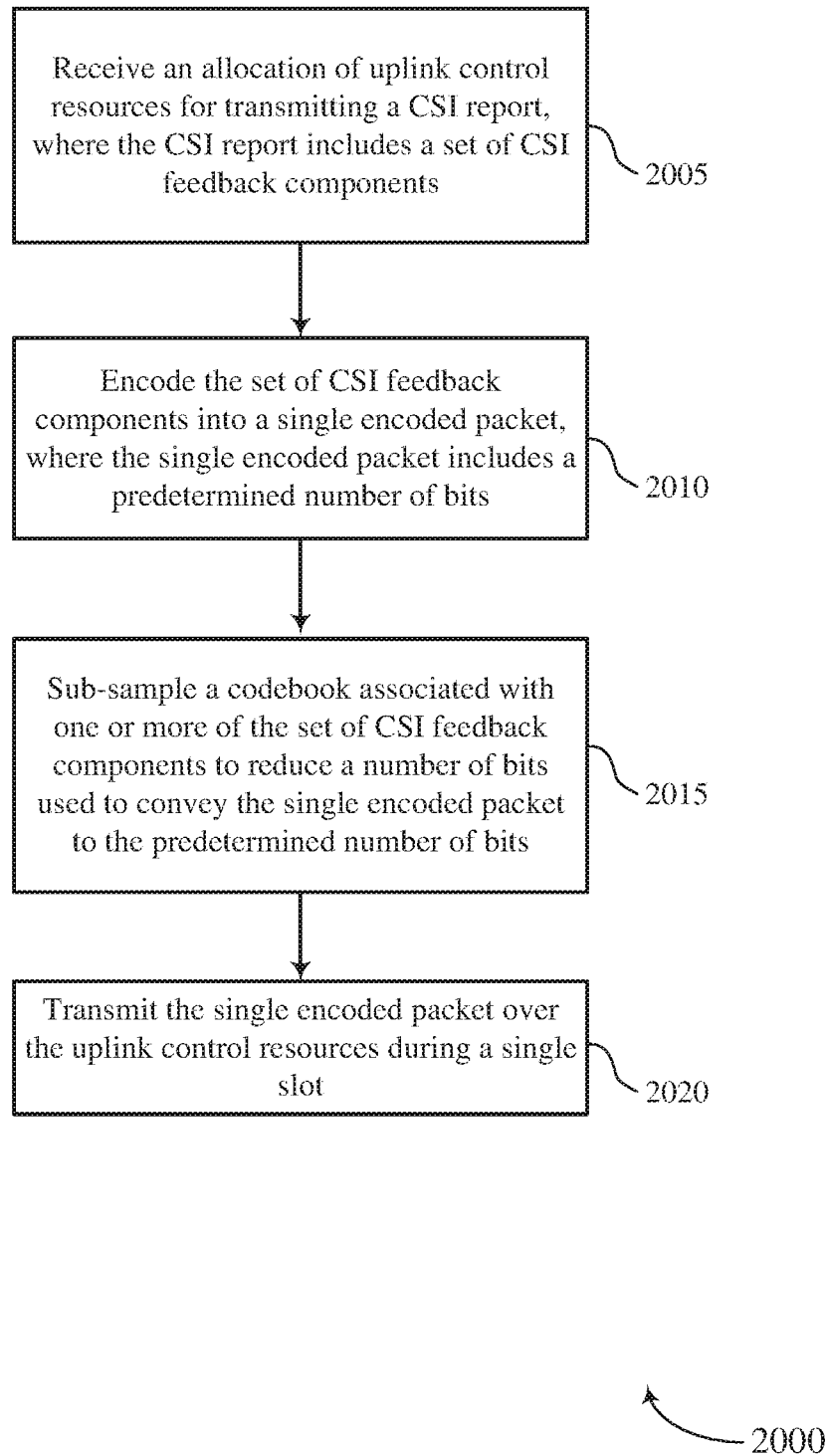

FIG. 20 shows a flowchart illustrating a method 2000 for CSI feedback for flexible uplink control signaling in accordance with aspects of the present disclosure. The operations of method 2000 may be implemented by a UE 115 or its components as described herein. For example, the operations of method 2000 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 2005 the UE 115 may receive an allocation of uplink control resources for transmitting a CSI report, wherein the CSI report comprises a plurality of CSI feedback components. The operations of block 2005 may be performed according to the methods described herein. In certain examples, aspects of the operations of block 2005 may be performed by a uplink control resource component as described with reference to FIGS. 7 through 10.

At block 2010 the UE 115 may encode the plurality of CSI feedback components into a single encoded packet, wherein the single encoded packet comprises a predetermined number of bits. The operations of block 2010 may be performed according to the methods described herein. In certain examples, aspects of the operations of block 2010 may be performed by a single packet encoder as described with reference to FIGS. 7 through 10.

At block 2015 the UE 115 may sub-sample a codebook associated with one or more of the plurality of CSI feedback components to reduce a number of bits used to convey the single encoded packet to the predetermined number of bits. The operations of block 2015 may be performed according to the methods described herein. In certain examples, aspects of the operations of block 2015 may be performed by a codebook sub-sampling component as described with reference to FIGS. 7 through 10.

At block 2020 the UE 115 may transmit the single encoded packet over the uplink control resources during a single slot. The operations of block 2020 may be performed according to the methods described herein. In certain examples, aspects of the operations of block 2020 may be performed by a transmitter as described with reference to FIGS. 7 through 10.

Figure 21:
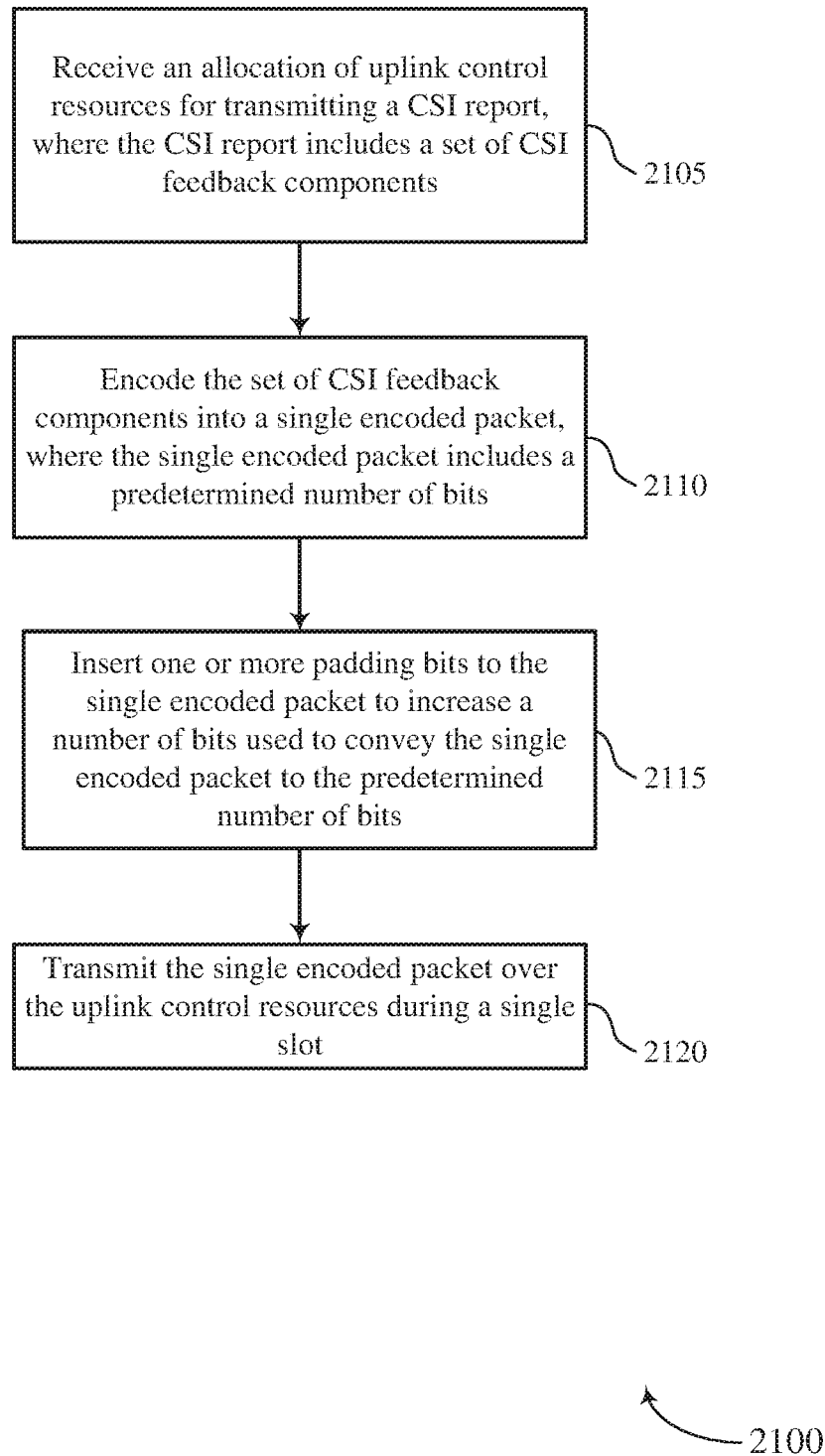

FIG. 21 shows a flowchart illustrating a method 2100 for CSI feedback for flexible uplink control signaling in accordance with aspects of the present disclosure. The operations of method 2100 may be implemented by a UE 115 or its components as described herein. For example, the operations of method 2100 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 2105 the UE 115 may receive an allocation of uplink control resources for transmitting a CSI report, wherein the CSI report comprises a plurality of CSI feedback components. The operations of block 2105 may be performed according to the methods described herein. In certain examples, aspects of the operations of block 2105 may be performed by a uplink control resource component as described with reference to FIGS. 7 through 10.

At block 2110 the UE 115 may encode the plurality of CSI feedback components into a single encoded packet, wherein the single encoded packet comprises a predetermined number of bits. The operations of block 2110 may be performed according to the methods described herein. In certain examples, aspects of the operations of block 2110 may be performed by a single packet encoder as described with reference to FIGS. 7 through 10.

At block 2115 the UE 115 may insert one or more padding bits to the single encoded packet to increase a number of bits used to convey the single encoded packet to the predetermined number of bits. The operations of block 2115 may be performed according to the methods described herein. In certain examples, aspects of the operations of block 2115 may be performed by a padding component as described with reference to FIGS. 7 through 10.

At block 2120 the UE 115 may transmit the single encoded packet over the uplink control resources during a single slot. The operations of block 2120 may be performed according to the methods described herein. In certain examples, aspects of the operations of block 2120 may be performed by a transmitter as described with reference to FIGS. 7 through 10.

Figure 22:
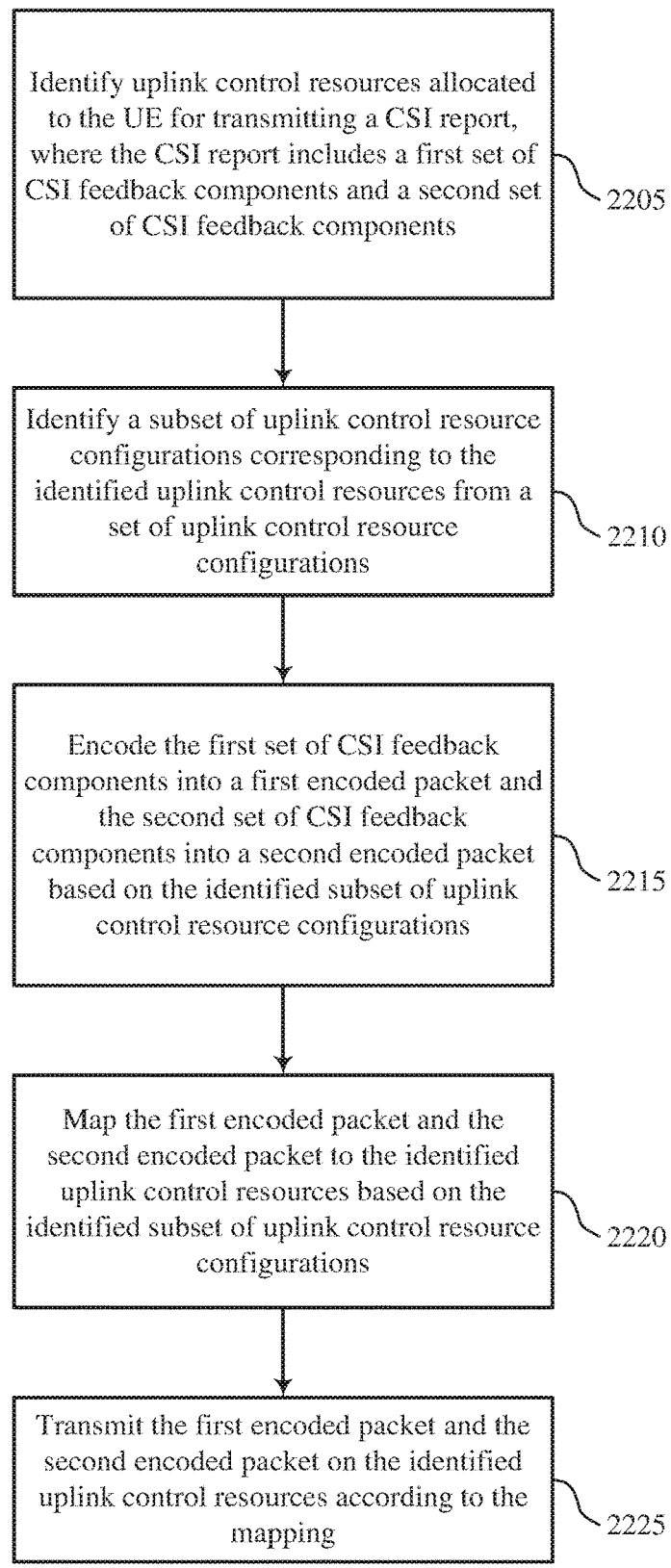

FIG. 22 shows a flowchart illustrating a method 2200 for CSI feedback for flexible uplink control signaling in accordance with aspects of the present disclosure. The operations of method 2200 may be implemented by a UE 115 or its components as described herein. For example, the operations of method 2200 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 2205 the UE 115 may identify uplink control resources allocated to the UE for transmitting a CSI report, wherein the CSI report comprises a first plurality of CSI feedback components and a second plurality of CSI feedback components. The operations of block 2205 may be performed according to the methods described herein. In certain examples, aspects of the operations of block 2205 may be performed by a uplink control resource component as described with reference to FIGS. 7 through 10.

At block 2210 the UE 115 may identify a subset of uplink control resource configurations corresponding to the identified uplink control resources from a set of uplink control resource configurations. The operations of block 2210 may be performed according to the methods described herein. In certain examples, aspects of the operations of block 2210 may be performed by a uplink control resource configuration component as described with reference to FIGS. 7 through 10.

At block 2215 the UE 115 may encode the first plurality of CSI feedback components into a first encoded packet and the second plurality of CSI feedback components into a second encoded packet based at least in part on the identified subset of uplink control resource configurations. The operations of block 2215 may be performed according to the methods described herein. In certain examples, aspects of the operations of block 2215 may be performed by a multi-packet encoder as described with reference to FIGS. 7 through 10.

At block 2220 the UE 115 may map the first encoded packet and the second encoded packet to the identified uplink control resources based at least in part on the identified subset of uplink control resource configurations. The operations of block 2220 may be performed according to the methods described herein. In certain examples, aspects of the operations of block 2220 may be performed by a packet mapping component as described with reference to FIGS. 7 through 10.

At block 2225 the UE 115 may transmit the first encoded packet and the second encoded packet on the identified uplink control resources according to the mapping. The operations of block 2225 may be performed according to the methods described herein. In certain examples, aspects of the operations of block 2225 may be performed by a transmitter as described with reference to FIGS. 7 through 10.

Figure 23:
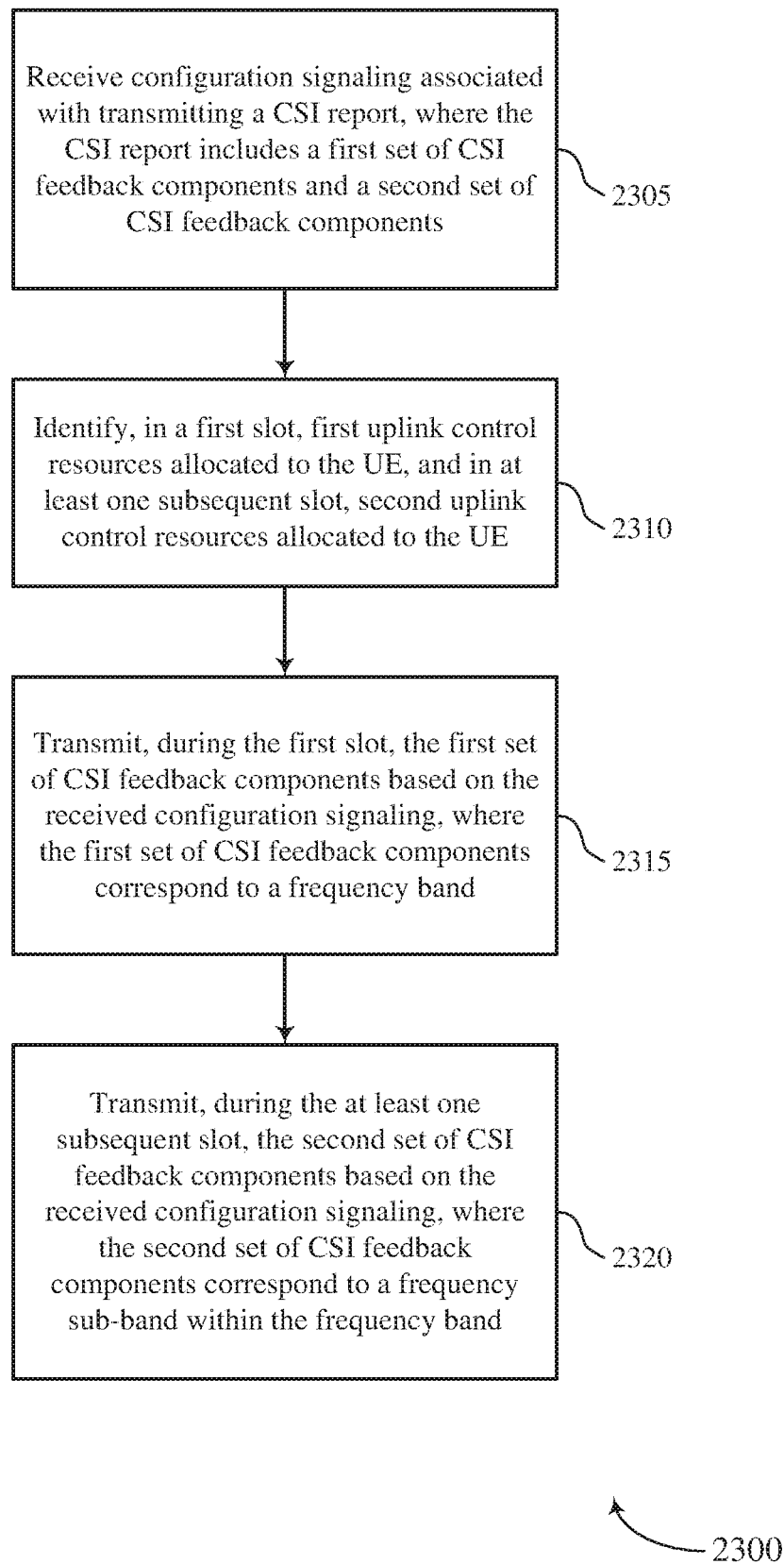

FIG. 23 shows a flowchart illustrating a method 2300 for CSI feedback for flexible uplink control signaling in accordance with aspects of the present disclosure. The operations of method 2300 may be implemented by a UE 115 or its components as described herein. For example, the operations of method 2300 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 2305 the UE 115 may receive configuration signaling associated with transmitting a CSI report, wherein the CSI report comprises a first plurality of CSI feedback components and a second plurality of CSI feedback components. The operations of block 2305 may be performed according to the methods described herein. In certain examples, aspects of the operations of block 2305 may be performed by a CSI configuration signaling component as described with reference to FIGS. 7 through 10.

At block 2310 the UE 115 may identify, in a first slot, first uplink control resources allocated to the UE, and in at least one subsequent slot, second uplink control resources allocated to the UE. The operations of block 2310 may be performed according to the methods described herein. In certain examples, aspects of the operations of block 2310 may be performed by a uplink control resource component as described with reference to FIGS. 7 through 10.

At block 2315 the UE 115 may transmit, during the first slot, the first plurality of CSI feedback components based at least in part on the received configuration signaling, wherein the first plurality of CSI feedback components correspond to a frequency band. The operations of block 2315 may be performed according to the methods described herein. In certain examples, aspects of the operations of block 2315 may be performed by a multi-slot CSI feedback transmitter as described with reference to FIGS. 7 through 10.

At block 2320 the UE 115 may transmit, during the at least one subsequent slot, the second plurality of CSI feedback components based at least in part on the received configuration signaling, wherein the second plurality of CSI feedback components correspond to a frequency subband within the frequency band. The operations of block 2320 may be performed according to the methods described herein. In certain examples, aspects of the operations of block 2320 may be performed by a multi-slot CSI feedback transmitter as described with reference to FIGS. 7 through 10.

Figure 24:
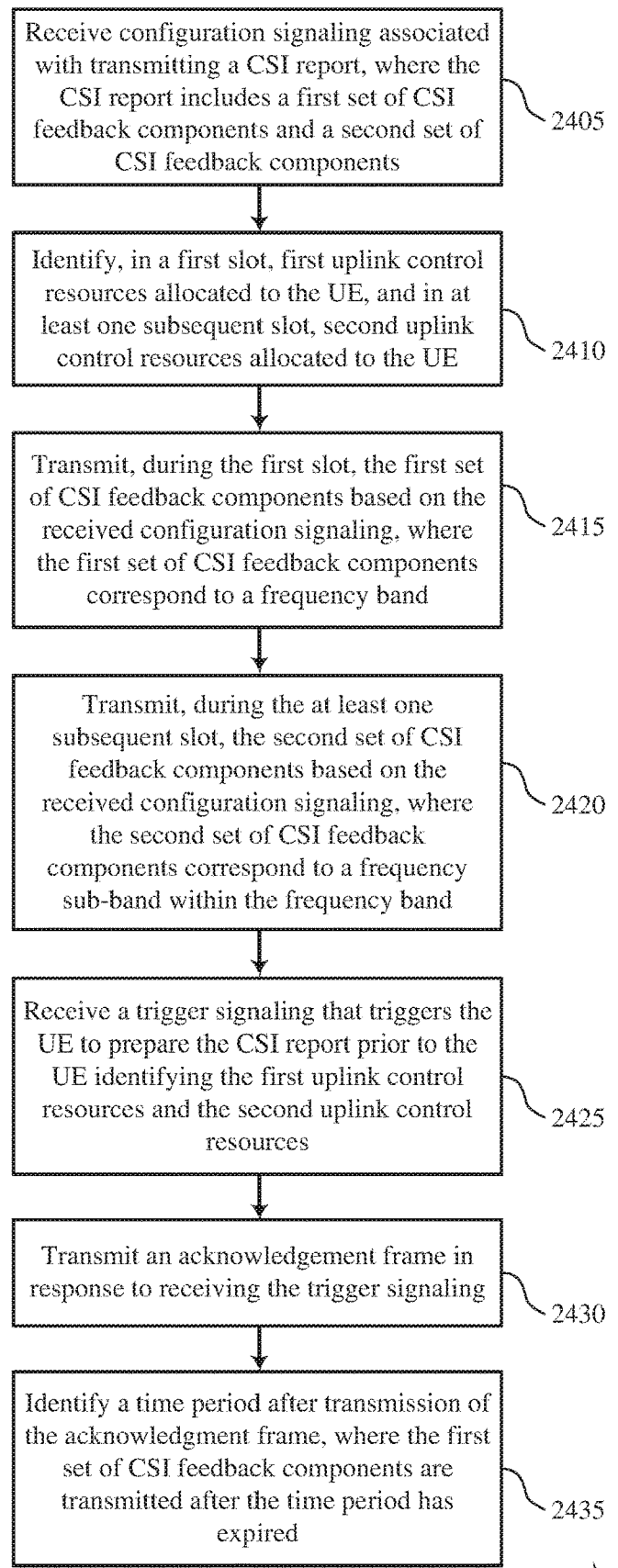

FIG. 24 shows a flowchart illustrating a method 2400 for CSI feedback for flexible uplink control signaling in accordance with aspects of the present disclosure. The operations of method 2400 may be implemented by a UE 115 or its components as described herein. For example, the operations of method 2400 may be performed by a UE CSI feedback manager as described with reference to FIGS. 7 through 10. In some examples, a UE 115 may execute a set of codes to control the functional elements of the device to perform the functions described below. Additionally, the UE 115 may perform aspects of the functions described below using special-purpose hardware.

At block 2405 the UE 115 may receive configuration signaling associated with transmitting a CSI report, wherein the CSI report comprises a first plurality of CSI feedback components and a second plurality of CSI feedback components. The operations of block 2405 may be performed according to the methods described herein. In certain examples, aspects of the operations of block 2405 may be performed by a CSI configuration signaling component as described with reference to FIGS. 7 through 10.

At block 2410 the UE 115 may identify, in a first slot, first uplink control resources allocated to the UE, and in at least one subsequent slot, second uplink control resources allocated to the UE. The operations of block 2410 may be performed according to the methods described herein. In certain examples, aspects of the operations of block 2410 may be performed by a uplink control resource component as described with reference to FIGS. 7 through 10.

At block 2415 the UE 115 may transmit, during the first slot, the first plurality of CSI feedback components based at least in part on the received configuration signaling, wherein the first plurality of CSI feedback components correspond to a frequency band. The operations of block 2415 may be performed according to the methods described herein. In certain examples, aspects of the operations of block 2415 may be performed by a multi-slot CSI feedback transmitter as described with reference to FIGS. 7 through 10.

At block 2420 the UE 115 may transmit, during the at least one subsequent slot, the second plurality of CSI feedback components based at least in part on the received configuration signaling, wherein the second plurality of CSI feedback components correspond to a frequency subband within the frequency band. The operations of block 2420 may be performed according to the methods described herein. In certain examples, aspects of the operations of block 2420 may be performed by a multi-slot CSI feedback transmitter as described with reference to FIGS. 7 through 10.

At block 2425 the UE 115 may receive a trigger signaling that triggers the UE to prepare the CSI report prior to the UE identifying the first uplink control resources and the second uplink control resources. The operations of block 2425 may be performed according to the methods described herein. In certain examples, aspects of the operations of block 2425 may be performed by a trigger signaling component as described with reference to FIGS. 7 through 10.

At block 2430 the UE 115 may transmit an acknowledgement frame in response to receiving the trigger signaling. The operations of block 2430 may be performed according to the methods described herein. In certain examples, aspects of the operations of block 2430 may be performed by a trigger acknowledgment component as described with reference to FIGS. 7 through 10.

At block 2435 the UE 115 may identify a time period after transmission of the acknowledgment frame, wherein the first plurality of CSI feedback components are transmitted after the time period has expired. The operations of block 2435 may be performed according to the methods described herein. In certain examples, aspects of the operations of block 2435 may be performed by a transmission delay component as described with reference to FIGS. 7 through 10.

Figure 25:
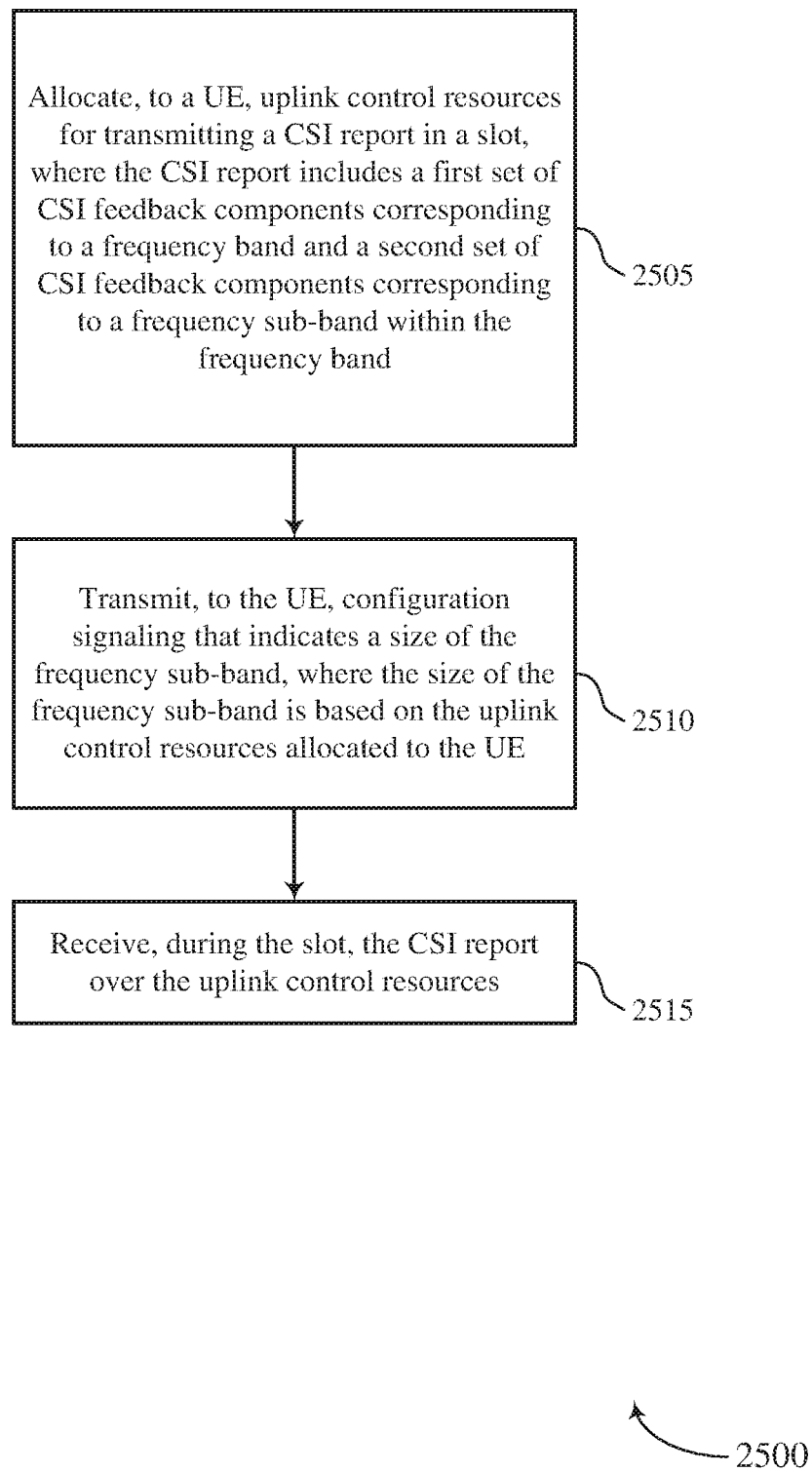

FIG. 25 shows a flowchart illustrating a method 2500 for CSI feedback for flexible uplink control signaling in accordance with aspects of the present disclosure. The operations of method 2500 may be implemented by a base station 105 or its components as described herein. For example, the operations of method 2500 may be performed by a base station CSI feedback manager as described with reference to FIGS. 11 through 14. In some examples, a base station 105 may execute a set of codes to control the functional elements of the device to perform the functions described below. Additionally, the base station 105 may perform aspects of the functions described below using special-purpose hardware.

At block 2505 the base station 105 may allocate, to a UE, uplink control resources for transmitting a CSI report in a slot, wherein the CSI report comprises a first plurality of CSI feedback components corresponding to a frequency band and a second plurality of CSI feedback components corresponding to a frequency subband within the frequency band. The operations of block 2505 may be performed according to the methods described herein. In certain examples, aspects of the operations of block 2505 may be performed by a uplink control resource component as described with reference to FIGS. 11 through 14.

At block 2510 the base station 105 may transmit, to the UE, configuration signaling that indicates a size of the frequency subband, wherein the size of the frequency subband is based at least in part on the uplink control resources allocated to the UE. The operations of block 2510 may be performed according to the methods described herein. In certain examples, aspects of the operations of block 2510 may be performed by a subband size component as described with reference to FIGS. 11 through 14.

At block 2515 the base station 105 may receive, during the slot, the CSI report over the uplink control resources. The operations of block 2515 may be performed according to the methods described herein. In certain examples, aspects of the operations of block 2515 may be performed by a receiver as described with reference to FIGS. 11 through 14.

Figure 26:
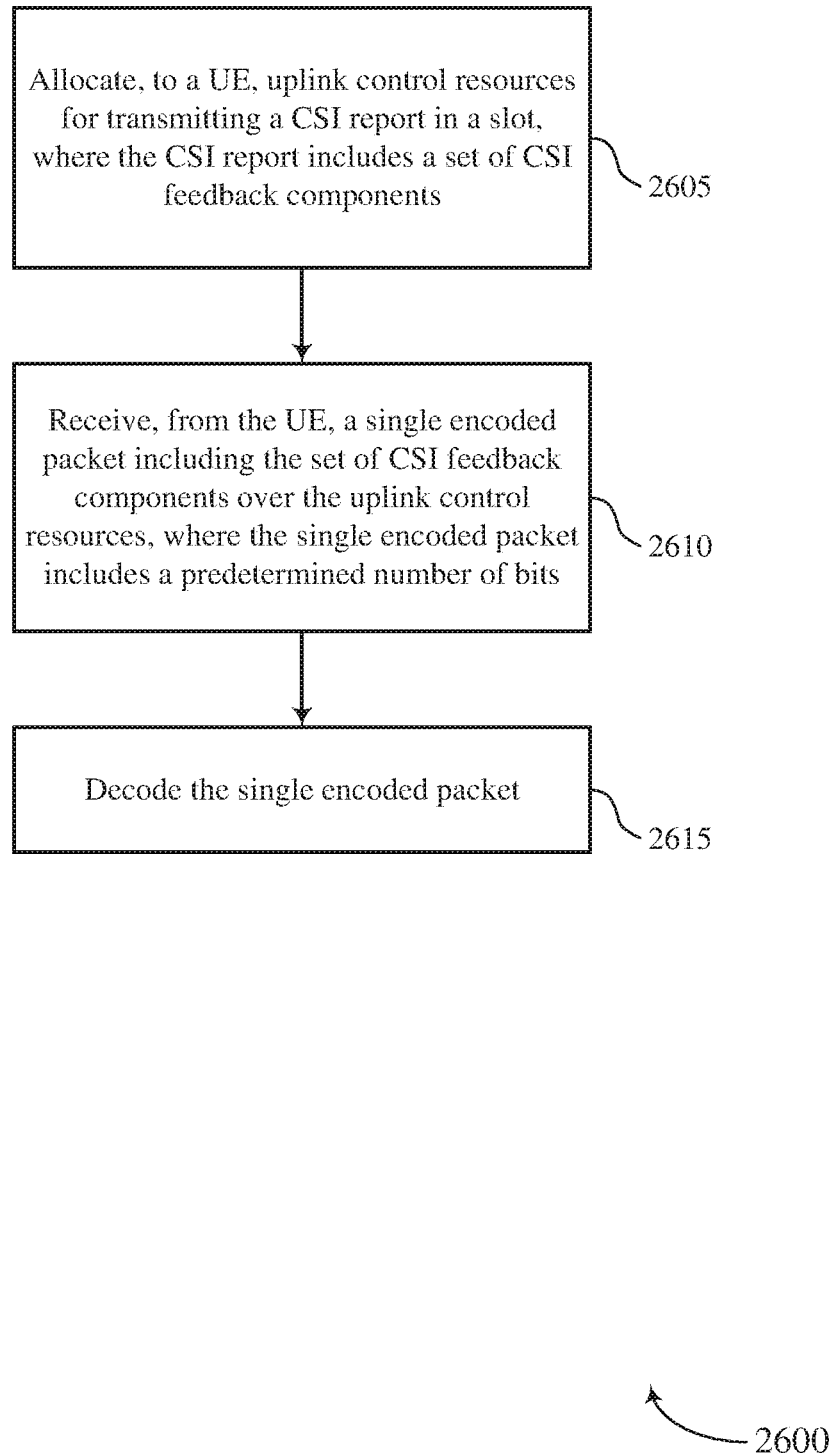

FIG. 26 shows a flowchart illustrating a method 2600 for CSI feedback for flexible uplink control signaling in accordance with aspects of the present disclosure. The operations of method 2600 may be implemented by a base station 105 or its components as described herein. For example, the operations of method 2600 may be performed by a base station CSI feedback manager as described with reference to FIGS. 11 through 14. In some examples, a base station 105 may execute a set of codes to control the functional elements of the device to perform the functions described below. Additionally, the base station 105 may perform aspects of the functions described below using special-purpose hardware.

At block 2605 the base station 105 may allocate, to a UE, uplink control resources for transmitting a CSI report in a slot, wherein the CSI report comprises a plurality of CSI feedback components. The operations of block 2605 may be performed according to the methods described herein. In certain examples, aspects of the operations of block 2605 may be performed by a uplink control resource component as described with reference to FIGS. 11 through 14.

At block 2610 the base station 105 may receive, from the UE, a single encoded packet comprising the plurality of CSI feedback components over the uplink control resources, wherein the single encoded packet comprises a predetermined number of bits. The operations of block 2610 may be performed according to the methods described herein. In certain examples, aspects of the operations of block 2610 may be performed by a receiver as described with reference to FIGS. 11 through 14.

At block 2615 the base station 105 may decode the single encoded packet. The operations of block 2615 may be performed according to the methods described herein. In certain examples, aspects of the operations of block 2615 may be performed by a single packet decoder as described with reference to FIGS. 11 through 14. In some aspects, decoding the single packet may include decoding the single encoded packet a first time based on the predetermined number of bits and updating a size of a RI feedback component based on the first decoding. In some aspects, decoding the single packet may include decoding the single encoded packet a second time based on the updated size of the RI feedback component and updating a size of a PMI feedback component and a size of a CQI feedback component based on the second decoding. In some aspects, decoding the single packet may include decoding the single encoded packet a third time based on the updated size of the PMI feedback component and the updated size of the CQI feedback component.

Figure 27:
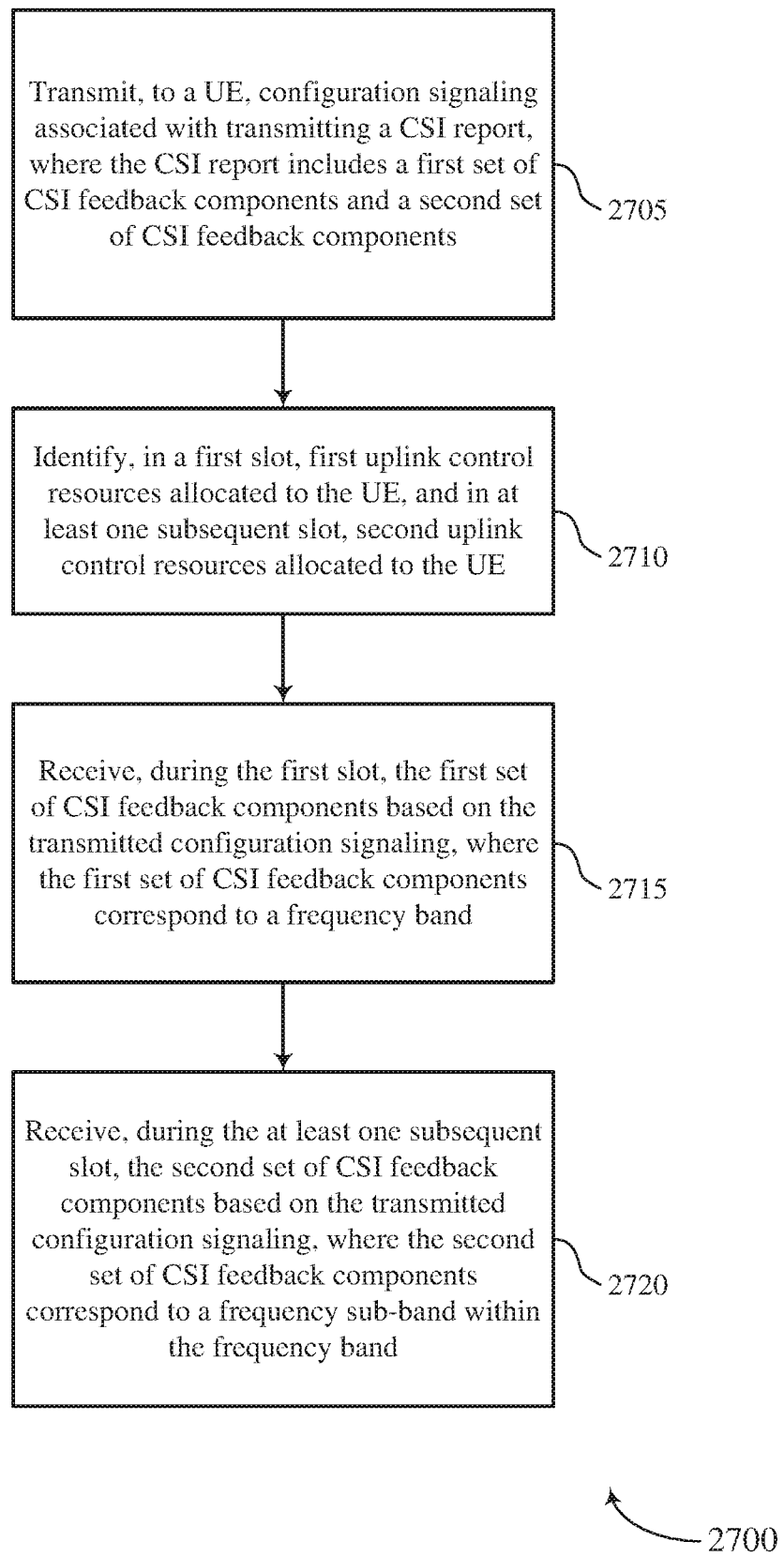

FIG. 27 shows a flowchart illustrating a method 2700 for CSI feedback for flexible uplink control signaling in accordance with aspects of the present disclosure. The operations of method 2700 may be implemented by a base station 105 or its components as described herein. For example, the operations of method 2700 may be performed by a base station CSI feedback manager as described with reference to FIGS. 11 through 14. In some examples, a base station 105 may execute a set of codes to control the functional elements of the device to perform the functions described below. Additionally, the base station 105 may perform aspects of the functions described below using special-purpose hardware.

At block 2705 the base station 105 may transmit, to a UE, configuration signaling associated with transmitting a CSI report, wherein the CSI report comprises a first plurality of CSI feedback components and a second plurality of CSI feedback components. The operations of block 2705 may be performed according to the methods described herein. In certain examples, aspects of the operations of block 2705 may be performed by a CSI configuration signaling component as described with reference to FIGS. 11 through 14.

At block 2710 the base station 105 may identify, in a first slot, first uplink control resources allocated to the UE, and in at least one subsequent slot, second uplink control resources allocated to the UE. The operations of block 2710 may be performed according to the methods described herein. In certain examples, aspects of the operations of block 2710 may be performed by a uplink control resource component as described with reference to FIGS. 11 through 14.

At block 2715 the base station 105 may receive, during the first slot, the first plurality of CSI feedback components based at least in part on the transmitted configuration signaling, wherein the first plurality of CSI feedback components correspond to a frequency band. The operations of block 2715 may be performed according to the methods described herein. In certain examples, aspects of the operations of block 2715 may be performed by a multi-slot CSI feedback receiver as described with reference to FIGS. 11 through 14.

At block 2720 the base station 105 may receive, during the at least one subsequent slot, the second plurality of CSI feedback components based at least in part on the transmitted configuration signaling, wherein the second plurality of CSI feedback components correspond to a frequency subband within the frequency band. The operations of block 2720 may be performed according to the methods described herein. In certain examples, aspects of the operations of block 2720 may be performed by a multi-slot CSI feedback receiver as described with reference to FIGS. 11 through 14.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying, in a slot, uplink control resources allocated to the UE for transmitting a channel state information (CSI) report, wherein the UE is configured to report CSI for a frequency band and a plurality of frequency subbands of the frequency band;
    computing values for a first plurality of CSI feedback components of the CSI report at least corresponding to the frequency band;
    calculating a maximum payload size supported by the uplink control resources allocated to the UE;
    calculating a size of the first plurality of CSI feedback components of the CSI report at least corresponding to the frequency band;
    calculating a remaining size of the uplink control resources based at least in part on a difference between the maximum payload size supported by the uplink control resources and the size of the first plurality of CSI feedback components;
    determining a first set of frequency subbands of the plurality of frequency subbands for which to include CSI in the CSI report based at least in part on the remaining size of the uplink control resources;
    computing values for a second plurality of CSI feedback components of the CSI report at least corresponding to the first set of frequency subbands; and
    transmitting, during the slot, the CSI report over the uplink control resources, the CSI report comprising the first plurality of CSI feedback components and the second plurality of CSI feedback components comprising the CSI for the first set of frequency subbands.

2. The method of claim 1, further comprising:
    receiving configuration signaling that indicates a size of the plurality of frequency subbands;
    determining the size of the plurality of frequency subbands based at least in part on the configuration signaling; and
    limiting the plurality of frequency subbands for which to report the second plurality of CSI feedback components to the first set of frequency subbands based at least in part on the size of the plurality of frequency subbands, wherein the plurality of frequency subbands comprises a second set of frequency subbands.

3. The method of claim 1, further comprising:
    limiting the plurality of frequency subbands for which to report the second plurality of CSI feedback components to the first set of frequency subbands based at least in part on the maximum payload size supported by the uplink control resources, wherein the plurality of frequency subbands comprises a second set of frequency subbands.

4. The method of claim 1, wherein
    the method further comprises limiting the plurality of frequency subbands for which to report the second plurality of CSI feedback components to the first set of frequency subbands based at least in part on the size of the first plurality of CSI feedback components, a size of the second plurality of CSI feedback components, or both, wherein the plurality of frequency subbands comprises a second set of frequency subbands.

5. The method of claim 1, wherein the first plurality of CSI feedback components comprises a rank indicator (RI), a CSI-reference signal (CSI-RS) resource indicator (CRI), a channel quality indicator (CQI), or any combination thereof.

6. The method of claim 1, wherein the second plurality of CSI feedback components comprises a wideband precoding matrix indicator (PMI), a narrowband PMI, a channel quality indicator (CQI), or any combination thereof.

7. The method of claim 1, wherein the uplink control resources comprise physical uplink control channel (PUCCH) resources or physical uplink shared channel (PUSCH) resources, or both.

8. The method of claim 1, wherein the CSI report is configured for periodic, aperiodic, or semi-persistent transmission.

9. The method of claim 1, wherein:
the size of the first plurality of CSI feedback components corresponds to a size of the first plurality of CSI feedback components, and
the method further comprises limiting the plurality of frequency subbands for which to report the second plurality of CSI feedback components to the first set of frequency subbands based at least in part on the maximum payload size supported by the uplink control resources and the size of the first plurality of CSI feedback components, wherein the plurality of frequency subbands comprises a second set of frequency subbands.

10. The method of claim 1, further comprising:
determining a first quantity of the plurality of frequency subbands for which to report the second plurality of CSI feedback components based at least in part on the remaining size of the uplink control resources; and
limiting the plurality of frequency subbands for which to report the second plurality of CSI feedback components to the first quantity, wherein the first set of frequency subbands is determined based at least in part on the first quantity, a second quantity of the first set of frequency subbands being equivalent to the first quantity.

11. A method for wireless communication at a base station, comprising:
allocating, to a user equipment (UE), uplink control resources for reporting, in a slot, a channel state information (CSI) report for first CSI feedback at least corresponding to a frequency band and for second CSI feedback at least corresponding to frequency subbands within the frequency band, the frequency subbands comprising a first set of frequency subbands and a second set of frequency subbands;
transmitting, to the UE, configuration signaling that indicates a size of the frequency subbands and configures the UE to report CSI feedback for the frequency subbands, wherein the size of the frequency subbands is based at least in part on the uplink control resources allocated to the UE; and
receiving, during the slot, the CSI report over the uplink control resources, wherein the CSI report comprises a first plurality of CSI feedback components at least corresponding to the frequency band and a second plurality of CSI feedback components comprising CSI for the first set of frequency subbands based at least in part on a remaining size of the uplink control resources and a size of the first plurality of CSI feedback components, wherein the remaining size of the uplink control resources is based at least in part on a difference between a maximum payload size supported by the uplink control resources allocated to the UE and the size of the first plurality of CSI feedback components of the CSI report at least corresponding to the frequency band.

12. An apparatus for wireless communication at a user equipment (UE), comprising:
means for identifying, in a slot, uplink control resources allocated to the UE for transmitting a channel state information (CSI) report, wherein the UE is configured to report CSI for a frequency band and a plurality of frequency subbands of the frequency band;
means for computing values for a first plurality of CSI feedback components of the CSI report at least corresponding to the frequency band;
means for calculating a maximum payload size supported by the uplink control resources allocated to the UE;
means for calculating a size of the first plurality of CSI feedback components of the CSI report at least corresponding to the frequency band;
means for calculating a remaining size of the uplink control resources based at least in part on a difference between the maximum payload size supported by the uplink control resources and the size of the first plurality of CSI feedback components;
means for determining a first set of frequency subbands of the plurality of frequency subbands for which to include CSI in the CSI report based at least in part on the remaining size of the uplink control resources;
means for computing values for a second plurality of CSI feedback components of the CSI report at least corresponding to the first set of frequency subbands; and
means for transmitting, during the slot, the CSI report over the uplink control resources, the CSI report comprising the first plurality of CSI feedback components and the second plurality of CSI feedback components comprising the CSI for the first set of frequency subbands.

13. The apparatus of claim 12, further comprising:
receiving configuration signaling that indicates a size of the plurality of frequency subbands;
means for determining the size of the plurality of frequency subbands based at least in part on the configuration signaling; and
means for limiting the plurality of frequency subbands for which to report the second plurality of CSI feedback components to the first set of frequency subbands based at least in part on the size of the plurality of frequency subbands, wherein the plurality of frequency subbands comprises a second set of frequency subbands.

14. The apparatus of claim 12, further comprising:
means for limiting the plurality of frequency subbands for which to report the second plurality of CSI feedback components to the first set of frequency subbands based at least in part on the maximum supported payload size supported by the uplink control resources, wherein the plurality of frequency subbands comprises a second set of frequency subbands.

15. The apparatus of claim 12, wherein
the apparatus further comprises means for limiting the plurality of frequency subbands for which to report the second plurality of CSI feedback components to the first set of frequency subbands based at least in part on the size of the first plurality of CSI feedback components, a size of the second plurality of CSI feedback components, or both, wherein the plurality of frequency subbands comprises a second set of frequency subbands.

16. The apparatus of claim 12, wherein the first plurality of CSI feedback components comprises a rank indicator (RI), a CSI-reference signal (CSI-RS) resource indicator (CRI), a channel quality indicator (CQI), or any combination thereof.

17. The apparatus of claim 12, wherein the second plurality of CSI feedback components comprises a wideband precoding matrix indicator (PMI), a narrowband PMI, a channel quality indicator (CQI), or any combination thereof.

18. The apparatus of claim 12, wherein the uplink control resources comprise physical uplink control channel (PUCCH) resources or physical uplink shared channel (PUSCH) resources, or both.

19. The apparatus of claim 12, wherein the CSI report is configured for periodic, aperiodic, or semi-persistent transmission.

20. An apparatus for wireless communication at a base station, comprising:
- means for allocating, to a user equipment (UE), uplink control resources for reporting, in a slot, a channel state information (CSI) report for first CSI feedback at least corresponding to a frequency band and for second CSI feedback at least corresponding to frequency subbands within the frequency band, the frequency subbands comprising a first set of frequency subbands and a second set of frequency subbands;
- means for transmitting, to the UE, configuration signaling that indicates a size of the frequency subbands and configures the UE to report CSI feedback for the frequency subbands, wherein the size of the frequency subbands is based at least in part on the uplink control resources allocated to the UE; and
- means for receiving, during the slot, the CSI report over the uplink control resources, wherein the CSI report comprises a first plurality of CSI feedback components at least corresponding to the frequency band and a second plurality of CSI feedback components comprising CSI for the first set of frequency subbands based at least in part on a remaining size of the uplink control resources and a size of the first plurality of CSI feedback components, wherein the remaining size of the uplink control resources is based at least in part on a difference between a maximum payload size supported by the uplink control resources allocated to the UE and the size of the first plurality of CSI feedback components of the CSI report at least corresponding to the frequency band.

21. An apparatus for wireless communication at a user equipment (UE), comprising:
- a processor;
- memory in electronic communication with the processor; and
- instructions stored in the memory and operable, when executed by the processor, to cause the apparatus to:
  - identify, in a slot, uplink control resources allocated to the UE for transmitting a channel state information (CSI) report, wherein the UE is configured to report CSI for a frequency band and a plurality of frequency subbands of the frequency band;
  - compute values for a first plurality of CSI feedback components of the CSI report at least corresponding to the frequency band;
  - calculate a maximum payload size supported by the uplink control resources allocated to the UE;
  - calculate a size of the first plurality of CSI feedback components of the CSI report at least corresponding to the frequency band;
  - calculate a remaining size of the uplink control resources based at least in part on a difference between the maximum payload size supported by the uplink control resources and the size of the first plurality of CSI feedback components;
  - determine a first set of frequency subbands of the plurality of frequency subbands for which to include CSI in the CSI report based at least in part on the remaining size of the uplink control resources;
  - compute values for a second plurality of CSI feedback components of the CSI report at least corresponding to the first set of frequency subbands; and
  - transmit, during the slot, the CSI report over the uplink control resources, the CSI report comprising the first plurality of CSI feedback components and the second plurality of CSI feedback components comprising the CSI for the first set of frequency subbands.

22. The apparatus of claim 21, wherein the instructions are further executable by the processor to cause the apparatus to:
- receive configuration signaling that indicates a size of the plurality of frequency subbands;
- determine the size of the plurality of frequency subbands based at least in part on the configuration signaling; and
- limit the plurality of frequency subbands for which to report the second plurality of CSI feedback components to the first set of frequency subbands based at least in part on the size of the plurality of frequency subbands, wherein the plurality of frequency subbands comprises a second set of frequency subbands.

23. The apparatus of claim 21, wherein the instructions are further executable by the processor to cause the apparatus to:
- limit the plurality of frequency subbands for which to report the second plurality of CSI feedback components to the first set of frequency subbands based at least in part on the maximum payload size supported by the uplink control resources, wherein the plurality of frequency subbands comprises a second set of frequency subbands.

24. The apparatus of claim 21, wherein
the instructions are further executable by the processor to limit the plurality of frequency subbands for which to report the second plurality of CSI feedback components to the first set of frequency subbands based at least in part on the size of the values of the first plurality of CSI feedback components, a size of the second plurality of CSI feedback components, or both, wherein the plurality of frequency subbands comprises a second set of frequency subbands.

25. The apparatus of claim 21, wherein the first plurality of CSI feedback components comprises a rank indicator (RI), a CSI-reference signal (CSI-RS) resource indicator (CRI), a channel quality indicator (CQI), or any combination thereof.

26. The apparatus of claim 21, wherein the second plurality of CSI feedback components comprises a wideband precoding matrix indicator (PMI), a narrowband PMI, a channel quality indicator (CQI), or any combination thereof.

27. The apparatus of claim 21, wherein the uplink control resources comprise physical uplink control channel (PUCCH) resources or physical uplink shared channel (PUSCH) resources, or both.

28. The apparatus of claim 21, wherein the CSI report is configured for periodic, aperiodic, or semi-persistent transmission.

29. An apparatus for wireless communication at a base station, comprising:
- a processor;
- memory in electronic communication with the processor; and
- instructions stored in the memory and operable, when executed by the processor, to cause the apparatus to:
  - allocate, to a user equipment (UE), uplink control resources for reporting, in a slot, a channel state information (CSI) report for first CSI feedback at least corresponding to a frequency band and for second CSI feedback at least corresponding to frequency subbands within the frequency band, the frequency subbands comprising a first set of frequency subbands and a second set of frequency subbands;

transmit, to the UE, configuration signaling that indicates a size of the frequency subbands and configures the UE to report CSI feedback for the frequency subbands, wherein the size of the frequency subbands is based at least in part on the uplink control resources allocated to the UE; and receive, during the slot, the CSI report over the uplink control resources, wherein the CSI report comprises a first plurality of CSI feedback components at least corresponding to the frequency band and a second plurality of CSI feedback components comprising CSI for the first set of frequency subbands based at least in part on a remaining size of the uplink control resources and a size of the first plurality of CSI feedback components, wherein the remaining size of the uplink control resources is based at least in part on a difference between a maximum payload size supported by the uplink control resources allocated to the UE and the size of the first plurality of CSI feedback components of the CSI report at least corresponding to the frequency band.

30. A non-transitory computer-readable medium storing code for wireless communication and at a user equipment (UE), the code comprising instructions executable by a processor to:

identify, in a slot, uplink control resources allocated to the UE for transmitting a channel state information (CSI) report, wherein the UE is configured to report CSI for a frequency band and a plurality of frequency subbands of the frequency band;

compute values for a first plurality of CSI feedback components of the CSI report at least corresponding to the frequency band;

calculate a maximum payload size supported by the uplink control resources allocated to the UE;

calculate a size of the first plurality of CSI feedback components of the CSI report at least corresponding to the frequency band;

calculate a remaining size of the uplink control resources based at least in part on a difference between the maximum payload size supported by the uplink control resources and the size of the first plurality of CSI feedback components;

determine a first set of frequency subbands of the plurality of frequency subbands for which to include CSI in the CSI report based at least in part on the remaining size of the uplink control resources;

compute values for a second plurality of CSI feedback components of the CSI report at least corresponding to the first set of frequency subbands; and transmit, during the slot, the CSI report over the uplink control resources, the CSI report comprising the first plurality of CSI feedback components and the second plurality of CSI feedback components comprising the CSI for the first set of frequency subbands.

31. The non-transitory computer-readable medium of claim 30, wherein the code is further executable by the processor to:

receive configuration signaling that indicates a size of the plurality of frequency subbands;

determine the size of the plurality of frequency subbands based at least in part on the configuration signaling; and limit the plurality of frequency subbands for which to report the second plurality of CSI feedback components to the first set of frequency subbands based at least in part on the size of the plurality of frequency subbands, wherein the plurality of frequency subbands comprises a second set of frequency subbands.

32. The non-transitory computer-readable medium of claim 30, wherein the code is further executable by the processor to:

limit the plurality of frequency subbands for which to report the second plurality of CSI feedback components to the first set of frequency subbands based at least in part on the maximum payload size supported by the uplink control resources, wherein the plurality of frequency subbands comprises a second set of frequency subbands.

33. The non-transitory computer-readable medium of claim 30, the code is further executable by the processor to limit the plurality of frequency subbands for which to report the second plurality of CSI feedback components to the first set of frequency subbands based at least in part on the size of the first plurality of CSI feedback components, a size of the second plurality of CSI feedback components, or both, wherein the plurality of frequency subbands comprises a second set of frequency subbands.

34. The non-transitory computer-readable medium of claim 30, wherein the first plurality of CSI feedback components comprises a rank indicator (RI), a CSI-reference signal (CSI-RS) resource indicator (CRI), a channel quality indicator (CQI), or any combination thereof.

35. The non-transitory computer-readable medium of claim 30, wherein the second plurality of CSI feedback components comprises a wideband precoding matrix indicator (PMI), a narrowband PMI, a channel quality indicator (CQI), or any combination thereof.

36. The non-transitory computer-readable medium of claim 30, wherein the uplink control resources comprise physical uplink control channel (PUCCH) resources or physical uplink shared channel (PUSCH) resources, or both.

37. A non-transitory computer-readable medium storing code for wireless communication and at a base station, the code comprising instructions executable by a processor to:

allocate, to a user equipment (UE), uplink control resources for reporting, in a slot, a channel state information (CSI) report for first CSI feedback at least corresponding to a frequency band and for second CSI feedback at least corresponding to frequency subbands within the frequency band, the frequency subbands comprising a first set of frequency subbands and a second set of frequency subbands;

transmit, to the UE, configuration signaling that indicates a size of the frequency subbands and configures the UE to report CSI feedback for the frequency subbands, wherein the size of the frequency subbands is based at least in part on the uplink control resources allocated to the UE; and receive, during the slot, the CSI report over the uplink control resources, wherein the CSI report comprises a first plurality of CSI feedback components at least corresponding to the frequency band and a second plurality of CSI feedback components comprising CSI for the first set of frequency subbands based at least in part on a remaining size of the uplink control resources and a size of the first plurality of CSI feedback components, wherein the remaining size of the uplink control resources is based at least in part on a difference between a maximum payload size supported by the uplink control resources allocated to the UE and the size of the first plurality of CSI feedback components of the CSI report at least corresponding to the frequency band.

\* \* \* \* \*